(12) United States Patent
Bae

(10) Patent No.: US 11,821,491 B2
(45) Date of Patent: Nov. 21, 2023

(54) BELT MEMBER AND A CABLE GUIDING DEVICE COMPRISING THE SAME

(71) Applicant: SAMWON ACT CO., LTD., Busan (KR)

(72) Inventor: Kwang Ho Bae, Busan (KR)

(73) Assignee: SAMWON ACT CO., LTD., Busan (KR)

( * ) Notice: Subject to any disclaimer, the term of this patent is extended or adjusted under 35 U.S.C. 154(b) by 626 days.

(21) Appl. No.: 16/752,819

(22) Filed: Jan. 27, 2020

(65) Prior Publication Data

US 2020/0284318 A1  Sep. 10, 2020

(30) Foreign Application Priority Data

Mar. 7, 2019  (KR) .................. 10-2019-0026161
Jul. 3, 2019  (KR) .................. 10-2019-0080016

(51) Int. Cl.
*F16L 11/22* (2006.01)
*F16G 3/08* (2006.01)
*H02G 3/04* (2006.01)

(52) U.S. Cl.
CPC ................ *F16G 3/08* (2013.01); *F16L 11/22* (2013.01); *H02G 3/0406* (2013.01); *H02G 3/0481* (2013.01)

(58) Field of Classification Search
CPC ........... F16G 3/08; H02G 3/0481; F16L 11/22
USPC ................ 138/115–119, 177, DIG. 11
See application file for complete search history.

(56) References Cited

U.S. PATENT DOCUMENTS

| 3,693,664 | A | * | 9/1972 | Schmunk | H02G 9/06 138/155 |
| 4,131,399 | A | * | 12/1978 | Calvet | F04B 43/0072 138/119 |
| 4,824,288 | A | * | 4/1989 | Naito | E02B 11/00 405/48 |
| 5,561,453 | A | * | 10/1996 | Shibata | F16L 11/121 138/119 |
| 6,453,950 | B1 | * | 9/2002 | Smith | B29C 48/11 138/125 |
| 6,692,037 | B1 | * | 2/2004 | Lin | F16L 11/22 285/124.1 |
| 6,751,382 | B2 | * | 6/2004 | McGarvey | H02G 3/0481 385/103 |
| D612,917 | S | * | 3/2010 | Eilertson | D23/266 |
| 10,260,464 | B2 | * | 4/2019 | Tomomatsu | F02M 37/00 |
| 11,022,237 | B2 | * | 6/2021 | Clemente | B32B 15/06 |
| 2007/0175003 | A1 | * | 8/2007 | Marathe | H01B 7/40 24/115 G |
| 2009/0242064 | A1 | * | 10/2009 | Lai | H02G 3/0487 138/116 |
| 2015/0053298 | A1 | * | 2/2015 | Tussy | F16L 9/006 138/177 |

FOREIGN PATENT DOCUMENTS

JP   4157096 B2   9/2008

* cited by examiner

*Primary Examiner* — Patrick F Brinson

(57) ABSTRACT

The present invention provides a belt member comprising: a tubular body; and a belt member unit comprising #1 protrusion area located at #1 predetermined position of the body, where by inserting and placing each protrusion area of layer #2 belt member in each opening of layer #1 belt member, the layer #1 belt member and the layer #2 belt member can be prevented from falling out.

4 Claims, 56 Drawing Sheets

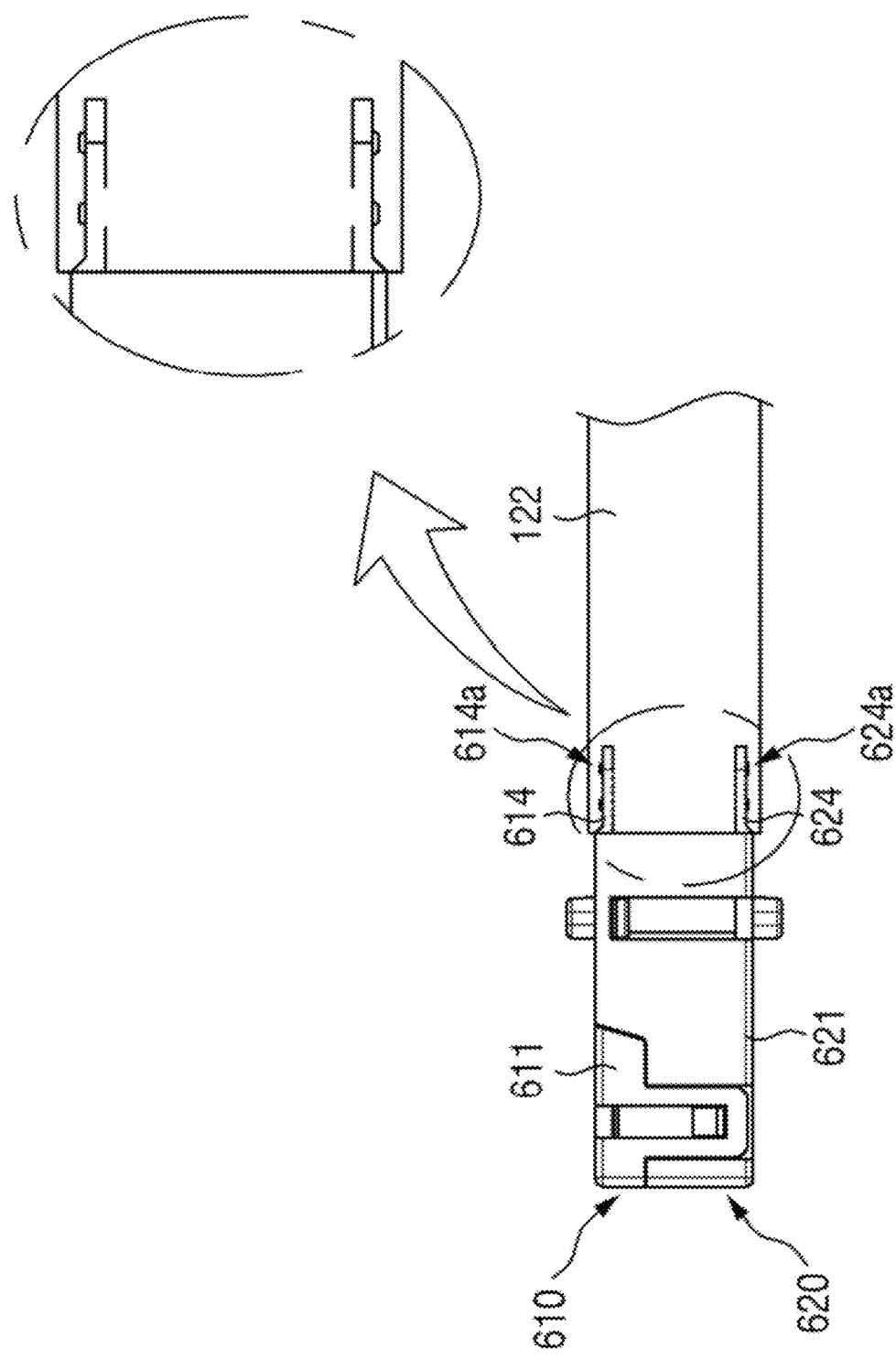

BELT MEMBER AND A CABLE GUIDING DEVICE COMPRISING THE SAME

CROSS-REFERENCE TO RELATED APPLICATION

This application claims the benefit of and priority to Korean Patent Application No. 10-2019-0026161 filed on Mar. 7, 2019 and Korean Patent Application No. 10-2019-0080016 filed on Jul. 3, 2019, which are herein incorporated by reference in its entirety.

TECHNICAL FIELD

The present invention relates to a belt member and a cable guiding device comprising the same. In detail, a belt member and a cable guiding device comprising the same can firmly protect and guide cables that can be in a straight and/or bended posture.

TECHNICAL BACKGROUND

The present invention is related to a cable guiding device that protects and guides flexible cables or hoses which may be electric cables, optical fiber cables, fluid supply hoses (hereinafter referred to as a "cable" or "cables"). The cables are used for machine tools, electronic devices, industrial robots, transportation machines and others, to feed electricity, fluid, air and other things to those moving machines or to a moving part of the machines.

If cables are to be connected to a mobile body of a machine tool, a civil engineering machine, or a conveying system, the cables may be damaged by causing excessive torsion or tension when they are moved. Under those circumstances, a cable protection and guiding device is used to support and guide such cables.

Prior art cable protection and guide apparatuses are known in which conductors, conduits for conveying gas, and supporting members include continuous material strips. The continuous material strips include a series of non-interlocked action-limited solid bodies sealed within a plurality of channels and disposed therein in parallel (e.g. PATENT DOCUMENTS #1) for example.

In the prior art, a flexible material composing the supporting member is stainless steel or a leaf spring, the device is difficult to install within a limited space because the supporting member is unable to maintain an accurate bending radius during bending. During bending, its bending radius increases and it may contact an obstacle in the vicinity of itself. In particular, when stainless steel is used as the flexible member, the apparatus may breakdown and rupture as a result of fatigue and become unusable.

Because the flexible material composing the supporting member is stainless steel or made form a leaf spring, which cannot be easily cut and connected, in order to change the length of the supporting member, the supporting member itself has to be replaced which causes waste of supporting members.

The prior art device may cause resonance and destabilize operations such as operation between bending and straight postures because its twisting rigidity is low when it is bent.

The prior art device requires much burden and time for its production and cannot be mass-produced because pieces formed of resin must be injection-molded one at a time to the stainless steel or leaf spring.

In the prior art, while a jacket component is retained by a pair of upper and lower clamping means to handle the conductors, conduits and Supporting members. When members are assembled to a machine frame-side stationary end area or a machine movable=side moving end area with a pair of upper and lower clamping means, the Supporting members are dislocated from the jacket component or abruptly fall out of the jacket component becoming unable to securely guide the conductors or the conduits. The prior art apparatus is difficult to assemble and disassemble because the conductors, the conduits and the Supporting members cannot be removed out of a machine frame-side stationary end area or a machine movable-side moving end area separately during maintenance such as replacing or repairing a cable from old to new, large to small or dissimilar functions.

PATENT DOCUMENT: Japan Registered Patent #4157096

DETAILED DESCRIPTION

Problems to be Solved

The present invention aims to provide a belt member that can prevent, when stacked, a belt member from falling out.

This present invention aims to provide an articulated cable guiding device, with less components, and is capable to be easily cut and connected, that can securely, and smoothly guide a cable or cables in either straight or bending postures.

With the cable guiding device and its stopper, the present invention also permits easy assembly and disassembly of the machine frame-side stationary end-side connector unit or a moving end-side connector unit.

The present invention aims to provide a cable guiding device and a stationary side thereof that can accommodate multiple cables by stacking flexible belt members.

The objectives of the present invention are not limited to the aforesaid purposes, and any purposes other than those specified above shall be explicitly understood by a person skilled in the art from the following descriptions.

Solution to Solve the Problem

In order to solve the aforementioned problems, there is provided a belt member comprising: a tubular body; and #1 protrusion area located at the #1 predetermined position of the body.

There is provided a belt member wherein the cross-sectional shape of the body is circular or elliptical.

Further, there is provided a belt member wherein the #1 predetermined position of the body consists of the top or bottom surface of the body.

Further, there is provided a belt member including #2 protrusion area located at the #2 predetermined position of the body, wherein the #1 predetermined position conforms the bottom surface of the body, and the #2 predetermined position conforms the top surface of the body.

Further, there is provided a belt member comprising layer #1 belt member, wherein, with regard to layer #2 belt member stacked on top of the layer #1 belt member: the layer #1 belt member includes #1 and #2 units of layer #1 belt member; the layer #2 belt member includes #1 and #2 units of layer #2 belt member together with #1 space conformed by the assembly of the #1 and #2 units of layer #1 belt member; #1 unit of the layer #2 belt member includes #1-1 protrusion area located at #1-1 predetermined position of #1-1 body; #2 unit of the layer #2 belt member includes

1-2 protrusion area located at #1-2 predetermined position of #1-2 body; and the #1-1 or #1-2 protrusion area is inserted to the #1 space.

Further, there is provided a belt member wherein the #1 space is located above the layer #1 belt member, the #1-1 predetermined position is the bottom surface of the #1-1 body, and the #1-2 predetermined position is the bottom surface of the #1-2 body.

Further, there is provided a belt member comprising layer #1 belt member, wherein, with regard to layer #2 belt member stacked on top of the layer #1 belt member: the layer #1 belt member includes #1 and #2 units of layer #1 belt member; the layer #2 belt member includes #1 and #2 units of layer #2 belt member together with #1 space conformed by the assembly of the #1 and #2 units of layer #1 belt member also together with #2 space conformed by the assembly of the #1 and #2 units of layer #2 belt member; #1 unit of the layer #1 belt member includes #1-1 protrusion area located at #1-1 predetermined position of #1-1 body; #2 unit of the layer #1 belt member includes #1-2 protrusion area located at #1-2 predetermined position of #1-2 body; #1 unit of the layer #2 belt member includes #2-1 protrusion area located at #2-1 predetermined position of #2-1 body; #2 unit of the layer #2 belt member includes #2-2 protrusion area located at #2-2 predetermined position of #2-2 body; the #2-1 or #2-2 protrusion area is inserted to the #1 space; and the #1-1 or #1-2 protrusion area is inserted to the #2 space.

Further, there is provided a belt member wherein the #1 space is located above the layer #1 belt member; the #2 space is located under the layer #2 belt member; the #1-1 predetermined position is the top surface of the #1-1 body; the #1-2 predetermined position is the top surface of the #1-2 body; the #2-1 predetermined position is the bottom surface of the #2-1 body; and the #2-2 predetermined position is the bottom surface of the #2-2 body.

Further, there is provided a belt member comprising layer #1 belt member, wherein, with regard to layer #2 belt member stacked on top of the layer #1 belt member: the layer #1 belt member includes #1 and #2 units of layer #1 belt member; the layer #2 belt member includes #1 and #2 units of layer #2 belt member; #1 unit of the layer #2 belt member includes #1-1 protrusion area located at #1-1 pre-determined position of #1-1 body; #2 unit of the layer #2 belt member includes #1-2 protrusion area located at #1-2 pre-determined position of #1-2 body; the #1 unit of layer #2 belt member includes #1 space between #2-1 and #2-2 protrusion areas: where #2-1 protrusion area is located at #2-1 prede-termined position of #2-1 body, and #2-2 protrusion area is located at #2-2 predetermined position of #2-1 body, adja-cent to the #2-1 protrusion area; the #2 unit of layer #2 belt member includes #1 space between #2-1 and #2-2 protrusion areas: where #2-1 protrusion area is located at #2-1 prede-termined position of #2-2 body, and #2-2 protrusion area is located at #2-2 predetermined position of #2-2 body, adja-cent to the #2-1 protrusion area; the #1-1 protrusion area is inserted to the #1 space; and the #1-2 protrusion area is inserted to the #2 space.

Further, there is provided a belt member sub-unit com-prising: #1 belt member unit including the tubular-shaped #1 body; #2 belt member unit including the tubular-shaped #2 body immediately adjacent to the #1 belt member unit; protrusion area wherein the first layer is connected to #1 body, and other layers are connected to #2 body; and the space between the #1 belt member unit and the #2 belt member unit.

Further, there is provided a belt member sub-unit wherein the protrusion area comprises: #1 slope from #1 predeter-mined position of #1 body continued to #1 direction of the #1 body; #2 slope from #2 predetermined position of #2 body continued to #2 direction of the #2 body; and the line at which #1 and #2 slopes meet.

Further, there is provided a belt member sub-unit wherein the belt member sub-unit features a continuous form of the #1 belt member unit and #2 belt member unit.

Further there is provided a belt member sub-unit wherein the space is, reference to the line connecting the #1 belt member sub-unit and #2 belt member sub-unit, located opposite to the protrusion area.

Further, there is provided a belt member comprising layer #1 belt member, wherein, with regard to layer #2 belt member stacked on top of the layer #1 belt member: the layer #1 belt member includes #1 belt member sub-unit, and the #1 belt member sub-unit comprises #1-1 belt member unit and #1-2 belt member unit immediately adjacent to the #1-1 belt member unit; the layer #1 belt member includes #2 belt member unit, and the #2 belt member sub-unit com-prises #2-1 belt member unit and #2-2 belt member unit immediately adjacent to the #2-1 belt member unit; the #1-1 belt member unit includes tubular-shaped #1-1 body; the #1-2 belt member unit includes tubular-shaped #1-2 body; the #2-1 belt member unit includes tubular-shaped #2-1 body; the #2-2 belt member unit includes tubular-shaped #2-2 body; the #1 belt member sub-unit comprises: #1 protrusion area wherein the first layer is connected to #1-1 body and other layers are connected to #1-2 body, and #1 space located between the #1-1 and #1-2 belt member units; and the #2 belt member sub-unit comprises: #2 space located between the #2-1 and #2-2 belt member units; and the #1 protrusion area is located in the #2 space.

Further, there is provided a belt member wherein the layer #2 belt member is located above the layer #1 belt member, whilst, the layer #2 belt member is aligned in parallel with layer #1 belt member.

Further, there is provided a belt member comprising the #2 belt member sub-unit where the #2 belt member sub-unit includes #2 protrusion area where the first layer is connected to #2-1 body and other layers are connected to the #2-2 body; provided that the #2 protrusion area comprises #2-1 slope from #2-1 predetermined position of #2-1 body con-tinued to #2-1 direction of the #2-1 body; #2-2 slope from #2-2 predetermined position of #2-2 body continued to #2-2 direction of the #2-2 body; and the line at which #2-1 and #2-2 slopes meet.

Further, there is provided a belt member sub-unit com-prising: layer #1 body including tubular-shaped #1 body and tubular-shaped #2 body arranged continuous to the #1 body; and layer #2 body located at #1 area of the layer #1 body including tubular-shaped protrusion body located between the layer #1 body and the layer #2 body.

Further, there is provide a belt member sub-unit where cables are inserted to the protrusion body.

Further, there is provided a belt member sub-unit wherein the protrusion body comprises: #1 slope from #1 predeter-mined position of #1 body continued to #1 direction of the #1 body; #2 slope from #2 predetermined position of #2 body continued to #2 direction of the #2 body; and the line at which #1 and #2 slopes meet.

Further, there is provided a belt member sub-unit wherein the contact line is displaced from the #1 predetermined position of #1 body and the #2 predetermined position of #2 body, thus the protrusion body protrudes from the #1 body and the #2 body where cables are inserted in the space conformed by the displacement.

Further, there is provided a belt member comprising layer #1 body and layer #2 body where: the layer #1 body includes tubular-shaped #1 body, tubular-shaped #2 body arranged continuous to the #1 body, and tubular-shaped #3 body arranged continuous to the #2 body; and the layer #2 body includes tubular-shaped #1 protrusion body located at #1 area of layer #1 body between the #1 body and the #2 body, and #2 protrusion body located at #2 area of layer #1 body between the #2 body and the #3 body.

Further, there is provided a belt member wherein: the #1 protrusion body comprises #1-1 slope from #1 predetermined position of #1 body continued to #1 direction of the #1 body, #1-2 slope from #2 predetermined position of #2 body continued to #2 direction of the #2 body, and the line at which the #1-1 and #1-2 slopes meet; and the #2 protrusion body comprises #2-1 slope from #3 predetermined position of #2 body continued to #3 direction of the #2 body, #2-2 slope from #4 predetermined position of #3 body continued to #4 direction of the #3 body, and the line at which the #2-1 and #2-2 slopes meet.

Advantages of Invention

According to the invention specified above, by inserting and placing each protrusion area of layer #2 belt member in each opening of layer #1 belt member, the layer #1 belt member and the layer #2 belt member can be prevented from falling out.

Further, this present invention provides an articulated cable guiding device and stopper thereof, with less components, and is capable to be easily cut and connected, that can securely, and smoothly guide a cable or cables in either straight or bending postures.

With the cable guiding device and its stopper, the present invention also permits easy assembly and disassembly of layer #1-side stationary end-side or of layer #1-side stationary end-side.

The present invention also provides a cable guiding device and a stationary side thereof that can accommodate multiple cables by stacking flexible belt members.

BRIEF DESCRIPTION OF DRAWINGS

FIG. 7a and FIG. 7b are schematic drawings provided to explain the assembly of #1 stopper of the present invention and the exterior tubular part of a flexible belt member.

FIG. 10b is the cross sectional drawing of I-I line from FIG. 10a.

FIG. 11b is the cross sectional drawing of II-II line from FIG. 11a.

FIG. 12b is the cross sectional drawing of III-III line from FIG. 12a.

FIG. 16b is the cross sectional drawing of IV-IV line from FIG. 16a.

FIG. 17b is the cross sectional drawing of V-V line from FIG. 17a.

EMBODIMENTS

Figure 1A:
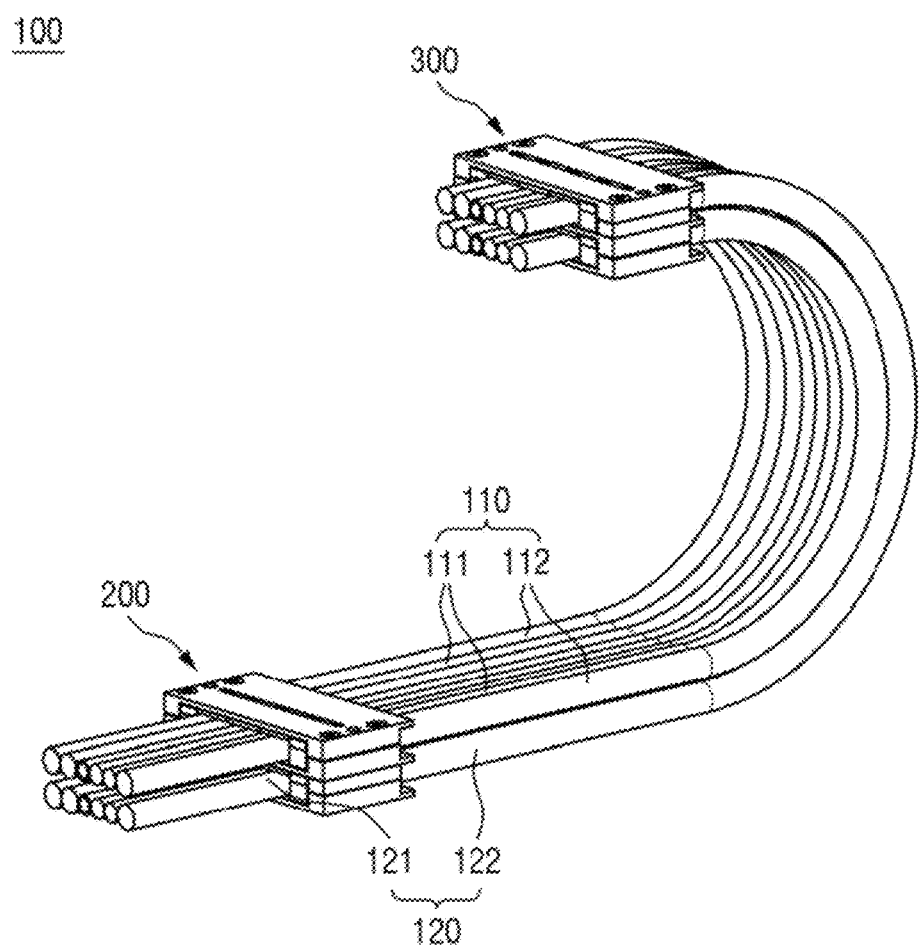
FIG. 1a is a perspective view of the cable guiding device of the present invention.

The advantages, features of the present invention and the manners to achieve them will become apparent from consideration of the enclosed drawings and ensuing descriptions of embodiments.

For a more complete understanding of the present disclosure, reference is now made to the following brief description, taken in connection with the accompanying drawing, and detailed description. Regardless to the drawing wherein a component may be presented, same numerals shall represent identical members, whereas the term "and/or" shall refer to each of the mentioned items or a combination of one or more mentioned items.

Despite the expression of #1, #2, etc. are employed to describe various components, such components shall not be limited by such references. Such terms are used only to distinguish one component to another. Thus, any #1 component provided in the ensuing description may refer to a #2 component in the technical context of the present invention.

Terms used in this specification are adopted to explain the embodiments, and in no case shall limit the scope of this invention. Unless explicitly specified otherwise, the singular shall include the plural and vice versa. The terms "comprises" and/or "comprising" in this specification shall not exclude the existence or addition of one or more component other than those described.

Unless defined otherwise, any/all term used in this specification, including technological and scientific terms, shall be construed as accepted by a person skilled in the art of the present invention. Furthermore, unless explicitly defined otherwise, other terms that are generally used or defined in the common dictionary shall not be construed in an ideal or excessive manner.

Spatially relevant terms such as "below", "beneath", "lower", "above", and "upper" may be used for the convenience of describing one component relevant to other components as presented in drawings. Addition to indicating directions shown on drawings, spatially relevant terms shall be construed to indicate different directions of components when used or activated. For instance, if a component in a drawing is turned upside down, a technical component described to be "below" or "beneath" another component may be placed "above" such other component. Therefore, an exemplary term "below" may include both directions of "below" and "above". Components may be arranged in different orientations, thus, spatially relevant terms may be construed according to the relevant orientation.

Appropriate embodiments of the present invention are explained in detail with reference to the annexed drawings.

Figure 1B:
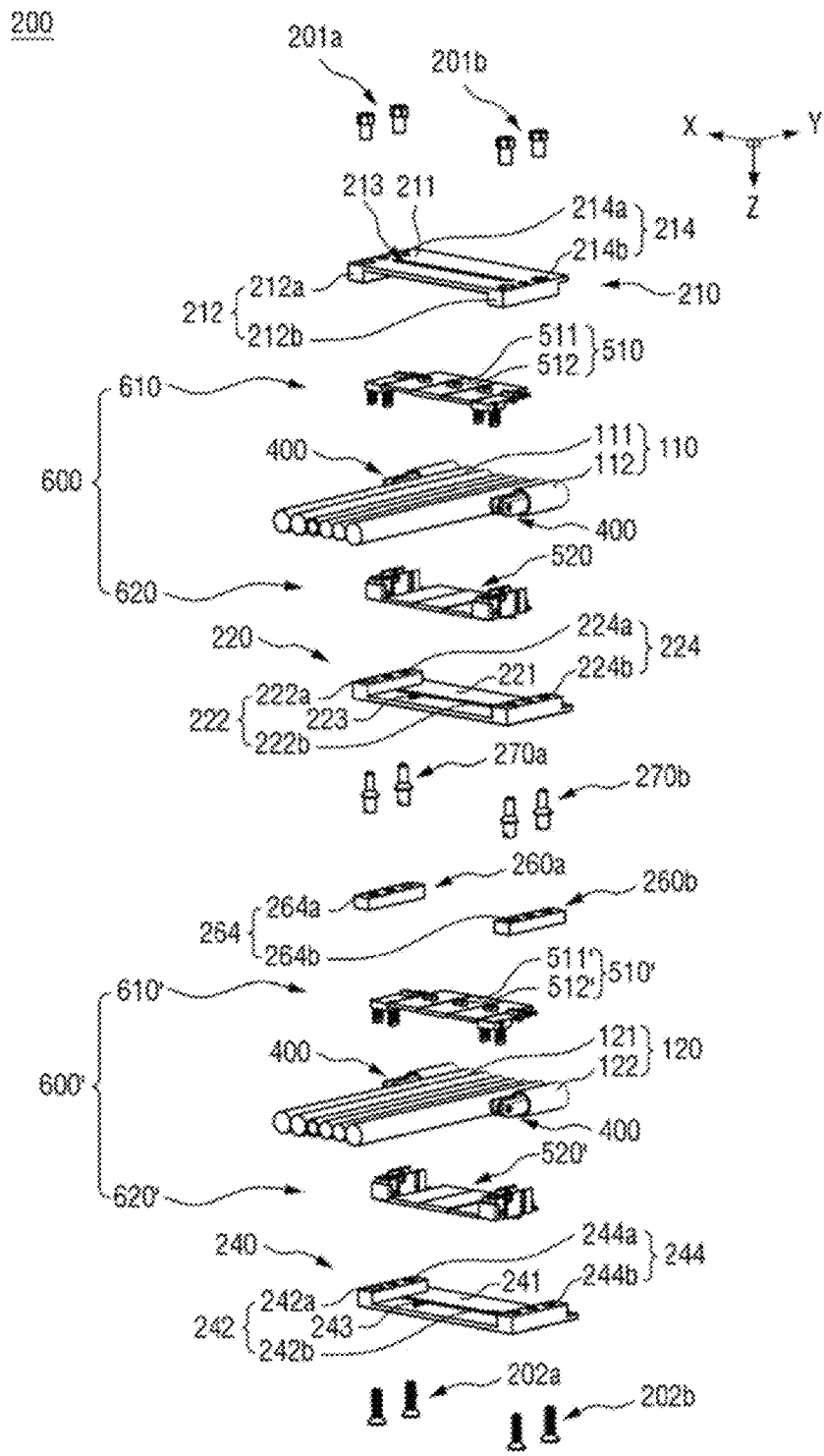
FIG. 1b is an assembly and exploded view of layer #1-side stationary side of the cable guiding device of the present invention.
Figure 1C:
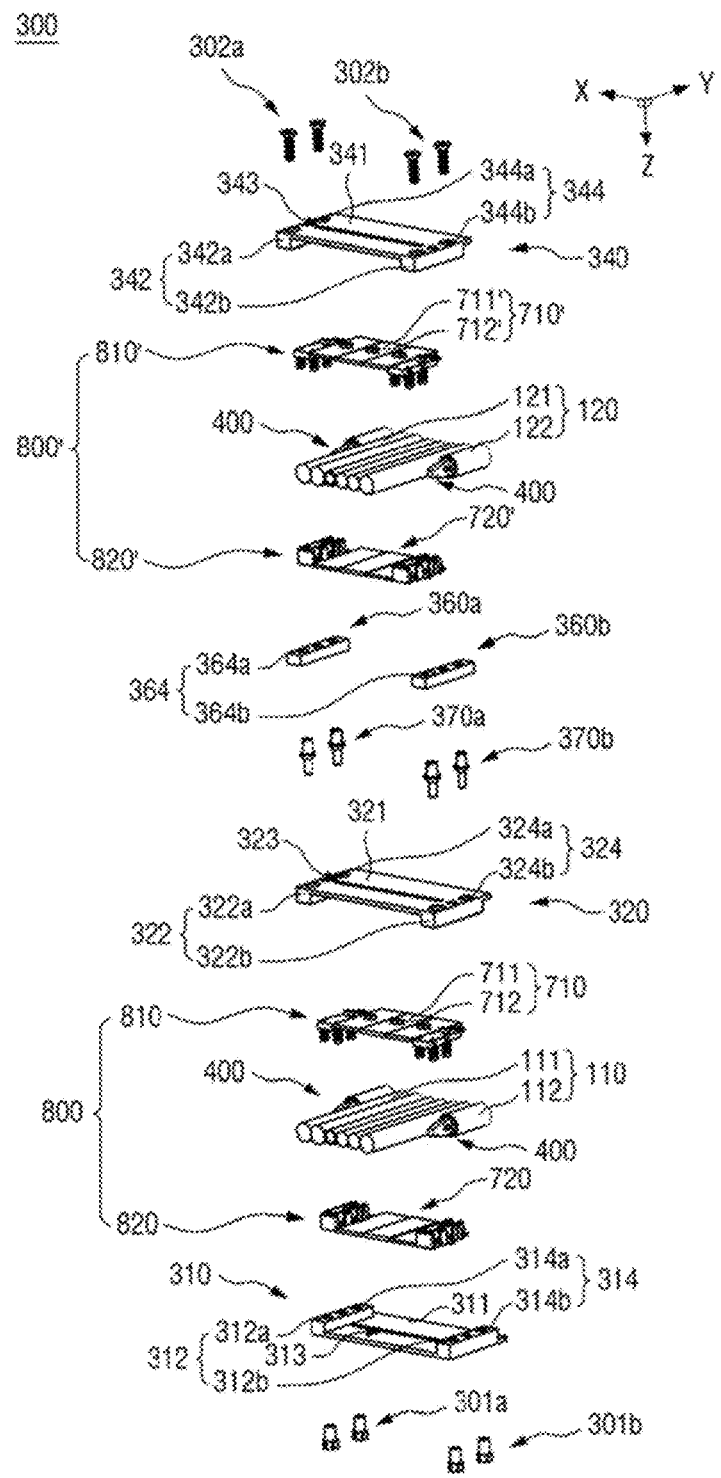
FIG. 1c is an assembly and exploded view of layer #2-side stationary side of the cable guiding device of the present invention.
Figure 2A:
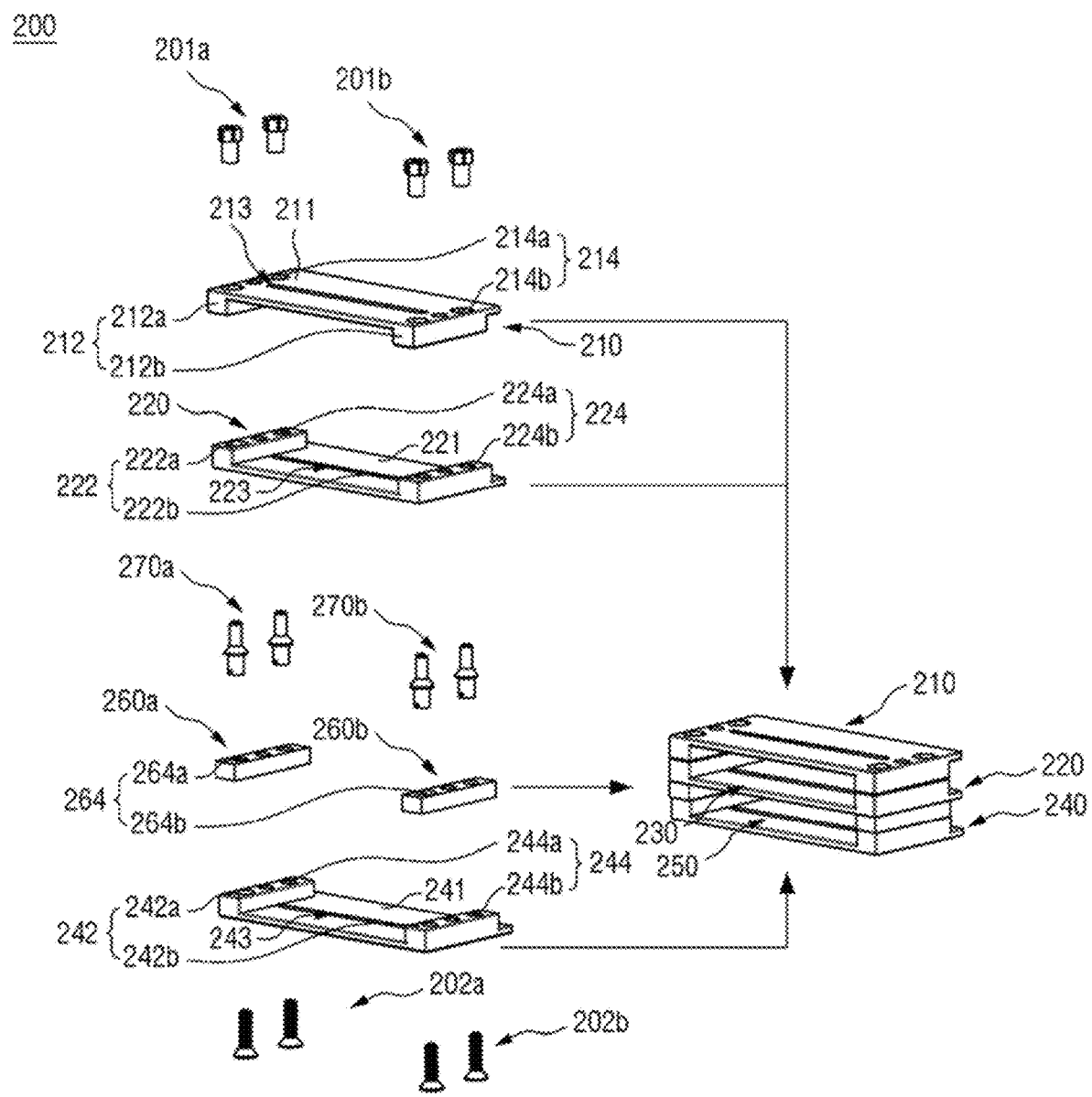
FIG. 2a is an assembly and exploded view presented to explain the assembly of layer #1-side stationary side and #1 clamp.
Figure 2B:
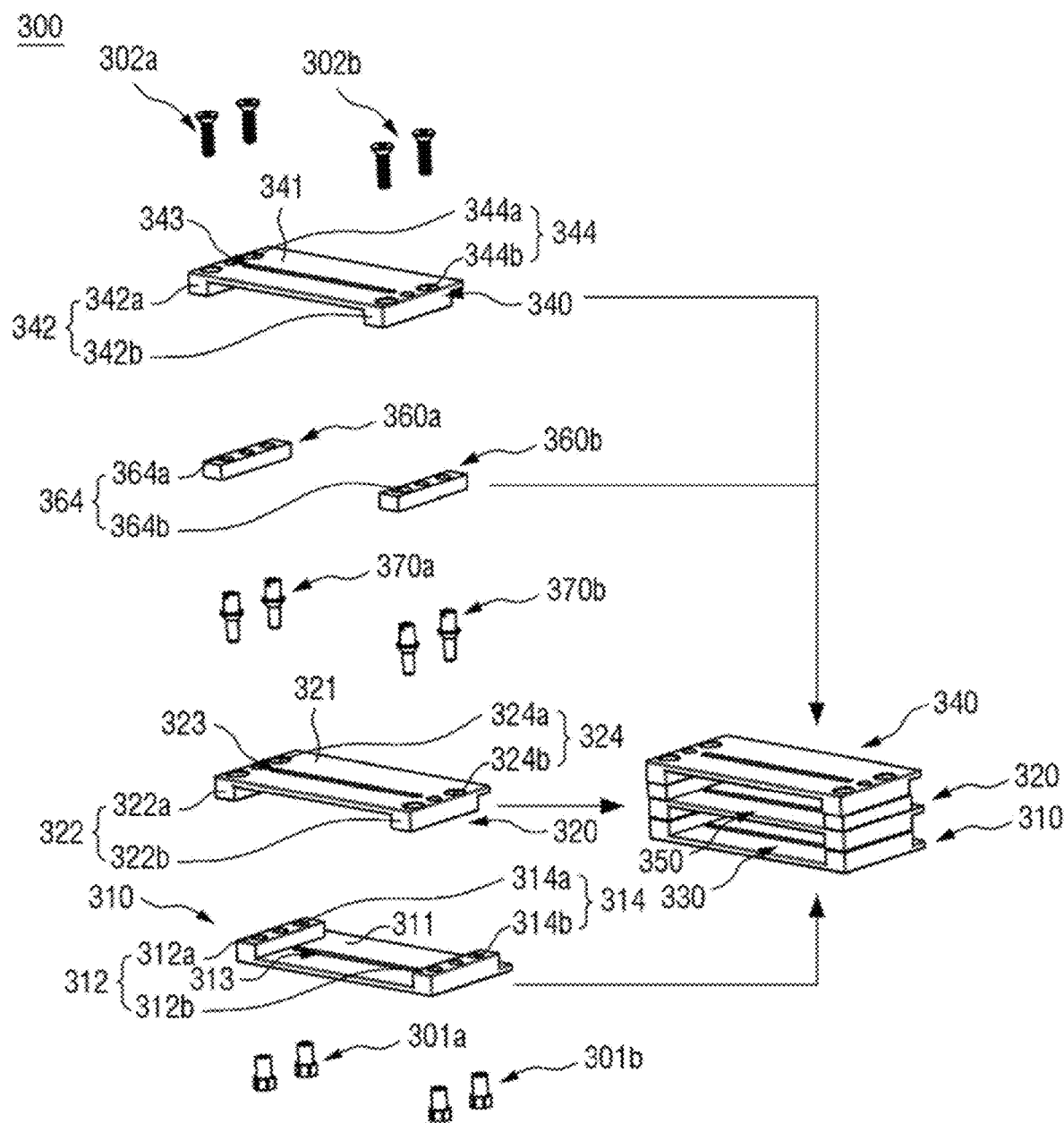
FIG. 2b is an assembly and exploded view presented to explain the assembly of layer #2-side stationary side and #2 clamp.

FIG. 1a is a perspective view of the cable guiding device of the present invention; FIG. 1b is an assembly and exploded view of layer #1-side stationary side of the cable guiding device of the present invention; FIG. 1c is an assembly and exploded view of layer #2-side stationary side of the cable guiding device of the present invention; FIG. 2a is an assembly and exploded view presented to explain the assembly of layer #1-side stationary side and #1 clamp; and FIG. 2b is an assembly and exploded view presented to explain the assembly of layer #2-side stationary side and #2 clamp.

As mentioned above, the present invention is related to a cable guiding device that protects and guides flexible cables or hoses which may be electric cables, optical fiber cables, fluid supply hoses (hereinafter referred to as a "cable"). The cable is used for machine tools, electronic devices, industrial robots, transportation machines and others, to feed electricity, fluid, air and other things to those moving machines or to a moving part of the machines.

For the convenience of explaining FIG. 1a through FIG. 1c, the belt member of the present invention is presented in the shape of generally applied belt members, whereas detail features of the belt member of the present invention shall be provided later.

With reference to FIG. 1a, first, the cable guiding device 100 of the present invention comprises layer #1 flexible member 110, and layer #2 flexible member 120 stacked with the layer #1 flexible member 110.

Where, the drawing indicates the layer #1 flexible belt member 110 and the layer #2 flexible belt member 120 are stacked in a manner where layer #2 flexible belt member 120 is stacked beneath layer #1 flexible belt member 110, the present invention does not limit the order of stacking; further the drawing indicates flexible belt members to be stacked in 2 layers, however flexible belt members may be stacked in 2 or more layers, where the present invention does not limit the number of layers to which flexible members are stacked.

For the convenience of description, the layer #1 flexible belt member 110 and the layer #2 flexible belt member 120 shall be collectively referred to as "stacked flexible belt members".

Further, the cable guiding device 100 of the present invention comprises: layer #1-side stationary side 200 connected with one side of the stacked flexible belt member; and layer #2-side stationary side 300 connected with the other side of the stacked flexible belt member.

Where, the layer #1-side may be a stationary end, and the layer #2-side may be a moving end, thus, the layer #1-side stationary side 200 may be a stationary side of stationary end, and the layer #2-side stationary side 300 may be a stationary side of moving end.

Further, the layer #1 flexible belt member 110 comprises: multiple #1 internal tubular members 111 that accommodates a cable; one couple of #1 external tubular member 112 accommodating an articulated supporting member, which are each located outside of the #1 internal tubular members.

Further, the layer #2 flexible belt member 120 comprises: multiple #2 internal tubular members 121 that accommodates a cable; one couple of #2 external tubular member 122 accommodating an articulated supporting member, which are each located outside of the #2 internal tubular members.

Where, the drawing indicates 6 internal tubular members, the number of multiple internal tubular members may differ upon the user's needs, thus, the present invention does not limit the number of the multiple internal tubular members.

Whereas the flexible belt member may be fabricated by integrating the multiple internal tubular members and a couple of external tubular members adjoined to the left and right side of the internal tubular members, parallel thereto, or by assembling the multiple internal tubular members and a couple of external tubular members adjoined to the left and right side of the internal tubular members with prescribed adhesion means. However, the present invention does not limit the configuration of the flexible belt member.

Detail descriptions for layer #1-side stationary side 200 and layer #2-side stationary side 300 of the cable guiding device 100 of the present invention are provided. The terms "top" and "bottom" may be presented in the description, yet such orientations are defined according to the annexed drawing, only for the convenience of description, to the extent where the terms "top" and "bottom" may be substituted with "bottom" and "top", according to the orientation, thus the present invention shall not be limited by the terms "top" and "bottom".

With reference to FIG. 1b and FIG. 2a, the layer #1-side stationary side 200 of the cable guiding device 100 of the present invention comprises: layer #1-side #1 clamp member 210; layer #1-side #2 clamp member 220 forming #1 specific space 230 by adjoining the layer #1-side #1 clamp member 210; and layer #1-side #3 clamp member 240 forming #2 specific space 250 by adjoining the layer #1-side #1 clamp member 220.

In particular, the layer #1-side #1 clamp member 210 comprises: #1-1 plate 211; #1-1 spacer 212 that is located at one side of the #1-1 plate 211 and is extended in the transverse direction Y-axis of the #1-1 plate 211; and #1-1 slit 213 that is extended in the longitudinal direction X-axis of the #1-1 plate 211.

Where the #1-1 spacer 212 comprises #1-1 spacer for one side 212a located at one side of the #1-1 plate 211 and #1-1 spacer for the other side 212b located at the other side of the #1-1 plate 211.

Further, the layer #1-side #1 clamp member 210 comprises the #1-1 plate 211 and #1-1 fastening hole 214 penetrating through the #1-1 spacer 212, while the #1-1 fastening hole 214 comprises #1-1 fastening hole for one side 214a located at one side of the #1-1 plate 211, and #1-1 fastening hole for the other side 214b located at the other side of the #1-1 plate 211.

The layer #1-side #2 clamp member 220 comprises: #1-2 plate 221; #1-2 spacer 222 that is located at one side of the #1-2 plate 221 and is extended in the transverse direction Y-axis of the #1-2 plate 221; and #1-2 slit 223 that is extended in the longitudinal direction X-axis of the #1-2 plate 221.

The #1-2 spacer 222 comprises #1-2 spacer for one side 222a located at one side of the #1-2 plate 221 and #1-2 spacer for the other side 222b located at the other side of the #1-1 plate 221.

Further, the layer #1-side #2 clamp member 220 comprises the #1-2 plate 221 and #1-2 fastening hole 224 penetrating through the #1-2 spacer 222, while the #1-2 fastening hole 224 comprises #1-2 fastening hole for one side 224a located at one side of the #1-2 plate 221, and #1-2 fastening hole for the other side 224b located at the other side of the #1-2 plate 221.

As illustrated in FIG. 1b and FIG. 2a, the #1-1 spacer for one side 212a and the #1-2 spacer for the other side 222a shall be adjoined in a manner facing each other, while the #1-1 spacer for one side 212b and the #1-2 spacer for the other side 222b shall be adjoined in a manner facing each other, allowing the layer #1-side stationary side 200 to form the #1 specific space 230 by adjoining the layer #1-side #1 clamp member 210 and the layer #1-side #2 clamp member 220.

Further, as presented in FIG. 1a through FIG. 1c, multiple #1 internal tubular members 111 that accommodate cable, and layer #1-side of the #1 flexible belt member 110 including a couple of #1 external tubular member 112 that accommodates articulated supporting member located exterior of the #1 internal tubular member are inserted in the #1 specific space 230, thus, the layer #1-side of the #1 flexible belt member 110 is fixed and supported by the layer #1-side stationary side 200.

As illustrated in FIG. 1b, the multiple #1 internal tubular members 111 can accommodate cables not shown in drawing, and the each of the couple of #1 external tubular members 112 accommodate articulated supporting members 400.

With reference to FIG. 1b and FIG. 2a, the layer #1-side #3 clamp member 240 comprises: #1-3 plate 241; #1-3 spacer 242 that is located at one side of the #1-3 plate 241 and is extended in the transverse direction Y-axis of the #1-3 plate 241; and #1-3 slit 243 that is extended in the longitudinal direction X-axis of the #1-3 plate 241.

Where the #1-3 spacer 242 comprises #1-3 spacer for one side 242a located at one side of the #1-3 plate 241 and #131 spacer for the other side 242b located at the other side of the #1-3 plate 241.

Further, the layer #1-side #3 clamp member 240 comprises the #1-3 plate 241 and #1-3 fastening hole 244 penetrating through the #1-3 spacer 242, while the #1-3 fastening hole 244 comprises #1-3 fastening hole for one side 244a located at one side of the #1-3 plate 241, and #1-3 fastening hole for the other side 244b located at the other side of the #1-3 plate 241.

Further, the present invention includes layer #1-side auxiliary spacer 260a, 260b located between the layer #1-side #2 clamp member 220 and the layer #1-side #3 clamp member 240, where the layer #1-side auxiliary spacer 260a, 260b comprises: layer #1-side #1 auxiliary spacer 260a that is in contact with the #1-3 spacer for one side 242a; and layer #1-side #2 auxiliary spacer 260b that is in contact with the #1-3 spacer for the other side 242b.

The layer #1-side #1 auxiliary spacer 260a, located in the area corresponding to the #1-2 fastening hole for one side 224a and #1-3 fastening hole for one side 244a comprises: layer #1-side #1 auxiliary spacer fastening hole 264a penetrating through the layer #1-side #1 auxiliary spacer 260a, while the layer #1-side #2 auxiliary spacer 260b, located in the area corresponding to the #1-2 fastening hole for the other side 224b and #1-3 fastening hole for the other side 244b comprises: layer #1-side #2 auxiliary spacer fastening hole 264b penetrating through the layer #1-side #1 auxiliary spacer 260b.

As illustrated in FIG. 1b and FIG. 2a, the #1-3 spacer for one side 242a and the layer #1-side #1 auxiliary spacer 260a shall be adjoined in contact, while the #1-3 spacer for the other side 242b and the layer #1-side #2 auxiliary spacer 260b shall be adjoined in contact, allowing the layer #1-side stationary side 200 to form the #2 specific space 250 by adjoining the layer #1-side #3 clamp member 240 and the layer #1-side #2 clamp member 220.

Further, as presented in FIG. 1a through FIG. 1c, multiple #2 internal tubular members 121 that accommodate cable, and layer #1-side of the #2 flexible belt member 120 including a couple of #2 external tubular member 122 that accommodates articulated supporting member located exterior of the #2 internal tubular member are inserted in the #2 specific space 250, thus, the layer #1-side of the #2 flexible belt member 120 is fixed and supported by the layer #1-side stationary side 200.

As illustrated in FIG. 1b, the multiple #2 internal tubular members 121 can accommodate cables not shown in drawing, and the each of the couple of #2 external tubular members 122 accommodate articulated supporting members 400.

With reference to FIG. 1b and FIG. 2a, the layer #1-side stationary side 200 of the present invention includes #1-1 stopper 600 located at the #1 specific space 230 to be adjoined with the end of one side of the articulated supporting member 400.

Where the #1-1 stopper 600 includes a couple of #1-1 stoppers 600 provided to each adjoin with each articulated supporting member 400 that are accommodated the one couple of #1 external tubular member 112.

The couple of #1-1 stoppers 600 have the same structure, whereas the following provides descriptions to a single #1-1 stopper 600.

The #1-1 stopper 600 comprises upper #1-1 stopper 610 and lower #1-1 stopper 620 that is adjoined with the upper #1-1 stopper 610.

Detail configuration of the #1-1 stopper 600 shall be addressed later in this specification.

With reference to FIG. 1a and FIG. 1b, the layer #1-side stationary side 200 of the cable guiding device 100 claimed by the present invention comprises: #1-1 pressurizing unit 510 located above the #1 specific space 230 and between a couple of #1-1 stoppers 600, in the longitudinal direction X-axis of the #1-1 plate 211; and #1-2 pressurizing unit 520 located beneath the #1 specific space 230 and between a couple of #1-1 stoppers 600, and in the longitudinal direction X-axis of the #1-2 plate 221.

Where the #1-1 pressurizing unit 510 comprises: #1-1 pressurizing plate 511; and #1-1 lump area 512 that is located on one side of the #1-1 pressurizing plate 511 and is inserted to the #1-1 slit 213 of the #1-1 plate 211.

Thus, by inserting the #1-1 lump 512 in the #1-1 slit 213 of the #1-1 plate 211, the #1-1 pressurizing unit 510 can be prevented from moving in transverse Y-axis of the #1-1 plate 211.

The #1-1 pressurizing unit 510 is provided to apply pressure from the top of the multiple #1 internal tubular members 111 that accommodate cable, thus the #1-1 pressurizing unit 510 can prevent the multiple #1 internal tubular members 111 falling off from the #1 predetermined position 230.

Where, the drawing indicates 3 pressurizing units 510, the number of the #1-1 pressurizing unit 510 can be determined by the number and width of each the multiple #1 internal tubular members 111, thus, the present invention does not limit the number of the #1-1 pressurizing unit 510.

The #1-2 pressurizing unit 520 is located symmetric to the #1-1 pressurizing unit 510, and comprises: #1-2 pressurizing plate no numeric, not shown in drawing; and #1-2 lump area not shown in drawing that is located on one side of the #1-2 pressurizing plate and inserted to the #1-2 slit 223 of the #1-2 plate 221.

Thus, by inserting the #1-2 lump not shown in drawing in the #1-2 slit 223 of the #1-2 plate 221, the #1-2 pressurizing unit 520 can be prevented from moving in transverse Y-axis of the #1-2 plate 221.

The #1-2 pressurizing unit 520 is provided to apply pressure from the top of the multiple #1 internal tubular members 111 that accommodate cable, thus the #1-2 pressurizing unit 520 can prevent the multiple #1 internal tubular members 111 falling off from the #1 predetermined position 230.

Where, the drawing indicates 3 pressurizing units 520, the number of the #1-2 pressurizing unit 520 can be determined by the number and width of each the multiple #1 internal tubular members 111, thus, the present invention does not limit the number of the #1-2 pressurizing unit 520.

With reference to FIG. 1b and FIG. 2a, the layer #1-side stationary side 200 of the present invention includes #1-2 stopper 600' located at the #2 specific space 250 to be adjoined with the end of one side of the articulated supporting member 400.

Where the #1-2 stopper 600' includes a couple of #1-2 stoppers 600' provided to each adjoin with each articulated supporting member 400 that are accommodated the one couple of #2 external tubular member 122.

The couple of #1-2 stoppers 600' have the same structure, whereas the following provides descriptions to a single #1-2 stopper 600'.

The #1-2 stopper 600' comprises upper #1-2 stopper 610' and lower #1-1' stopper 620' that is adjoined with the upper #1-2 stopper 610'.

Detail configuration of the #1-2 stopper 600' shall be addressed later in this specification.

With reference to FIG. 1a and FIG. 1b, the layer #1-side stationary side 200 of the cable guiding device 100 claimed by the present invention comprises: #1-3 pressurizing unit 510' located above the #2 specific space 250 and between a couple of #1-2 stoppers 600', and in the longitudinal direction X-axis of the #1-2 plate 221; and #1-4 pressurizing unit 520' located beneath the #2 specific space 250 and between a couple of #1-2 stoppers 600', and in the longitudinal direction X-axis of the #1-3 plate 241.

Where the #1-3 pressurizing unit 510' comprises: #1-3 pressurizing plate 511'; and #1-3 lump area 512' that is located on one side of the #1-3 pressurizing plate 511' and is inserted to the #1-2 slit 223 of the #1-2 plate 221.

Thus, by inserting the #1-3 lump 512' in the #1-2 slit 223 of the #1-2 plate 221, the #1-3 pressurizing unit 510' can be prevented from moving in transverse Y-axis of the #1-2 plate 221.

The #1-3 pressurizing unit 510' is provided to apply pressure from the top of the multiple #2 internal tubular members 121 that accommodate cable, thus the #1-3 pressurizing unit 510' can prevent the multiple #2 internal tubular members 121 falling off from the #2 predetermined position 250.

The #1-4 pressurizing unit 520' is located symmetric to the #1-3 pressurizing unit 510', and comprises: #1-4 pressurizing plate no numeric, not shown in drawing; and #1-4 lump area not shown in drawing that is located on one side of the #1-4 pressurizing plate and inserted to the #1-3 slit 243 of the #1-3 plate 241.

Thus, by inserting the #1-4 lump not shown in drawing in the #1-3 slit 243 of the #1-3 plate 241, the #1-4 pressurizing unit 520' can be prevented from moving in transverse Y-axis of the #1-3 plate 241.

The #1-4 pressurizing unit 520' is provided to apply pressure from the top of the multiple #2 internal tubular members 121 that accommodate cable, thus the #1-4 pressurizing unit 520' can prevent the multiple #2 internal tubular members 121 falling off from the #2 predetermined position 250.

With reference to FIG. 1b and FIG. 2a, the layer #1-side stationary side 200 of the cable guiding device 100 of the present invention a fastener to adjoin the layer #1-side #1 clamp member 210, the layer #1-side #2 clamp member 220, and the layer #1-side #3 clamp member 240.

Where the fastener comprises: #1 fastener 201a, 201b located at the layer #1-side #1 clamp member 210; #2 fastener 202a, 202b located at the layer #1-side #3 clamp member 240; and #3 fastener 270a, 270b which one side is adjoined with the #1 fastener and the other side is adjoined with #3 fastener 270a, 270b.

Thus, the layer #1-side #1 clamp member 210 and layer #1-side #2 clamp member 220 are assembled with the #1 fastener and the #3 fastener; and the layer #1-side #2 clamp member 220 and layer #1-side # clamp member 240 are assembled with the #2 fastener and the #3 fastener.

Where, as illustrated in FIG. 1b and FIG. 2a, the #1 fastener 201a, 201b may be a nut and the #2 fastener 202a, 202b may be a bolt, and conversely, yet not shown in the drawings, the #1 fastener 201a, 201b may be a bolt and the #2 fastener 202a, 202b may be a nut.

Figure 4A:
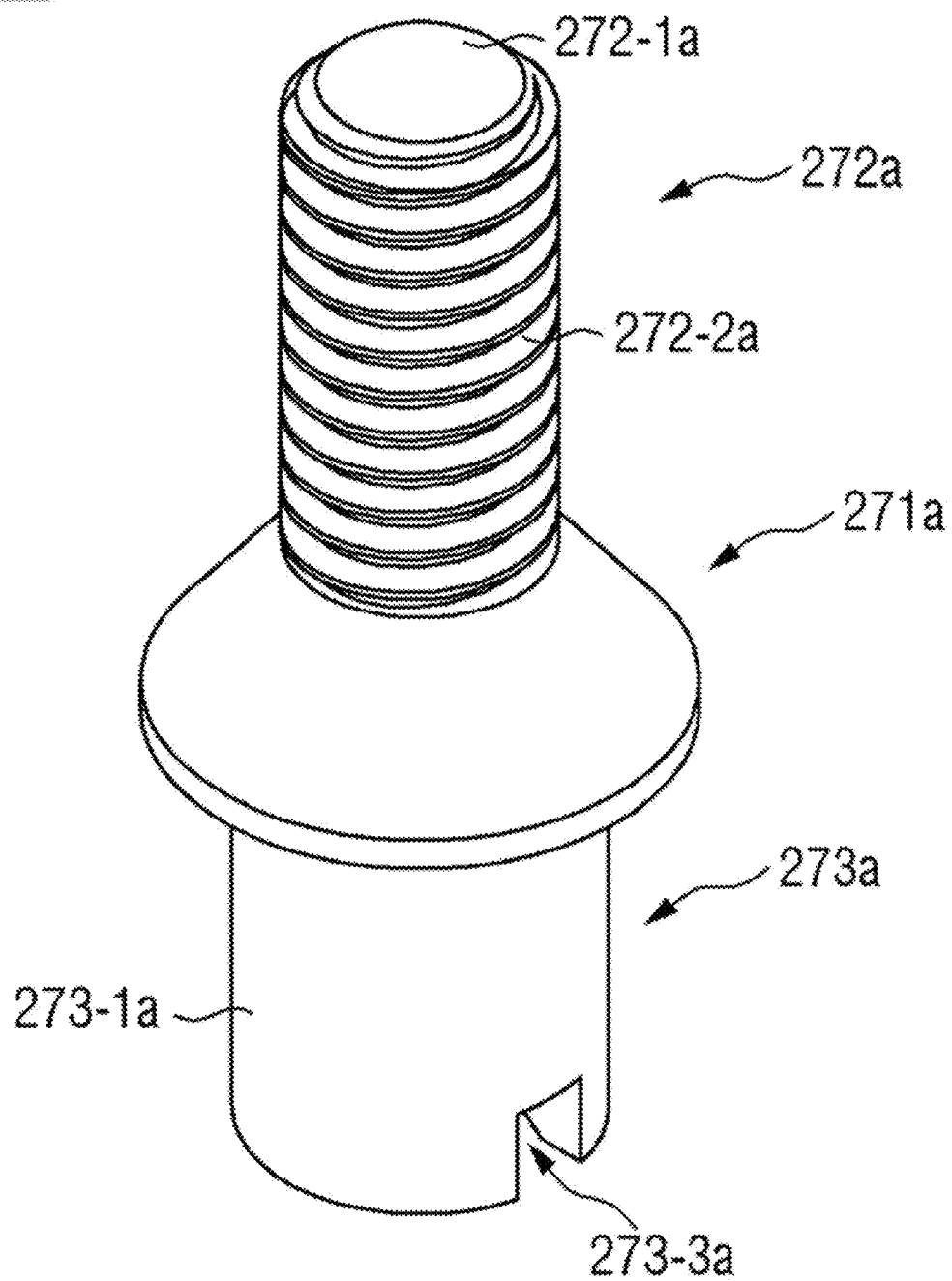
FIG. 4a-4c are dimensional drawings for #3 fastener employed by the present invention.
Figure 4B:
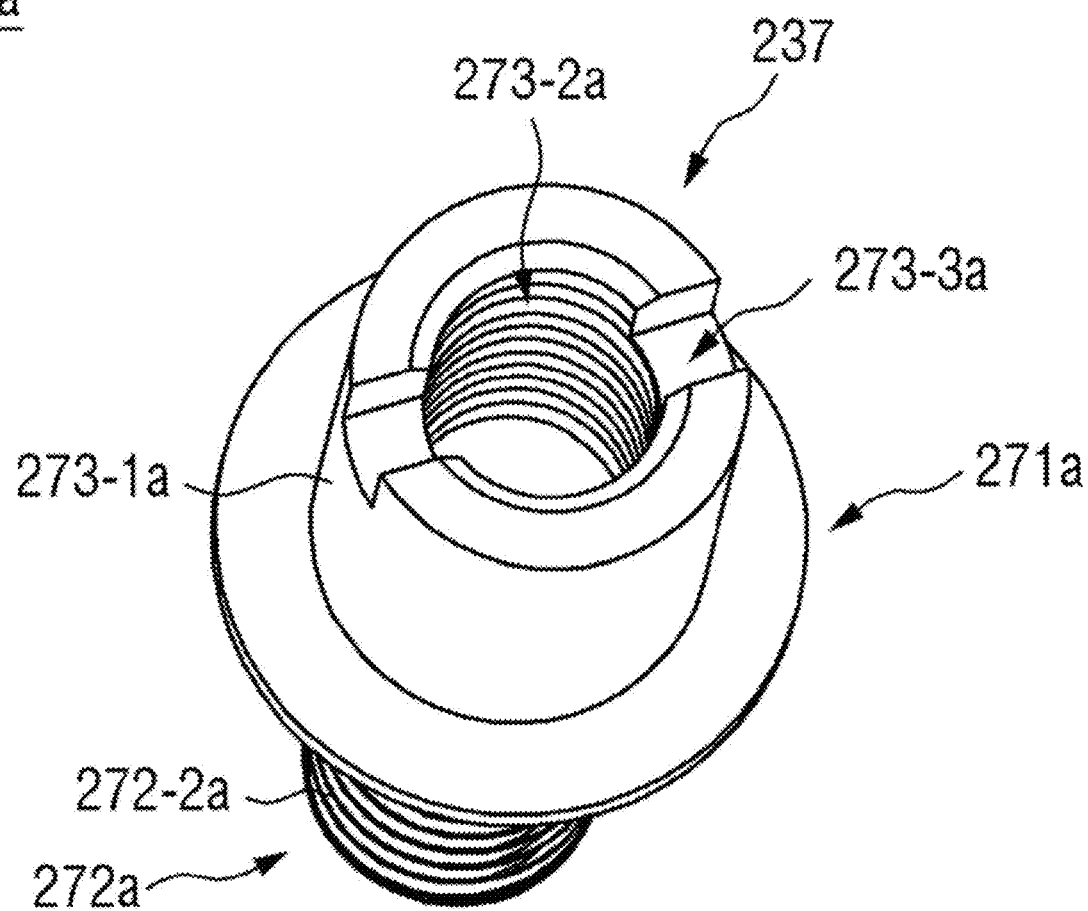
Figure 4C:
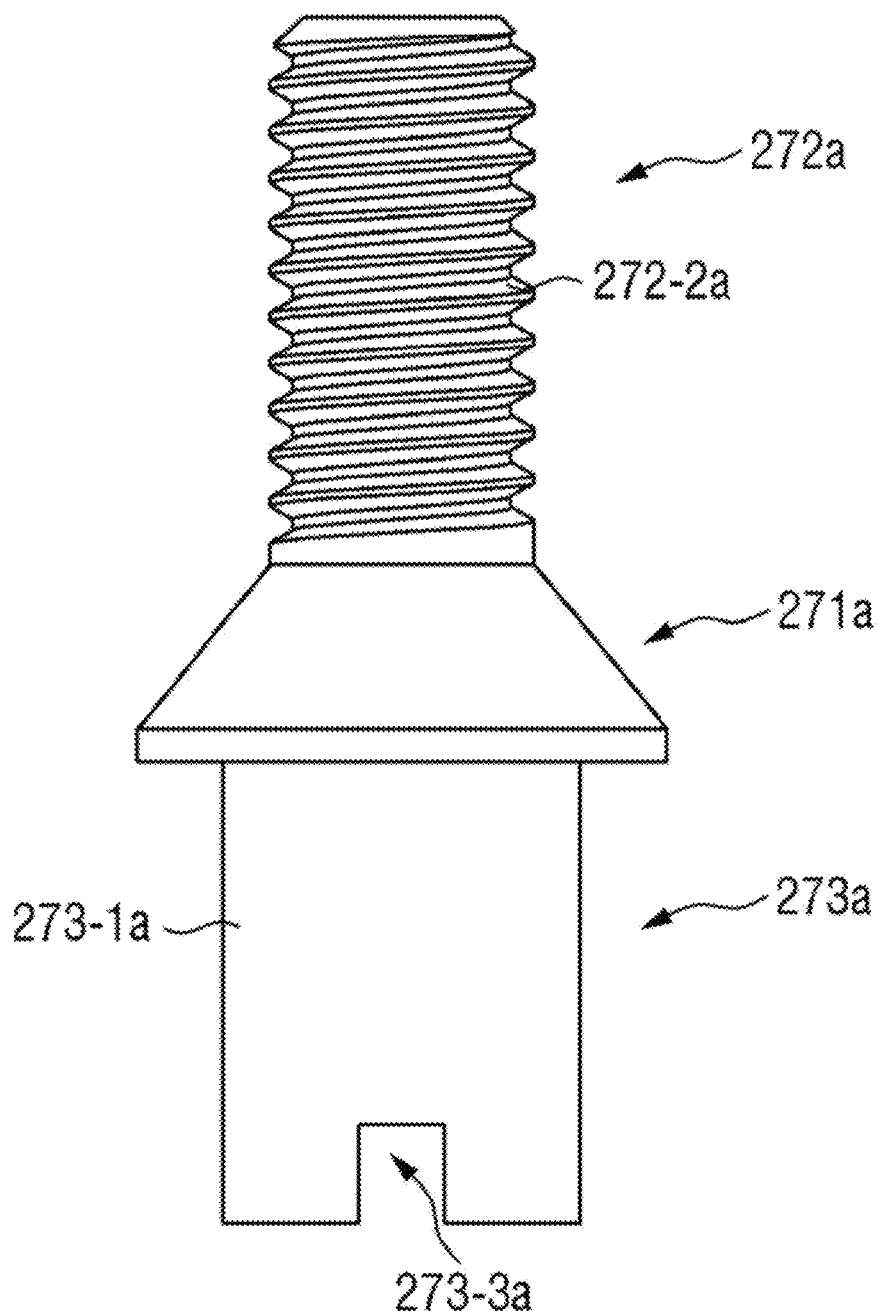

FIG. 4a-4c are dimensional drawings for #3 fastener employed by the present invention.

With reference to FIG. 4a through FIG. 4c, #3 fastener 270a of the present invention comprises: a head 271a; #1 shaft 272a extended toward #1 direction of the head 271a; and #2 shaft 273a extended toward #2 direction of the head 271a.

Where, the #1 shaft 272a of the #3 fastener 270a of the present invention comprises: a cylindrical #1 body 272-1a; and #1 threads 272-2a formed on the external surface of the cylindrical #1 body 272-1a.

Thus, the head 271a and the #1 shaft 272a of the #3 fastener 270a may be construed as a bolt.

Where the head 271a may be in the shape of a phillips round head, or a pan-head; provided that the present invention does not limit the shape of the head.

Where, the #2 shaft 273a of the #3 fastener 270a of the present invention comprises: a cylindrical #2 body 273-1a; and #2 threads 273-2a formed on the external surface of the cylindrical #1 body 273-1a.

Thus, the #2 shaft 272a of the #3 fastener 270a may be construed as a nut.

The #2 shaft 273a comprises a groove 273-3a on top of cylindrical #1 body 273-1a where the #1 shaft can be rotated by using a prescribed driver in the groove 273-3a.

Thus, the layer #1-side #1 clamp member 210 and layer #1-side #2 clamp member 220 are assembled with the #1 fastener and the #3 fastener; and the layer #1-side #2 clamp member 220 and layer #1-side # clamp member 240 are assembled with the #2 fastener and the #3 fastener.

Where, as illustrated in FIG. 1b and FIG. 2a, the #1 fastener 201a, 201b may be a nut and the #2 fastener 202a, 202b may be a bolt, and the #3 fastener comprises: the #1 shaft 272a including #1 thread 272-2a formed on the external surface of the #1 cylindrical body 272-1a; and the #2 shaft 273a including #2 thread 273-2a formed on the internal surface of the #2 cylindrical body 273-1a.

Thus, by adjoining nut-shaped the #1 fastener to the #1 shaft 272a of #3 fastener, and adjoining bolt-shaped the #2 fastener to the #2 shaft 273a of #3 fastener: the layer #1-side #1 clamp member 210 and layer #1-side #2 clamp member 220 are assembled with the #1 fastener and the #3 fastener; and the layer #1-side #2 clamp member 220 and layer #1-side # clamp member 240 are assembled with the #2 fastener and the #3 fastener.

In detail as illustrated in FIG. 1b and FIG. 2a, whilst the #1-1 spacer for one side 212a and the #1-2 spacer for the other side 222a are facing each other, and the #1-1 spacer for one side 212b and the #1-2 spacer for the other side 222b are facing each other, the layer #1-side #1 clamp member 210 and the layer #1-side #2 clamp member 220 may be adjoined by assembling the #1 fastener 201a, 201b with the #3 fastener 270a, 270b.

As illustrated in FIG. 1b and FIG. 2a, whilst the #1-3 spacer for one side 242a and the layer #1-side #1 auxiliary spacer 260a are assembled with contact, and the #1-3 spacer for the other side 242b and the layer #1-side #2 auxiliary spacer 260b are assembled with contact, the layer #1-side #3 clamp member 240 and the layer #1-side #2 clamp member 220 may be adjoined by assembling the #2 fastener 202a, 202b with the #3 fastener 270a, 270b.

The assembly of layer #1-side #1 through #3 clamps with #1 through #3 fasteners is explained in detail below.

FIG. 3a-3g are assembly and exploded views provided to explain the assembly of #1-#3 clamps of layer #1-side with #1-#3 fasteners. The following drawings and accompanying explanations may be applied for assembly of other clamps stated in the present invention. However, assembling clamps with fasteners with relation to the present invention is not limited to the procedure set forth below.

Figure 3A:
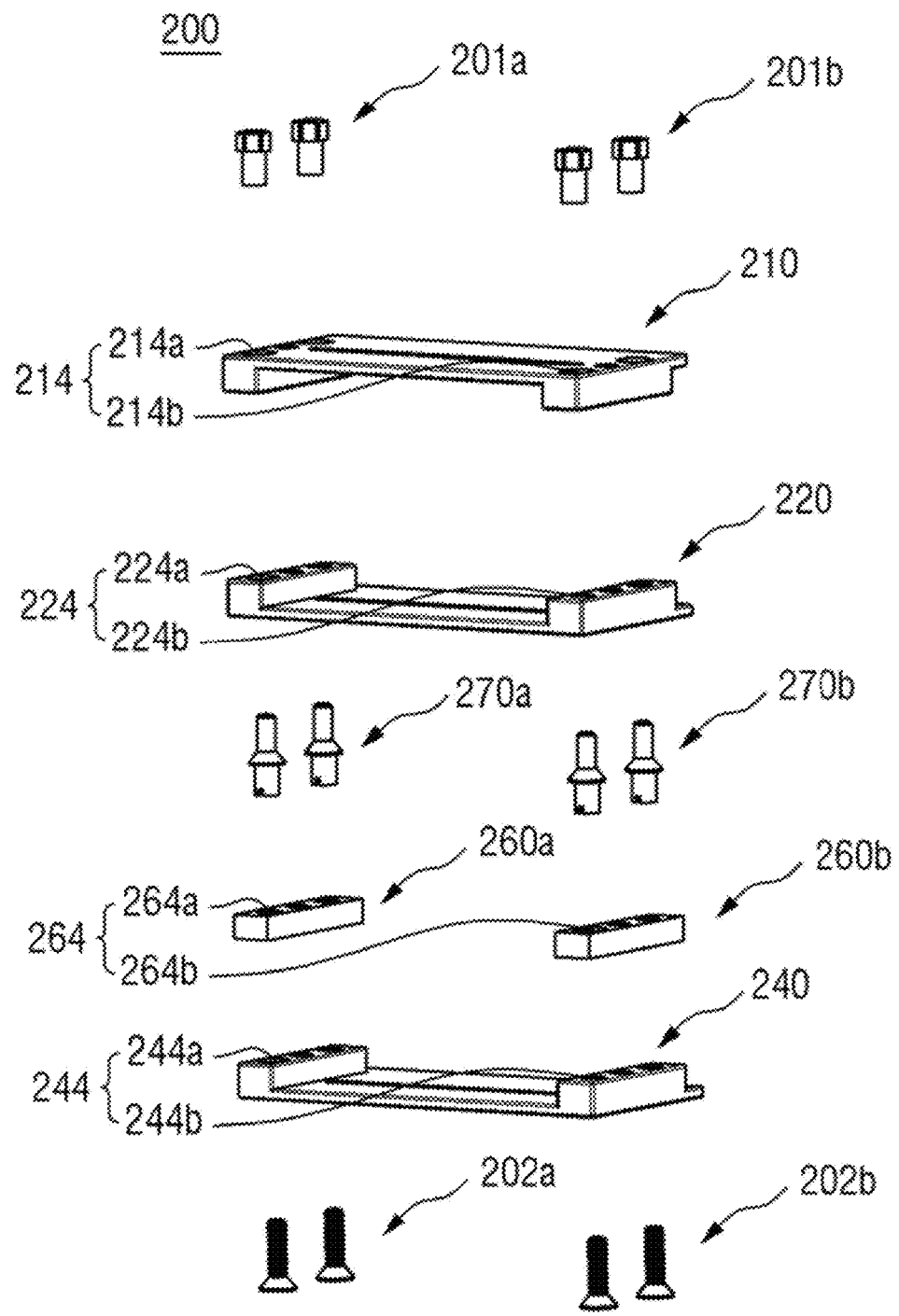
FIG. 3a-3g are assembly and exploded views provided to explain the assembly of #1-#3 clamps of layer #1-side with #1-#3 fasteners.
Figure 3B:
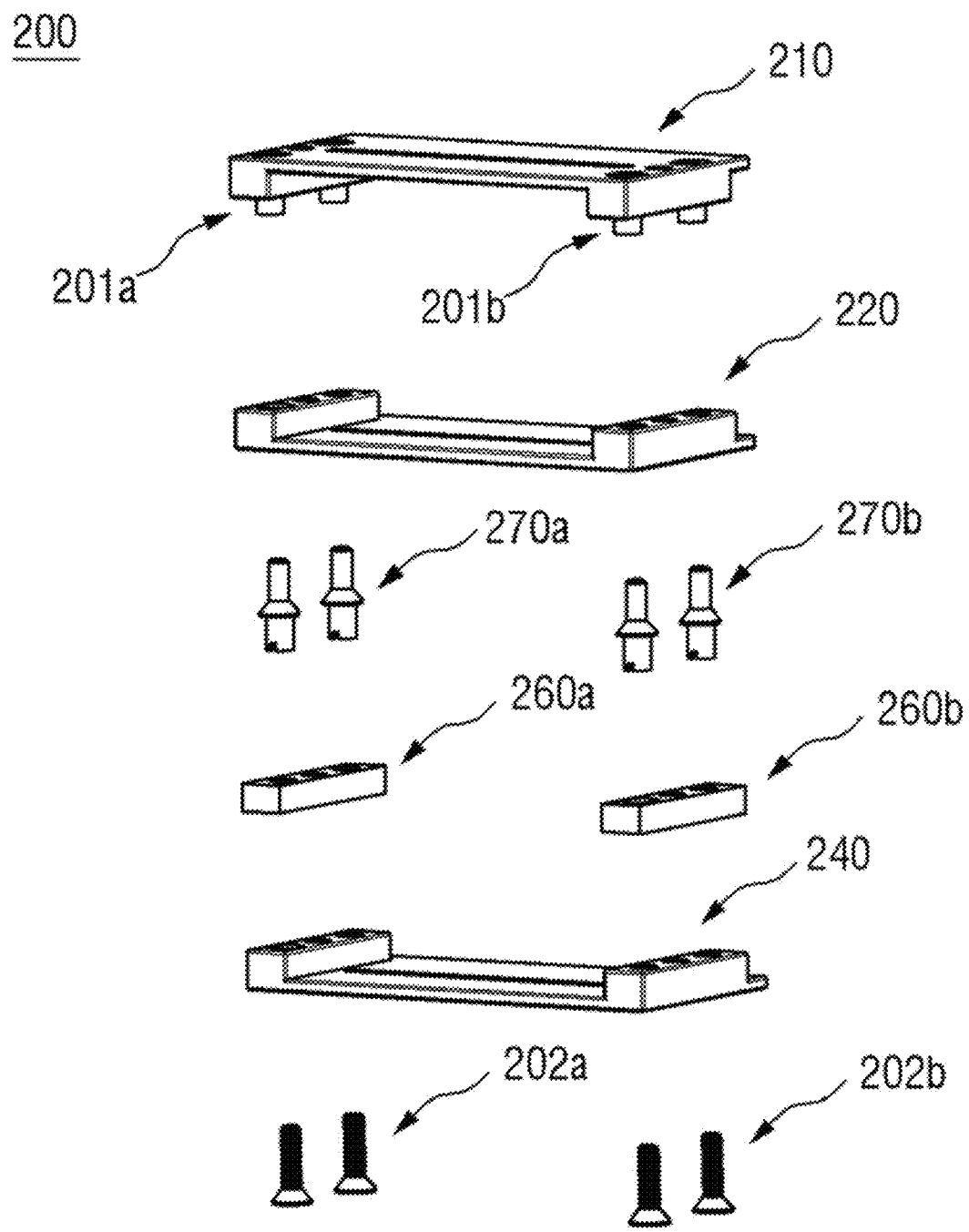

With reference to FIG. 3a and FIG. 3b, #1 fastener 201a, 201b is inserted to #1-1 fastening hole 214 of layer #1-side #1 clamp member 210.

Figure 3C:
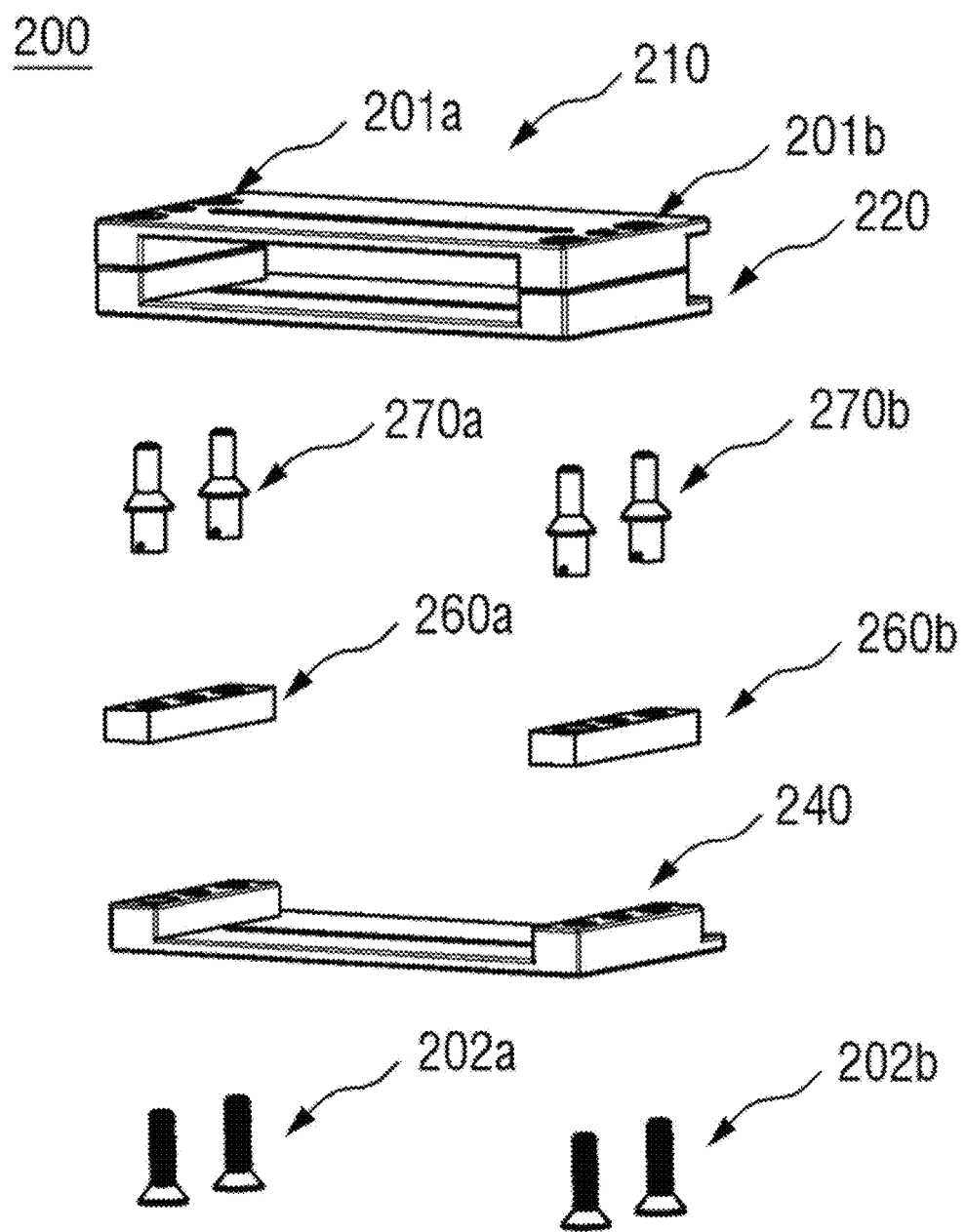

With reference to FIG. 3b and FIG. 3c, while the tip of the #1 fastener 201a, 201b is inserted in #1-2 fastening hole 214 of the layer #1-side #2 clamp member 220, the layer #1-side #1 clamp member 210 and the layer #1-side #2 clamp member 220 make contact with each other.

Figure 3D:
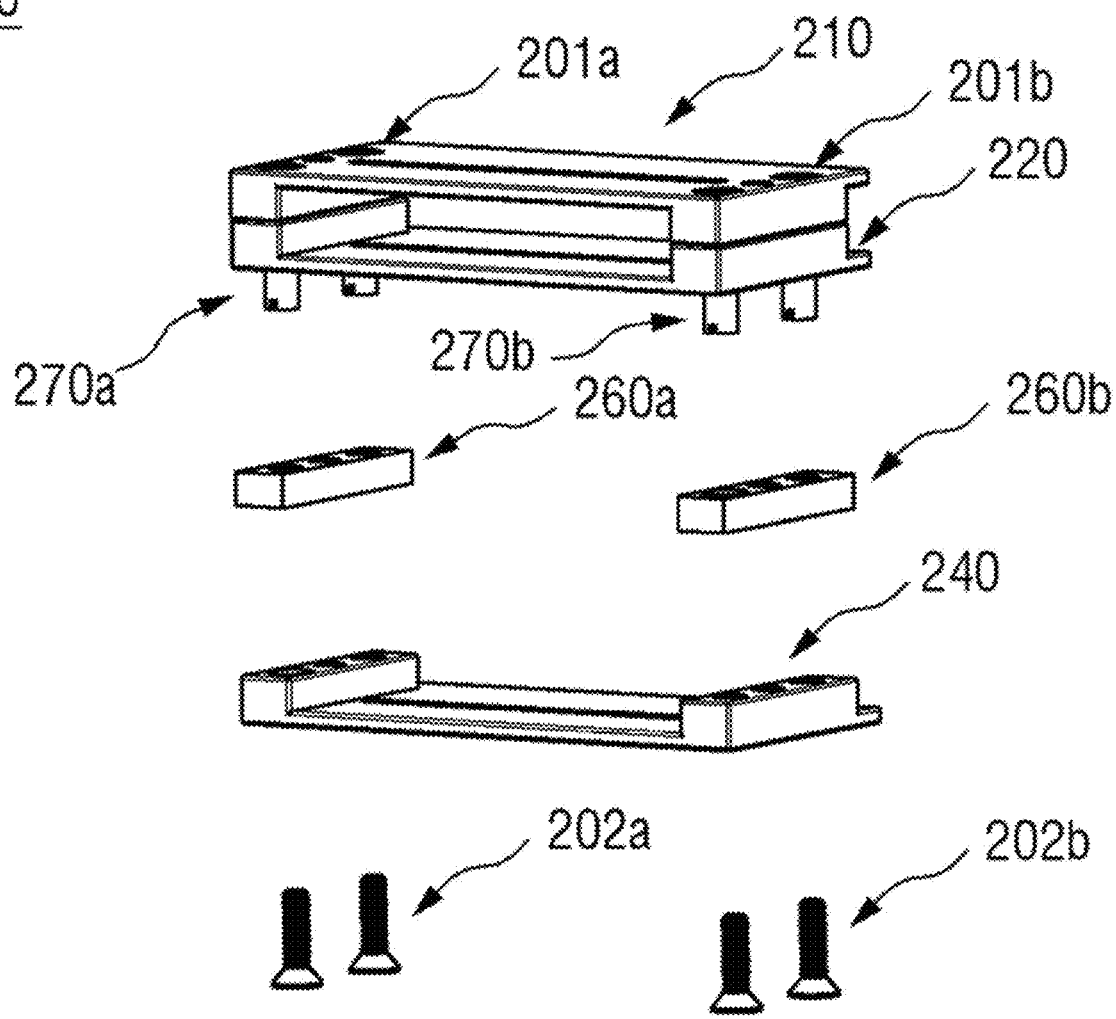

With reference to FIGS. 3c and 3d, while the layer #1-side #1 clamp member 210 and the layer #1-side #2 clamp member 220 are in contact, #3 fastener 270a, 270b is inserted in #1-2 fastening hole 214 of the layer #1-side #2 clamp member 220, where #1 shaft 272a of the #3 fastener, illustrated in FIG. 4a through FIG. 4c, adjoins with the #1 fastener 201a, 201b.

Figure 3E:
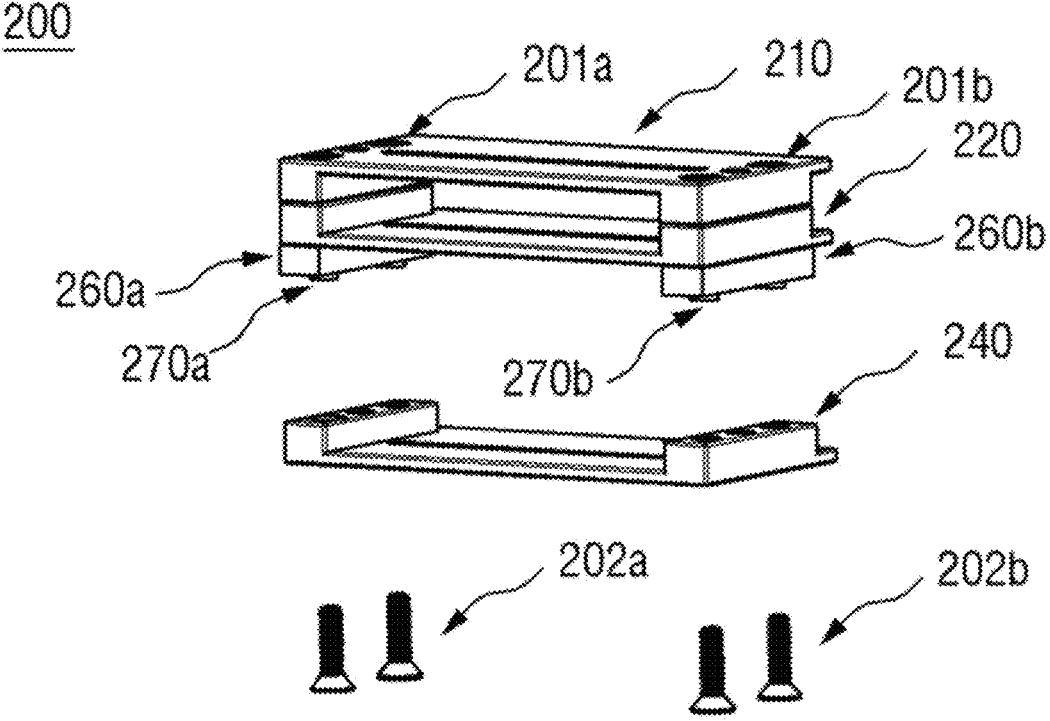

With reference to FIG. 3d and FIG. 3e, #2 shaft 273a of the #3 fastener, as illustrated in FIG. 4a through FIG. 4c, is inserted in the layer #1-side auxiliary spacer fastening hole 264 of the layer #1-side auxiliary spacer 260a, 260b.

Figure 3F:
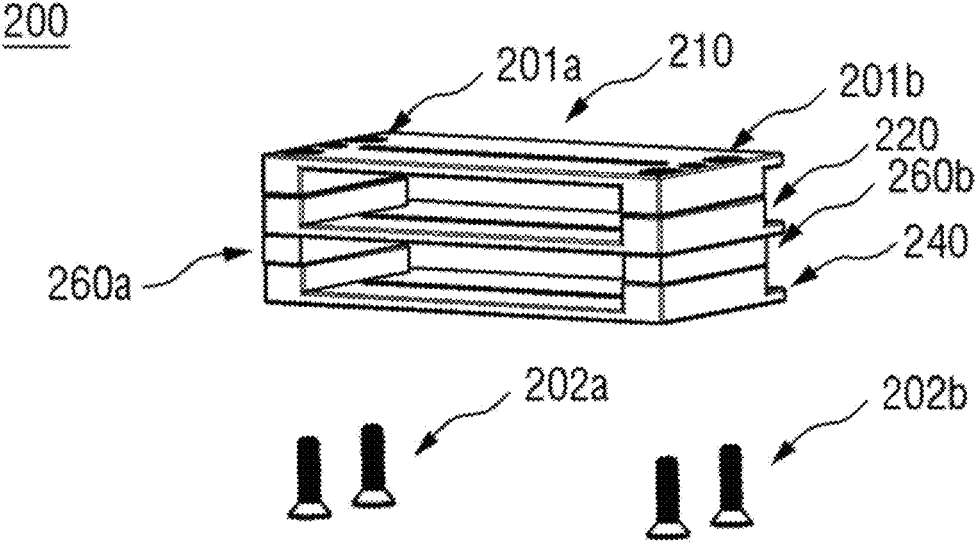

With reference to FIG. 3e and FIG. 3f, while the tip of #2 shaft 273a of the #3 fastener is inserted in #1-3 fastening hole 244 of the layer #1-side #3 clamp member 240, the layer #1-side auxiliary spacer 260a, 260b and the layer #1-side #3 clamp member 240 make contact with each other.

Figure 3G:
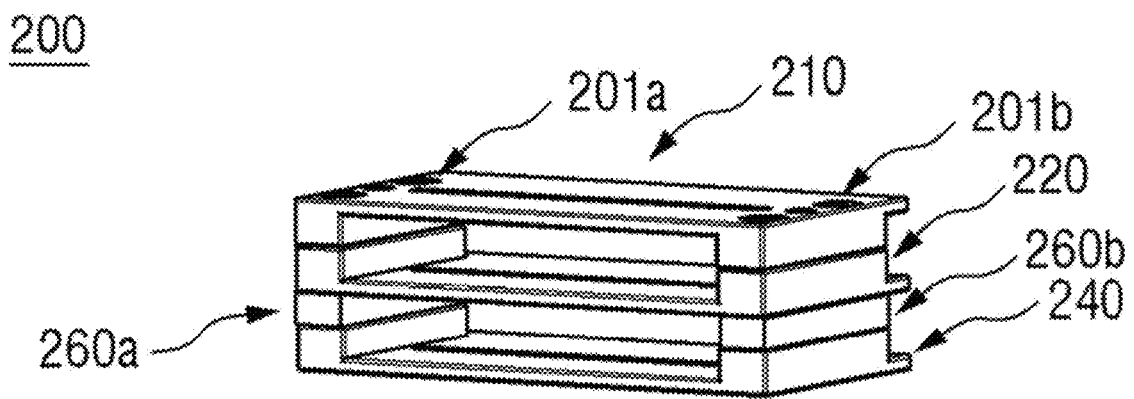

With reference to FIGS. 3f and 3g, while the layer #1-side auxiliary spacer 260a, 260b and the layer #1-side #3 clamp member 240 are in contact, #2 fastener 202a, 202b is inserted in #1-3 fastening hole 244 of the layer #1-side #3 clamp member 240, where #2 shaft 273a of the #3 fastener, illustrated in FIG. 4a through FIG. 4c, adjoins with the #2 fastener 202a, 202b.

Thus, layer #1-side #1 clamp through #3 clamp are assembled with #1 through #3 fasteners.

The following provides explanation of layer #2-side stationary side of the present invention; provided that, the majority of explanation related to layer #2-side stationary side of the present invention is identical to that provided for layer #1-side stationary side, thus reference shall be made to descriptions for layer #1-side stationary side.

With reference to FIG. 1c and FIG. 2b, the layer #2-side stationary side 300 of the cable guiding device 100 of the present invention comprises: layer #2-side #1 clamp member 310; layer #2-side #2 clamp member 320 forming #3 specific space 330 by adjoining the layer #2-side #1 clamp member 310; and layer #2-side #3 clamp member 340 forming #4 specific space 350 by adjoining the layer #2-side #1 clamp member 320.

In particular, the layer #2-side #1 clamp member 310 comprises: #2-1 plate 311; #2-1 spacer 312 that is located at one side of the #2-1 plate 311 and is extended in the transverse direction Y-axis of the #2-1 plate 311; and #2-1 slit 313 that is extended in the longitudinal direction X-axis of the #2-1 plate 311.

Where the #2-1 spacer 312 comprises #2-1 spacer for one side 312a located at one side of the #2-1 plate 311 and #2-1 spacer for the other side 312b located at the other side of the #2-1 plate 311.

Further, the layer #2-side #1 clamp member 310 comprises the #2-1 plate 311 and #2-1 fastening hole 314 penetrating through the #2-1 spacer 312, while the #2-1 fastening hole 314 comprises #2-1 fastening hole for one side 314a located at one side of the #2-1 plate 311, and #2-1 fastening hole for the other side 314b located at the other side of the #2-1 plate 311.

The layer #2-side #2 clamp member 320 comprises: #2-2 plate 321; #2-1 spacer 322 that is located at one side of the #2-2 plate 321 and is extended in the transverse direction Y-axis of the #2-2 plate 321; and #2-2 slit 323 that is extended in the longitudinal direction X-axis of the #2-2 plate 321.

Where the #2-2 spacer 322 comprises #2-2 spacer for one side 322a located at one side of the #2-2 plate 321 and #2-2 spacer for the other side 322b located at the other side of the #2-2 plate 321.

Further, the layer #2-side #2 clamp member 320 comprises the #2-2 plate 321 and #2-2 fastening hole 324 penetrating through the #2-2 spacer 322, while the #2-2 fastening hole 324 comprises #2-2 fastening hole for one side 324a located at one side of the #2-2 plate 321, and #2-2 fastening hole for the other side 324b located at the other side of the #2-2 plate 321.

As illustrated in FIG. 1c and FIG. 2b, the #2-1 spacer for one side 312a and the #2-2 spacer for the other side 322a shall be adjoined in a manner facing each other, while the #2-1 spacer for one side 312b and the #2-2 spacer for the other side 322b shall be adjoined in a manner facing each other, allowing the layer #2-side stationary side 300 to form the #3 specific space 330 by adjoining the layer #2-side #1 clamp member 310 and the layer #2-side #2 clamp member 320.

Further, as presented in FIG. 1a through FIG. 1c, multiple #1 internal tubular members 111 that accommodate cable, and layer #2-side of the #1 flexible belt member 110 including a couple of #1 external tubular member 112 that accommodates articulated supporting member located exterior of the #1 internal tubular member are inserted in the #3 specific space 330, thus, the layer #2-side of the #1 flexible belt member 110 is fixed and supported by the layer #2-side stationary side 300.

As illustrated in FIG. 1c, the multiple #1 internal tubular members 111 can accommodate cables not shown in drawing, and the each of the couple of #1 external tubular members 112 accommodate articulated supporting members 400.

With reference to FIG. 1c and FIG. 2b, the layer #2-side #3 clamp member 340 comprises: #2-3 plate 341; #2-3 spacer 342 that is located at one side of the #2-3 plate 341 and is extended in the transverse direction Y-axis of the #2-3 plate 341; and #2-3 slit 343 that is extended in the longitudinal direction X-axis of the #2-3 plate 341.

Where the #2-3 spacer 342 comprises #2-3 spacer for one side 342a located at one side of the #2-3 plate 341 and #2-3 spacer for the other side 342b located at the other side of the #2-3 plate 341.

Further, the layer #2-side #3 clamp member 340 comprises the #2-3 plate 341 and #2-3 fastening hole 344 penetrating through the #2-3 spacer 342, while the #2-3 fastening hole 344 comprises #2-3 fastening hole for one side 344a located at one side of the #2-3 plate 341, and #2-3 fastening hole for the other side 344b located at the other side of the #2-3 plate 341.

Further, the present invention includes layer #2-side auxiliary spacer 360a, 260b located between the layer #2-side #2 clamp member 320 and the layer #2-side #3 clamp member 340, where the layer #2-side auxiliary spacer 360a, 260b comprises: layer #2-side #1 auxiliary spacer 360a that is in contact with the #2-3 spacer for one side 342a; and layer #2-side #2 auxiliary spacer 360b that is in contact with the #2-3 spacer for the other side 342b.

layer #2-side #1 auxiliary spacer 360a, located in the area corresponding to the #2-2 fastening hole for one side 324a and #2-3 fastening hole for one side 344a, comprises layer #2-side #1 auxiliary spacer fastening hole 364a penetrating through the layer #2-side #1 auxiliary spacer 360a, while the layer #2-side #2 auxiliary spacer 360b, located in the area corresponding to the #2-2 fastening hole for the other side 324b and #2-3 fastening hole for the other side 344b, comprises layer #2-side #2 auxiliary spacer fastening hole 364b penetrating through the layer #2-side #1 auxiliary spacer 360b.

As illustrated in FIG. 1c and FIG. 2b, the #2-3 spacer for one side 342a and the layer #2-side #1 auxiliary spacer 360a shall be adjoined in contact, while the #2-3 spacer for the other side 342b and the layer #2-side #2 auxiliary spacer 360b shall be adjoined in contact, allowing the layer #2-side stationary side 300 to form the #4 specific space 350 by adjoining the layer #2-side #3 clamp member 340 and the layer #2-side #2 clamp member 320.

Further, as presented in FIG. 1a through FIG. 1c, multiple #2 internal tubular members 121 that accommodate cable, and layer #2-side of the #2 flexible belt member 120 including a couple of #2 external tubular member 122 that accommodates articulated supporting member located exterior of the #2 internal tubular member are inserted in the #4 specific space 350, thus, the layer #2-side of the #2 flexible belt member 120 is fixed and supported by the layer #2-side stationary side 300.

As illustrated in FIG. 1c, the multiple #2 internal tubular members 121 can accommodate cables not shown in drawing, and the each of the couple of #2 external tubular members 122 accommodate articulated supporting members 400.

With reference to FIG. 1c and FIG. 2b, the layer #2-side stationary side 300 of the present invention includes #2-1 stopper 800 located at the #3 specific space 330 to be adjoined with the end of one side of the articulated supporting member 400.

Where the #2-1 stopper 800 includes a couple of #2-1 stoppers 800 provided to each adjoin with each articulated supporting member 400 that are accommodated the one couple of #1 external tubular member 112.

The couple of #2-1 stoppers 800 have the same structure, whereas the following provides descriptions to a single #2-1 stopper 800.

The #2-1 stopper 800 comprises upper #2-1 stopper 810 and lower #2-1 stopper 820 that is adjoined with the upper #2-1 stopper 810.

Detail configuration of the #2-1 stopper 800 shall be addressed later in this specification.

With reference to FIG. 1a and FIG. 1c, the layer #2-side stationary side 300 of the cable guiding device 100 claimed by the present invention comprises: #2-1 pressurizing unit 710 located above the #3 specific space 330 and between a couple of #2-1 stoppers 800, in the longitudinal direction X-axis of the #2-1 plate 311; and #2-2 pressurizing unit 720 located beneath the #3 specific space 330 and between a couple of #2-1 stoppers 800, and in the longitudinal direction X-axis of the #2-2 plate 321.

Where the #2-1 pressurizing unit 710 comprises: #2-1 pressurizing plate 711; and #1-1 lump area 712 that is located on one side of the #2-1 pressurizing plate 711 and is inserted to the #2-1 slit 313 of the #2-1 plate 711.

Thus, by inserting the #2-1 lump 712 in the #2-1 slit 313 of the #2-1 plate 311, the #2-1 pressurizing unit 710 can be prevented from moving in transverse Y-axis of the #2-1 plate 311.

The #2-1 pressurizing unit 710 is provided to apply pressure from the top of the multiple #1 internal tubular members 111 that accommodate cable, thus the #2-1 pressurizing unit 710 can prevent the multiple #1 internal tubular members 111 falling off from the #1 predetermined position 330.

The #2-2 pressurizing unit 720 is located symmetric to the #2-1 pressurizing unit 710, and comprises: #2-2 pressurizing plate no numeric, not shown in drawing; and #2-2 lump area not shown in drawing that is located on one side of the #2-2 pressurizing plate and inserted to the #2-2 slit 323 of the #2-2 plate 321.

Thus, by inserting the #2-2 lump not shown in drawing in the #2-2 slit 323 of the #2-2 plate 321, the #2-2 pressurizing unit 720 can be prevented from moving in transverse Y-axis of the #2-2 plate 321.

The #2-2 pressurizing unit 710 is provided to apply pressure from the top of the multiple #1 internal tubular members 111 that accommodate cable, thus the #2-2 pressurizing unit 710 can prevent the multiple #1 internal tubular members 111 falling off from the #3 predetermined position 330.

With reference to FIG. 1c and FIG. 2b, the layer #2-side stationary side 300 of the present invention includes #2-2 stopper 800' located at the #4 specific space 350 to be adjoined with the end of one side of the articulated supporting member 400.

Where the #2-2 stopper 800' includes a couple of #2-2 stoppers 800' provided to each adjoin with each articulated supporting member 400 that are accommodated the one couple of #2 external tubular member 122.

The couple of #2-2 stoppers 800' have the same structure, whereas the following provides descriptions to a single #2-2 stopper 800'.

The #2-2 stopper 800' comprises upper #2-2 stopper 810' and lower #2-2 stopper 820' that is adjoined with the upper #2-2 stopper 810'.

Detail configuration of the #2-2 stopper 800' shall be addressed later in this specification.

With reference to FIG. 1a and FIG. 1c, the layer #2-side stationary side 300 of the cable guiding device 100 claimed by the present invention comprises: #2-3 pressurizing unit 710' located above the #4 specific space 350 and between a couple of #2-2 stoppers 800', in the longitudinal direction X-axis of the #2-2 plate 321; and #2-4 pressurizing unit 720' located beneath the #4 specific space 350 and between a couple of #2-2 stoppers 800', and in the longitudinal direction X-axis of the #2-3 plate 321.

The #2-3 pressurizing unit 710' comprises: #2-3 pressurizing plate 711'; and #2-3 lump area 712' that is located on one side of the #2-3 pressurizing plate 711' and is inserted to the #2-2 slit 223 of the #2-2 plate 221.

Thus, by inserting the #2-3 lump 712' in the #2-2 slit 323 of the #2-2 plate 321, the #2-3 pressurizing unit 710' can be prevented from moving in transverse Y-axis of the #2-2 plate 321.

The #2-3 pressurizing unit 710' is provided to apply pressure from the top of the multiple #2 internal tubular members 121 that accommodate cable, thus the #2-3 pressurizing unit 710' can prevent the multiple #2 internal tubular members 121 falling off from the #4 predetermined position 350.

The #2-4 pressurizing unit 720' is located symmetric to the #2-3 pressurizing unit 710', and comprises: #2-4 pressurizing plate no numeric, not shown in drawing; and #2-4 lump area not shown in drawing that is located on one side of the #2-4 pressurizing plate and inserted to the #2-3 slit 343 of the #2-3 plate 341.

Thus, by inserting the #2-4 lump not shown in drawing in the #2-3 slit 343 of the #2-3 plate 341, the #2-4 pressurizing unit 720' can be prevented from moving in transverse Y-axis of the #2-3 plate 341.

The #2-4 pressurizing unit 720' is provided to apply pressure from the top of the multiple #2 internal tubular members 121 that accommodate cable, thus the #2-4 pressurizing unit 720' can prevent the multiple #2 internal tubular members 121 falling off from the #4 predetermined position 350.

With reference to FIG. 1c and FIG. 2b, the layer #2-side stationary side 300 of the cable guiding device 100 of the present invention a fastener to adjoin the layer #2-side #1 clamp member 310, the layer #2-side #2 clamp member 320, and the layer #2-side #3 clamp member 340.

Where the fastener comprises: #1 fastener 301a, 201b located at the layer #2-side #1 clamp member 310; #2 fastener 302a, 202b located at the layer #2-side #3 clamp member 340; and #3 fastener 370a, 270b which one side is adjoined with the #1 fastener and the other side is adjoined with #3 fastener 370a, 270b.

Thus, the layer #2-side #1 clamp member 310 and layer #2-side #2 clamp member 320 are assembled with the #1 fastener and the #3 fastener; and the layer #2-side #2 clamp member 320 and layer #2-side # clamp member 340 are assembled with the #2 fastener and the #3 fastener.

Where, as illustrated in FIG. 1c and FIG. 2b, the #1 fastener 301a, 201b may be a nut and the #2 fastener 302a, 202b may be a bolt, and conversely, yet not shown in the drawings, the #1 fastener 301a, 201b may be a bolt and the #2 fastener 302a, 202b may be a nut.

Assembly of layer #2-side #1 clamp member through #3 clamp member with #1 fastener through #3 fastener is identical to that of layer #1-side stationary side, thus refer to the explanation provided above.

The following provides explanation on details of the articulated supporting member of the present invention.

Figure 5A:
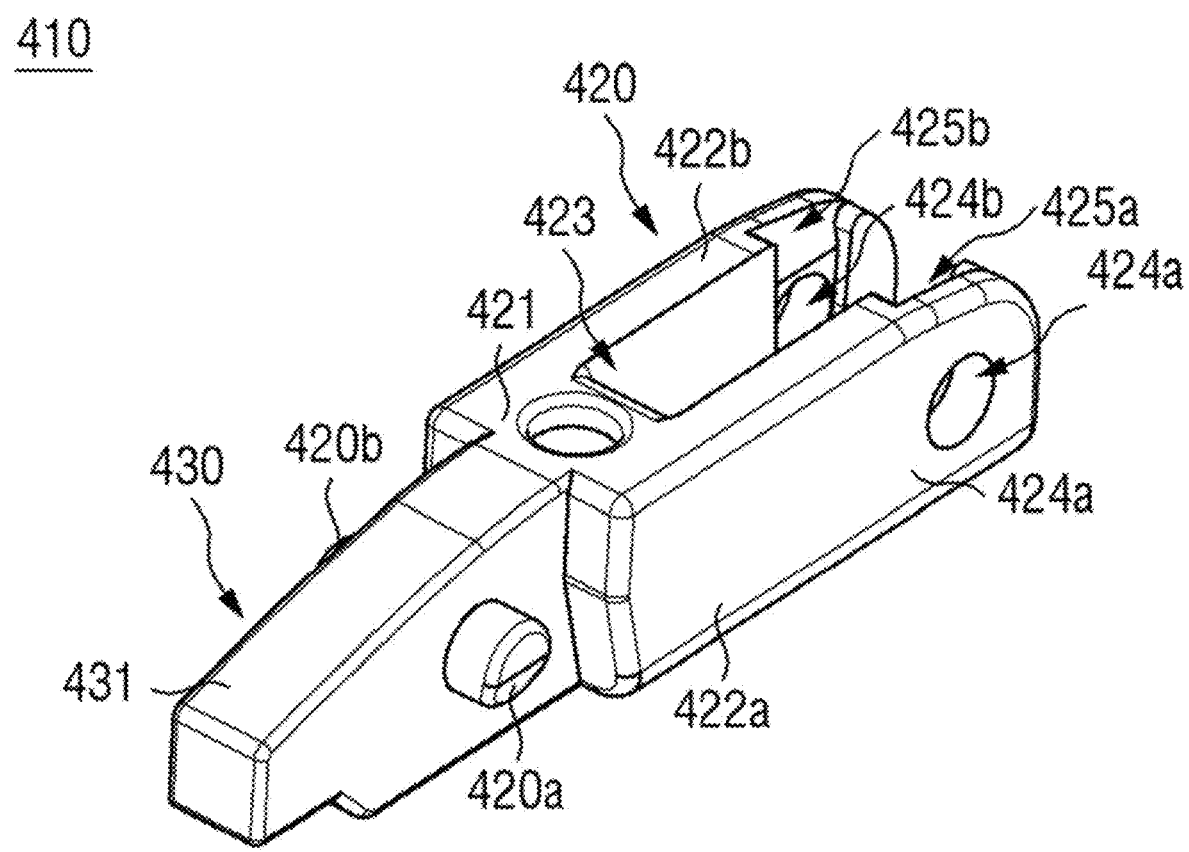
FIG. 5a is a perspective view of individual blocks constituting the articulated supporting member of the present invention.
Figure 5B:
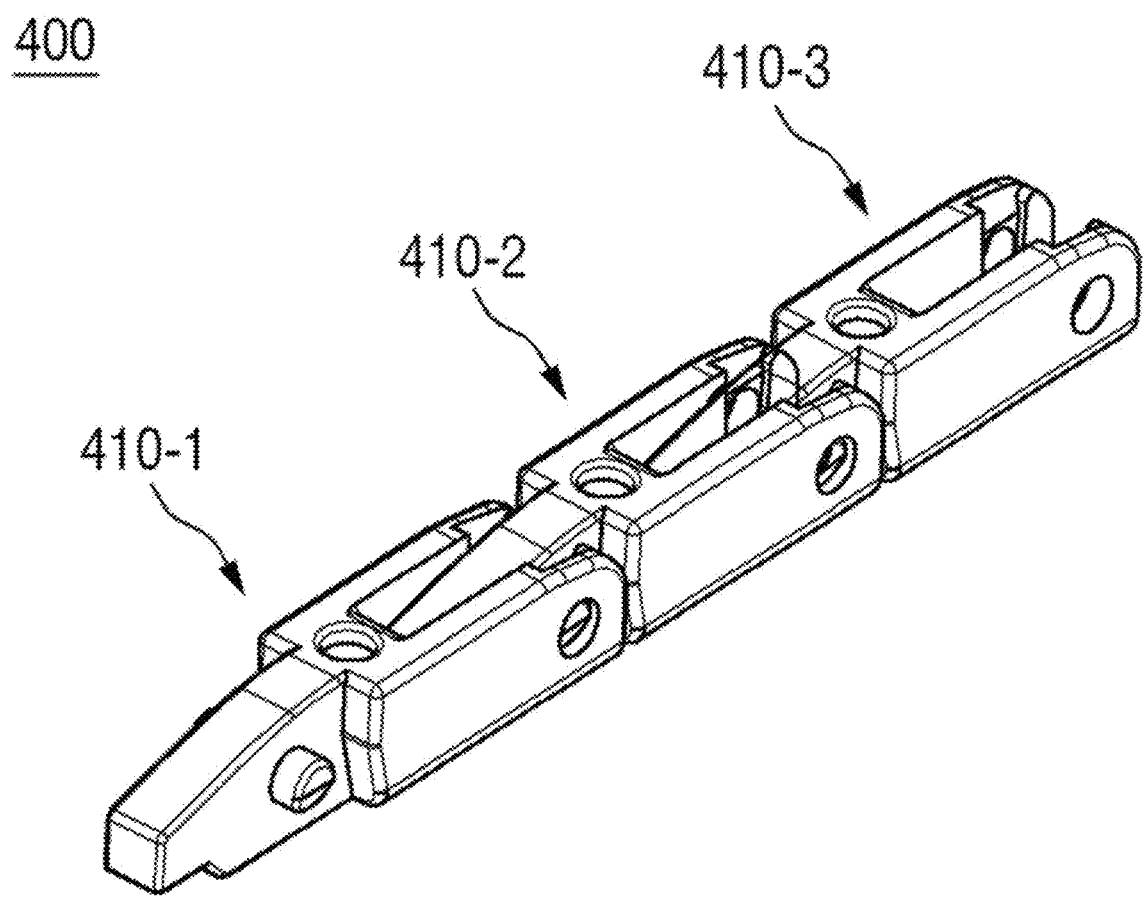
FIG. 5b is a perspective view of the articulated supporting member of the present invention.

FIG. 5a is a perspective view of individual blocks constituting the articulated supporting member of the present invention; and FIG. 5b is a perspective view of the articulated supporting member of the present invention.

With reference to FIG. 5a, block 410 of the present invention comprises: a rear body 420; and a front body 430 extended from the rear body 420.

The rear body 420 comprises: horizontal body 421; #1 vertical body 422a extending from one side of the horizontal body 421 in #1 direction; #2 vertical body 422b extending from the other side of the horizontal body 421 in #2 direction; and gap 423 formed by the displacement between the #1 vertical body 422a and the #2 vertical body 422b.

Further, the front body 430 comprises front tip 431 extended from the center area of the horizontal body 421.

Where, the #1 direction and the #2 direction are projected opposite from the horizontal body 421.

Thus, the block 410 of the present invention, comprising the rear body 420 and the front body 430 forms a shape where its plan view is approximately shaped as "/" 

The front body 430 comprises one couple of connecting pins 420 that are located on both sides of the front tip 431 projecting vertical to the protrusion direction of the front tip 431.

Further, the rear body 420 comprises: #1 connecting pin hole 424a located at a predetermined position of #1 vertical body 422a; and #2 connecting pin hole 424b located at a predetermined position of #2 vertical body 422b. Whilst the rear body 420 also comprises: #1 guiding channel 425a continuing from the top surface of the #1 vertical body 422a up to the #1 connecting pin hole 424a; and #2 guiding channel 425b continuing from the top surface of the #2 vertical body 422b up to the #2 connecting pin hole 424b.

With reference to FIG. 5b, the articulated supporting member of the present invention is comprised with a combination of multiple blocks 410-1, 410-2, 410-3 as prescribed above to form a single articulated supporting member 400.

In particular, with reference to a block as prescribed in FIG. 5a, for instance, assuming that a front block 410-1 and rear block 410-2 are assembled to conform an articulated supporting member 400; the front tip FIG. 5a, 431 of front body of rear block 410-2 is inserted in the gap FIG. 5a, 423 of the rear body of the front block 410-1, where each left and right connecting pin FIG. 5a, 420a of the rear block 410-2 slips into #1 connecting pin hole FIGS. 5a, 424a and #2 connecting pin hole FIG. 5a, 424b of the front body 410-1, whereas the front block 410-1 and the rear block 410-2 are connected to conform an articulated supporting member 400.

With regard to inserting each left and right connecting pin FIG. 5a, 420a of the rear block 410-2 into #1 connecting pin hole FIGS. 5a, 424a and #2 connecting pin hole FIG. 5a, 424b of the front body 410-1, for the convenience of assembly, the front block 410-1 comprises: #1 guiding channel FIG. 5a, 425a continuing from the top surface of the #1 vertical body FIG. 5a, 422a up to the #1 connecting pin hole FIGS. 5a, 424a; and #2 guiding channel FIG. 5a, 425b continuing from the top surface of the #2 vertical body FIG. 5a, 422b up to the #2 connecting pin hole FIG. 5a, 424b.

Provided that, FIG. 5b illustrates a combination of three blocks for the convenience of explanation, however, the present invention does not limit the number of blocks conforming the articulated supporting member 400.

Refer to Korea Patent No. 10-107440 for details on the configuration and maneuvering of the articulated supporting member of the present invention, where the maneuvering of the articulated supporting member has been disclosed to the field of the art, thus no further explanation is provided.

The following provides explanation on details of #1 stopper of the present invention.

Figure 6A:
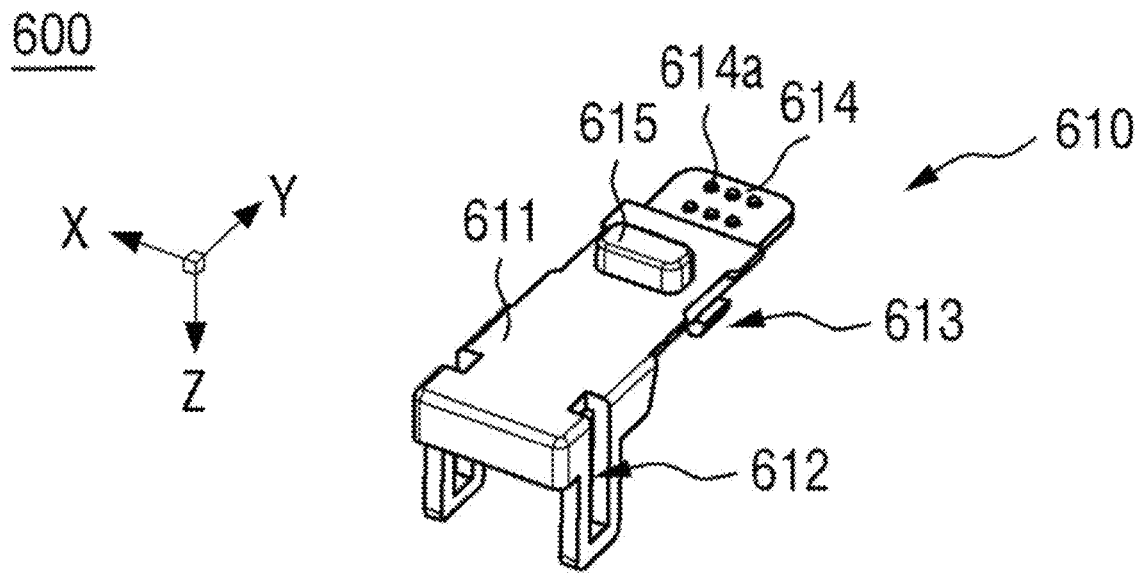
FIG. 6a is an assembly and exploded view of #1 stopper of the present invention from one perspective.
Figure 6A:
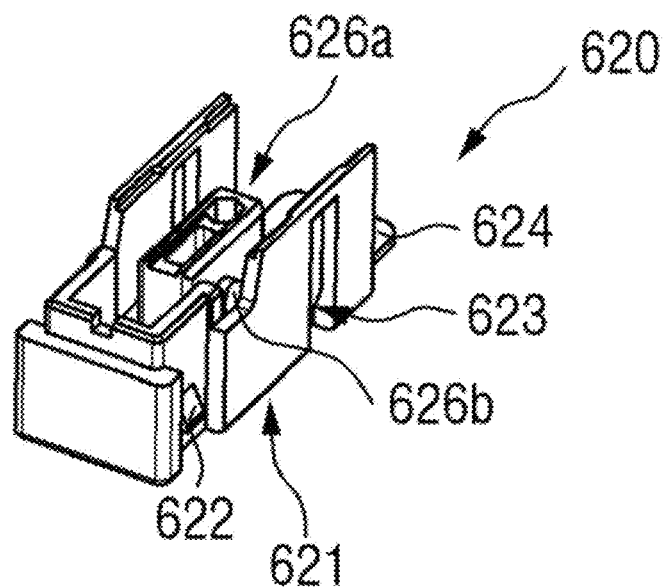
Figure 6B:
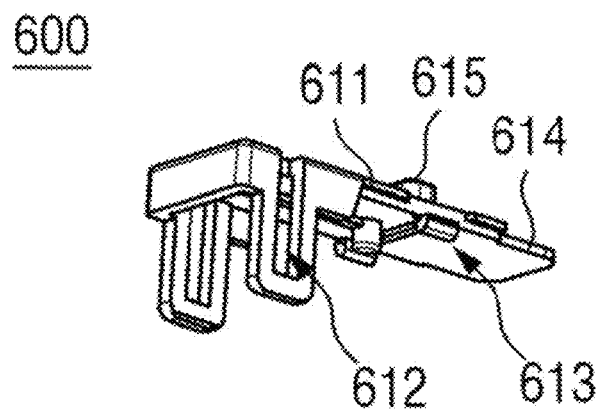
FIG. 6b is an assembly and exploded view of #1 stopper of the present invention from another perspective.
Figure 6B:
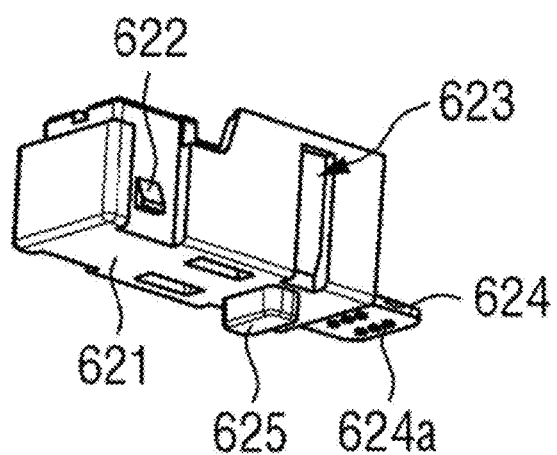
Figure 6C:
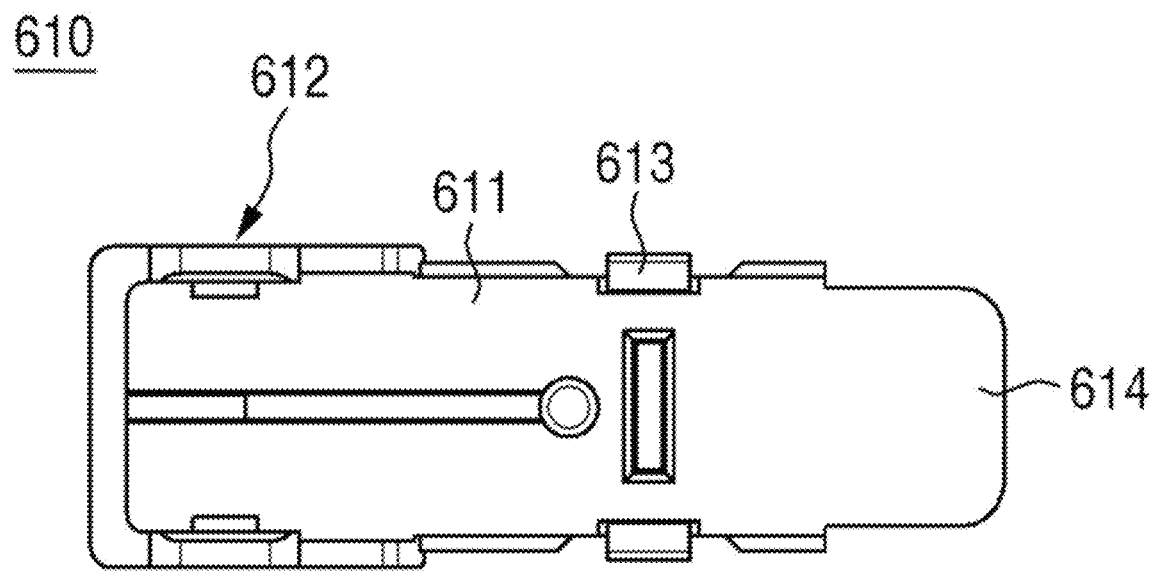
FIG. 6c is an internal plan view illustrating the upper #1 stopper.
Figure 6D:
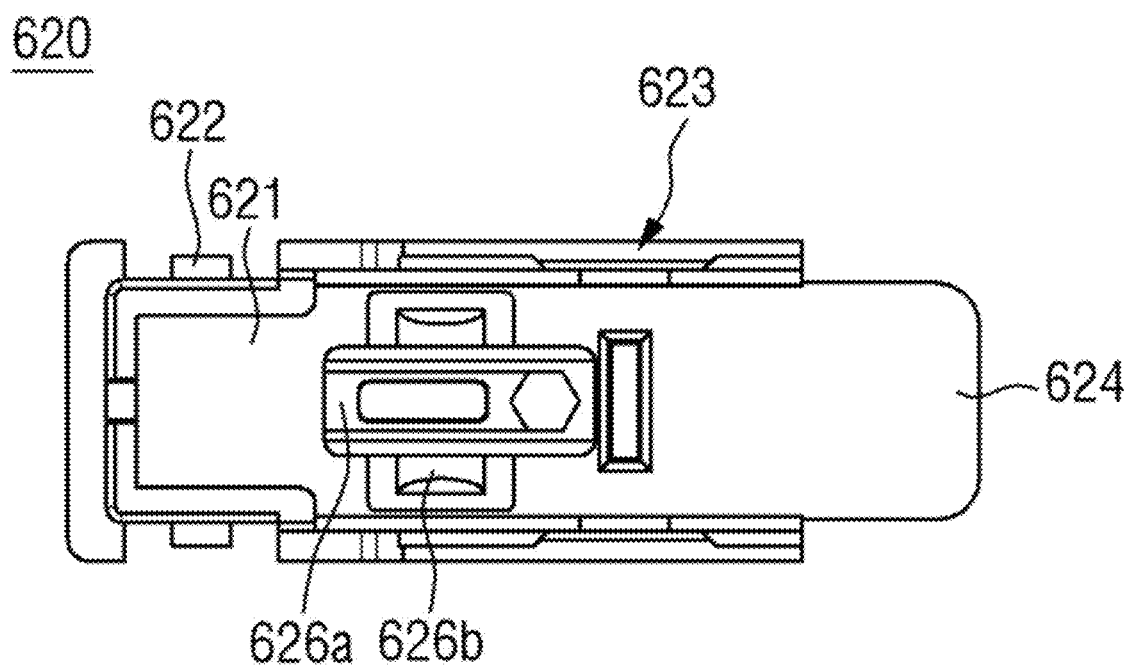
FIG. 6d is an internal plan view illustrating the lower #1 stopper.
Figure 6E:
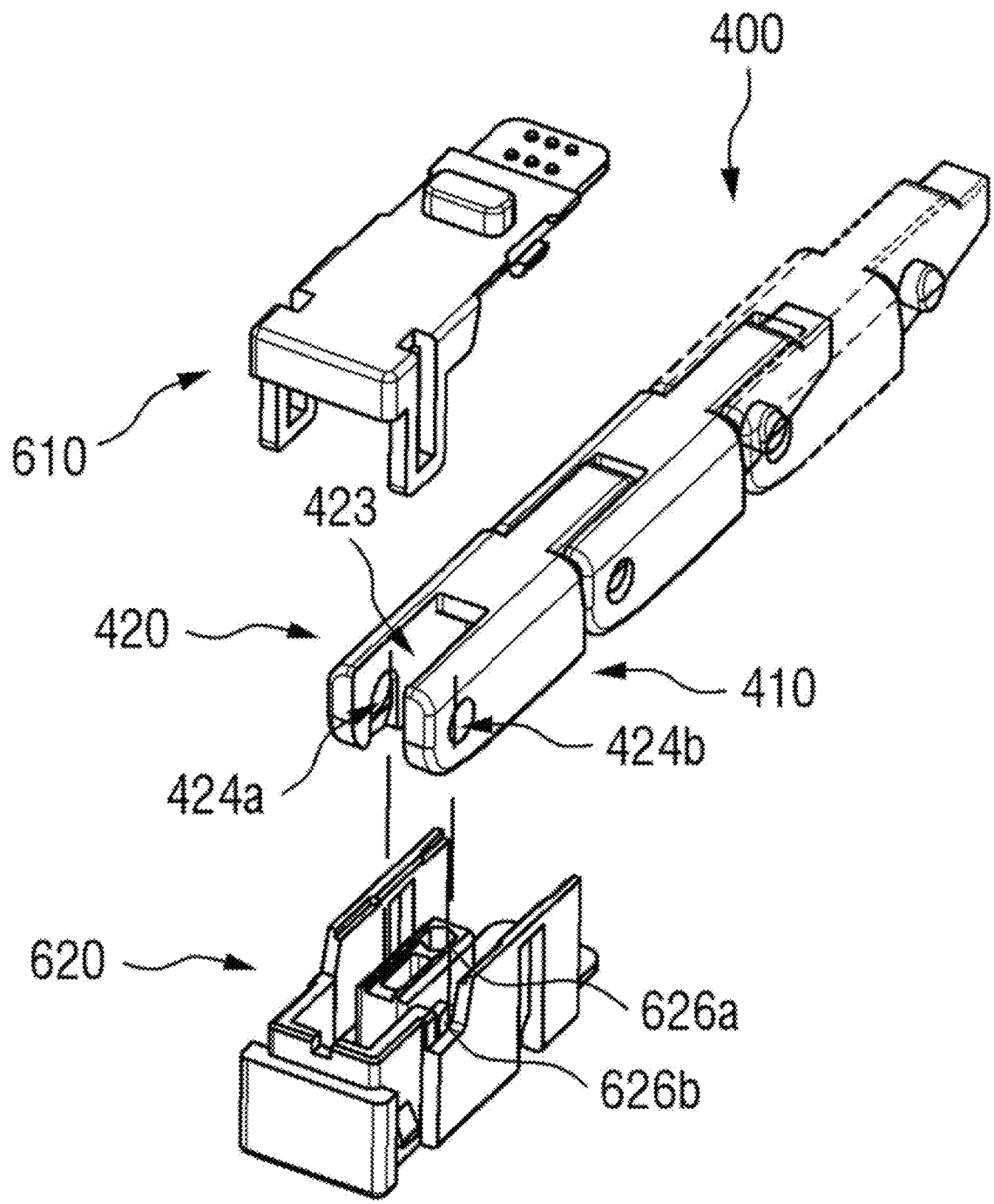
FIG. 6e is an assembly and exploded view provided to explain the assembly of #1 stopper of the present invention to the rear body of the articulated supporting member block from one perspective.

FIG. 6a is an assembly and exploded view of #1 stopper of the present invention from one perspective; FIG. 6b is an assembly and exploded view of #1 stopper of the present invention from another perspective; FIG. 6c is an internal plan view illustrating the upper #1 stopper; FIG. 6d is an internal plan view illustrating the lower #1 stopper; FIG. 6e is an assembly and exploded view provided to explain the assembly of #1 stopper of the present invention to the rear body of the articulated supporting member block from one perspective; and FIG. 6f is an assembly and exploded view provided to explain the assembly of #1 stopper of the present invention to the rear body of the articulated supporting member block from another perspective.

With reference to FIG. 6a through 6d, #1 stopper 600 of the present invention comprises: upper #1 stopper 610 and lower #1 stopper 620 adjoining the upper #1 stopper 610.

Figure 6F:
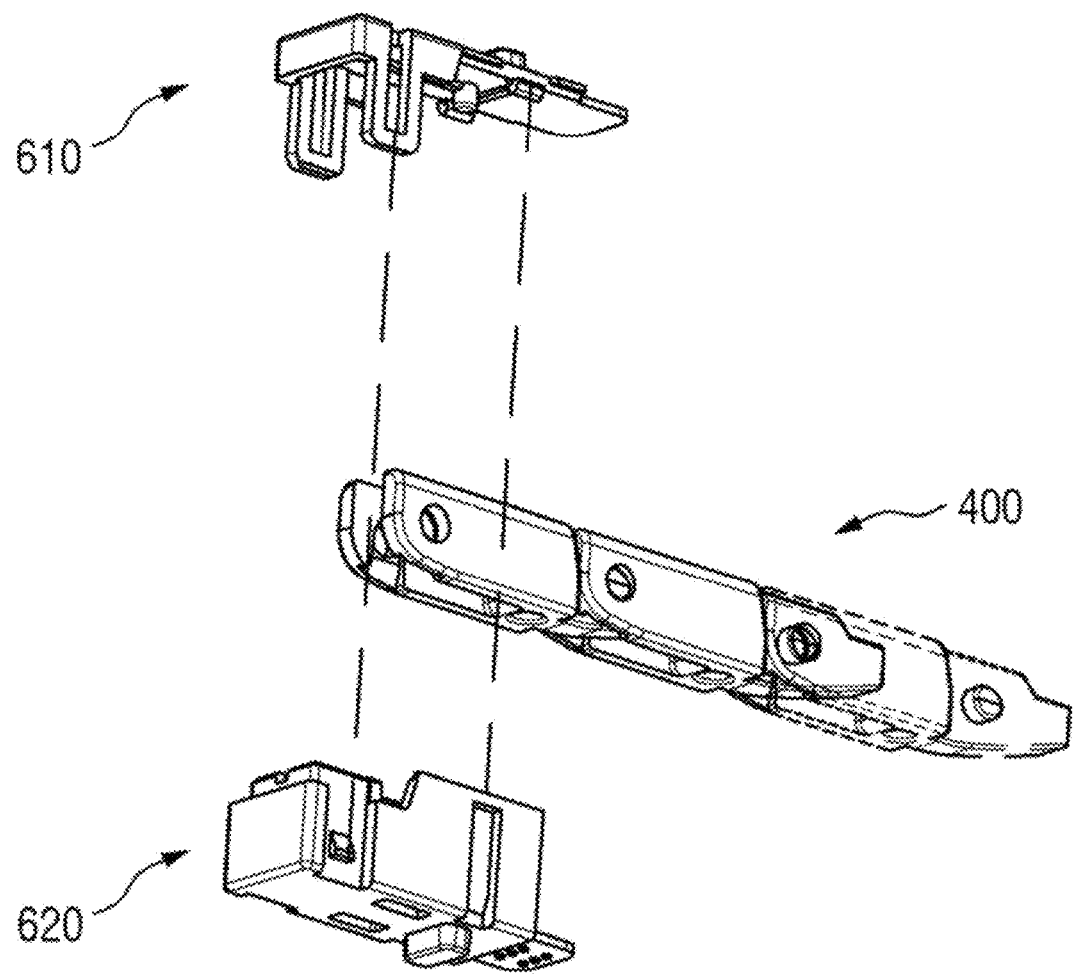
FIG. 6f is an assembly and exploded view provided to explain the assembly of #1 stopper of the present invention to the rear body of the articulated supporting member block from another perspective.

Where, as illustrated in FIG. 6e and FIG. 6f, #1 stopper 600 of the present invention is adjoined to the rear body 420 of a block 410 which conforms the individual unit of an articulated supporting member 400.

In particular, the upper #1 stopper 610 comprises: upper #1 cover 611; upper #1 cover #1 assembly groove 612, located at one side of the upper #1 cover 611 and extended toward the polar direction Z-axis of the upper #1 cover 611; and upper #1 cover #1 assembly lump area 613, located at the other side of the upper #1 cover 611 and extended toward the transverse direction X, –X of the upper #1 cover 611.

Where, the upper #1 stopper 610 is located on the top surface of the upper #1 cover 611, and comprises upper #1 cover lump area 615 that is inserted to the #1 upper slit 213 of the #1 upper plate 211 illustrated in FIG. 1b and FIG. 1c.

Thus, by inserting the upper #1 cover lump 615 in the #1 upper slit 213 of the #1 upper plate 211, the #1 stopper 600 can be prevented from moving in transverse Y-axis of the #1 upper plate 211.

Further, the upper #1 stopper 610 comprises upper #1 extension plate 614 extended from the other side of the upper #1 cover 611 toward the longitudinal direction Y-axis of the upper #1 cover 611, while the top surface of the upper #1 extension plate 614 comprises multiple upper #1 extension plate lumps 614a. Details of such configuration shall be addressed later in this specification.

In particular, the lower #1 stopper 620 comprises: lower #1 cover 621; lower #1 cover #1 assembly lump 613, located at one side of the lower #1 cover 621 and projecting toward the transverse direction X, –X of the lower #1 cover 621; and lower #1 cover #1 assembly groove 623, extended toward the polar direction Z-axis of the lower #1 cover 621.

Thus, as the upper #1 cover #1 assembly groove 612 of the upper #1 stopper 610 is adjoined with the lower #1 cover #1 assembly lump 613 of the lower #1 stopper 620, and the upper #1 cover #1 assembly lump 613 of upper #1 stopper 610 is adjoined with lower #1 cover #1 assembly groove 623 of lower #1 stopper 620, the upper #1 stopper 610 and the lower #1 stopper 620 are adjoined to conform #1 stopper 600.

Where, the lower #1 stopper 620 is located on the top surface of the lower #1 cover 621, and comprises lower #1 cover lump area 625 that is inserted to the #1 lower slit 223 of the #1 lower plate 221 illustrated in FIG. 1b and FIG. 1c.

Thus, by inserting the lower #1 cover lump 625 in the #1 lower slit 223 of the #1 lower plate 211, the #1 stopper 600 can be prevented from moving in transverse Y-axis of the #1 lower plate 221.

Further, the lower #1 stopper 620 comprises lower #1 extension plate 624 extended from the other side of the lower #1 cover 621 toward the longitudinal direction Y-axis of the lower #1 cover 621, while the top surface of the lower #1 extension plate 624 comprises multiple lower #1 extension plate lumps 624a. Details of such configuration shall be addressed later in this specification.

Further, the lower #1 stopper 620 comprises: an internal bulge 626a located on the inside of the lower #1 cover 621; and a couple of bulge connecting pins 626b projecting from both the left and the right side of the internal bulge 626a.

As described above, with reference to FIG. 5a, the rear body 420 of the block 400 of the present invention comprises: a gap 423 conforming the displacement between #1 vertical body 422a and #2 vertical body 422b; #1 connecting pin hole 424a located at predetermined position of the #1 vertical body 422a and #2 connecting pin hole 424b located at predetermined position of the #2 vertical body 422b.

Further, as described above, #1 stopper 600 of the present invention adjoins the rear body 420 of a block 410 that is an individual unit of the articulated supporting member 400.

Where, as illustrated in FIG. 6e and FIG. 6f, whilst the internal bulge 626a located on the inside of the lower #1 cover 621 is inserted to the gap of block 400, by adjoining #1 connecting pin hole 424a and #2 connecting pin hole 424b each with the couple of bulge connecting pins 626b of the lower #1 cover 621, the individual unit block 410 is assembled with the #1 stopper 600.

The following provides explanation on details of the assembly of #1 stopper and external tubular member of flexible belt member.

Figure 7A:
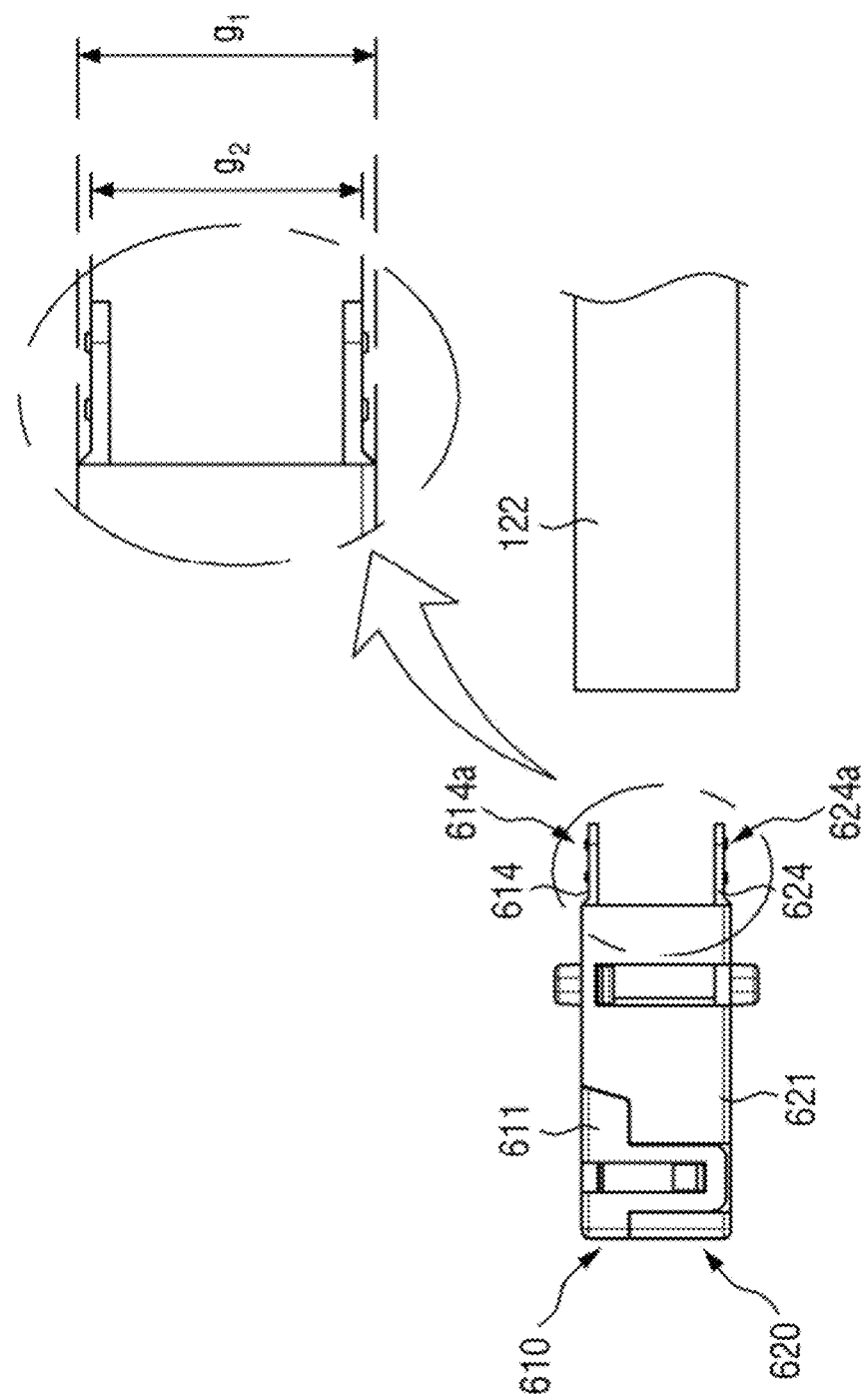

FIG. 7a and FIG. 7b are schematic drawings provided to explain the assembly of #1 stopper of the present invention and the exterior tubular part of a flexible belt member.

With reference to FIG. 7a and FIG. 7b, the upper #1 stopper 610 comprises upper #1 extension plate 614 extended from the other side of the upper #1 cover 611 toward the longitudinal direction Y-axis of the upper #1 cover 611, while the top surface of the upper #1 extension plate 614 comprises multiple upper #1 extension plate lump 614a.

Further, the lower #1 stopper 620 comprises lower #1 extension plate 624 extended from the other side of the lower #1 cover 621 toward the longitudinal direction Y-axis of the lower #1 cover 621, while the top surface of the lower #1 extension plate 624 comprises multiple lower #1 extension plate lump 624.

Where the upper #1 extension plate 614 is arranged to be displaced by #1 step from the upper #1 cover 611; and the lower #1 extension plate 624 is arranged to be displaced by #2 step from the lower #1 cover 621.

Therefore, in the present invention, the distance between the upper #1 cover 611 and the lower #1 cover 621 g1 is larger than the distance between the upper #1 extension plate 614 and the lower #1 extension plate 624 g2.

The present invention adopts this configuration to insert the upper #1 extension plate 614 and the lower #1 extension plate 624 to the external tubular member 122 of the aforesaid flexible belt member 120.

Further, as described above, the flexible belt member 120 comprises: multiple internal tubular members 121 that accommodates a cable; and one couple of external tubular members 122 accommodating an articulated supporting member, which are each located outside of the internal tubular members.

Where, in the present invention, the upper #1 extension plate 614 and the lower #1 extension plate 624 are inserted to the internal void of the external tubular member 122.

In such case, the external tubular member 122 features a specific thickness, thus, as described above, the upper #1 extension plate 614 is arranged to be displaced by #1 step from the upper #1 cover 611; and the lower #1 extension plate 624 is arranged to be displaced by #2 step from the lower #1 cover 621, with consideration to the thickness of the external tubular member 122.

In particular, as illustrated in FIG. 1b and FIG. 1c, the layer #1-side #1 clamp member 210 and the layer #1-side #2 clamp member 220 adjoins to conform #1 specific space 230, and the #1 stopper 600 is located at the #1 specific space 230 whilst connected to the end of one side of the articulated supporting member 400; by adjusting the specific thickness of the external tubular member with the #1 step and the #2 step, the present invention can prevent the top and bottom surface of the #1 stopper 600 from not being in close contact with the layer #1-side #1 clamp member 210 and the layer #1-side #2 clamp member 220 with the thickness of the external tubular member.

Thus, in the present invention, the top and bottom surface of the #1 stopper 600 are in close contact with the layer #1-side #1 clamp member 210 and the layer #1-side #2 clamp member 220 that prevents the #1 stopper from falling off from the #1 specific space 230.

Thus, in the present invention, with the multiple upper #1 extension plate lumps 614a formed on the top surface of the upper #1 extension plate 614 and with the multiple lower #1 extension plate lumps 624 formed on the top surface of the lower #1 extension plate 624, the upper #1 extension plate 614 and the lower #1 extension plate 624 are prevented from falling off from the internal void of the external tubular member 122.

The following provides explanation on details of #2 stopper of the present invention.

Figure 8A:
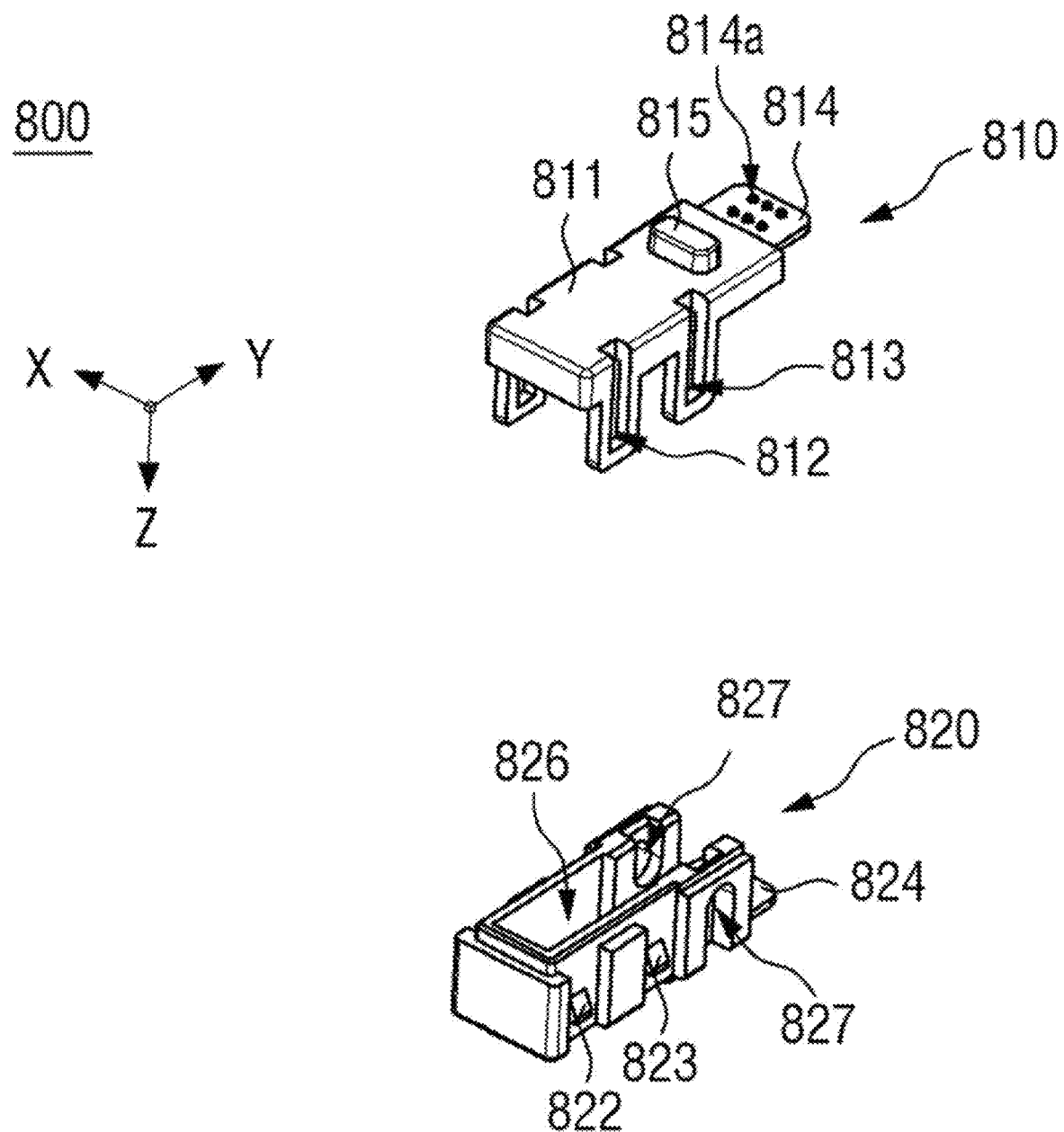
FIG. 8a is an assembly and exploded view of #2 stopper of the present invention from one perspective.
Figure 8B:
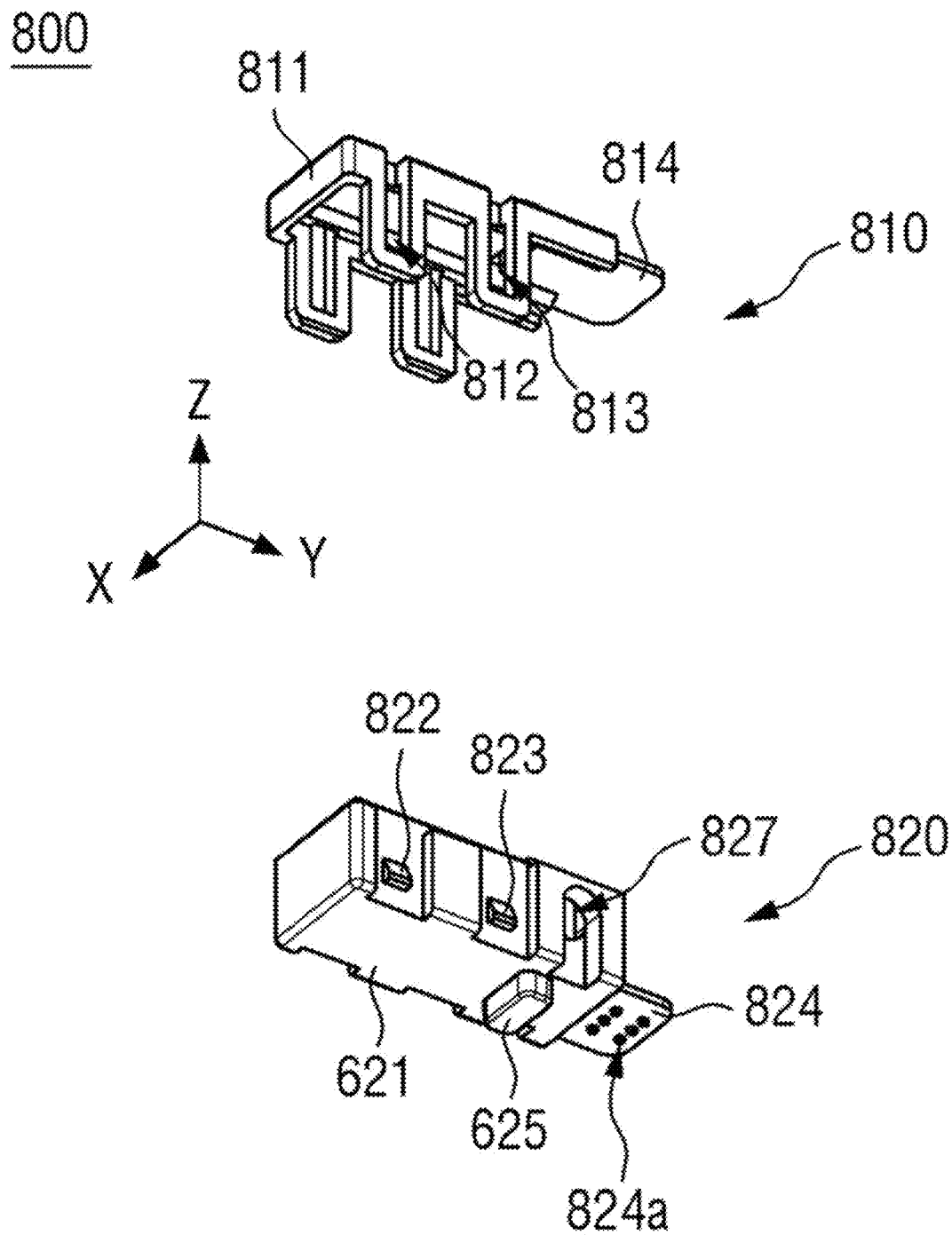
FIG. 8b is an assembly and exploded view of #2 stopper of the present invention from another perspective.
Figure 8C:
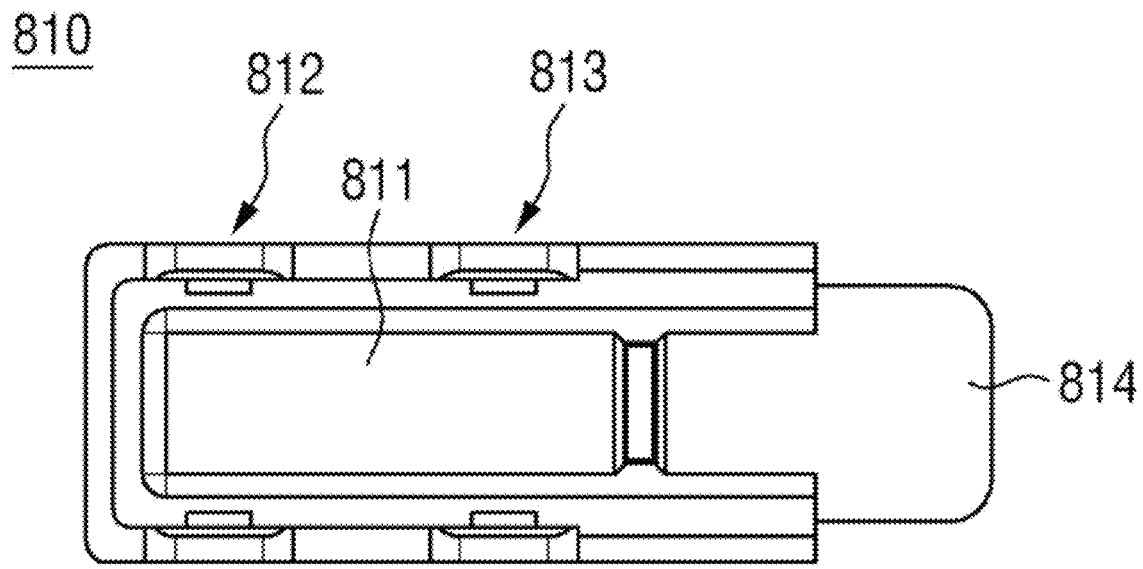
FIG. 8c is an internal plan view illustrating the upper #2 stopper.
Figure 8D:
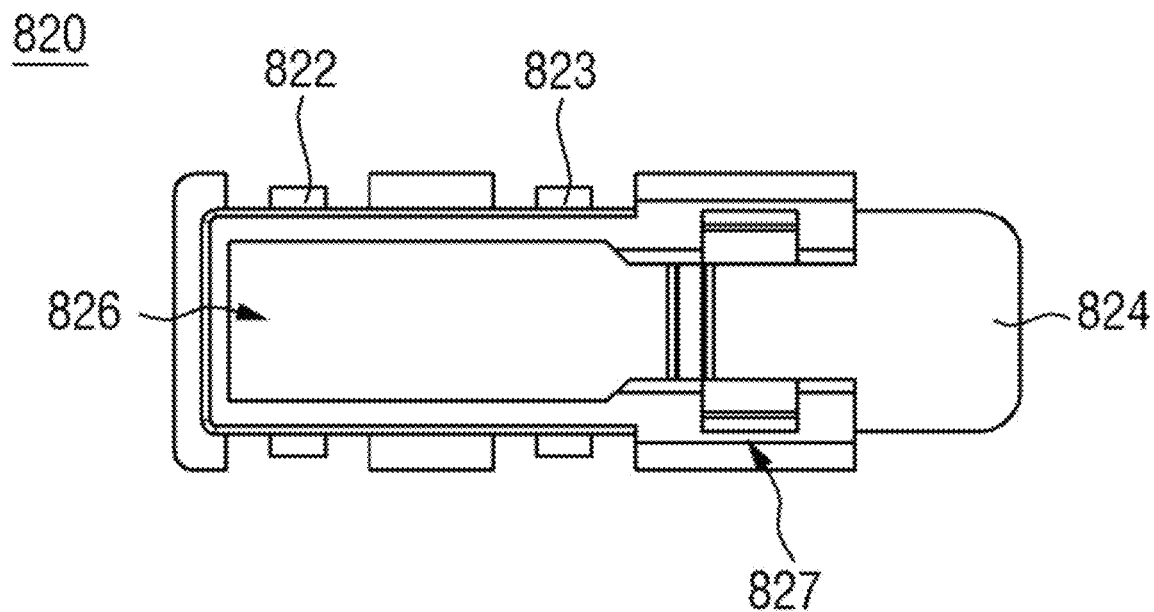
FIG. 8d is an internal plan view illustrating the lower #2 stopper.
Figure 8E:
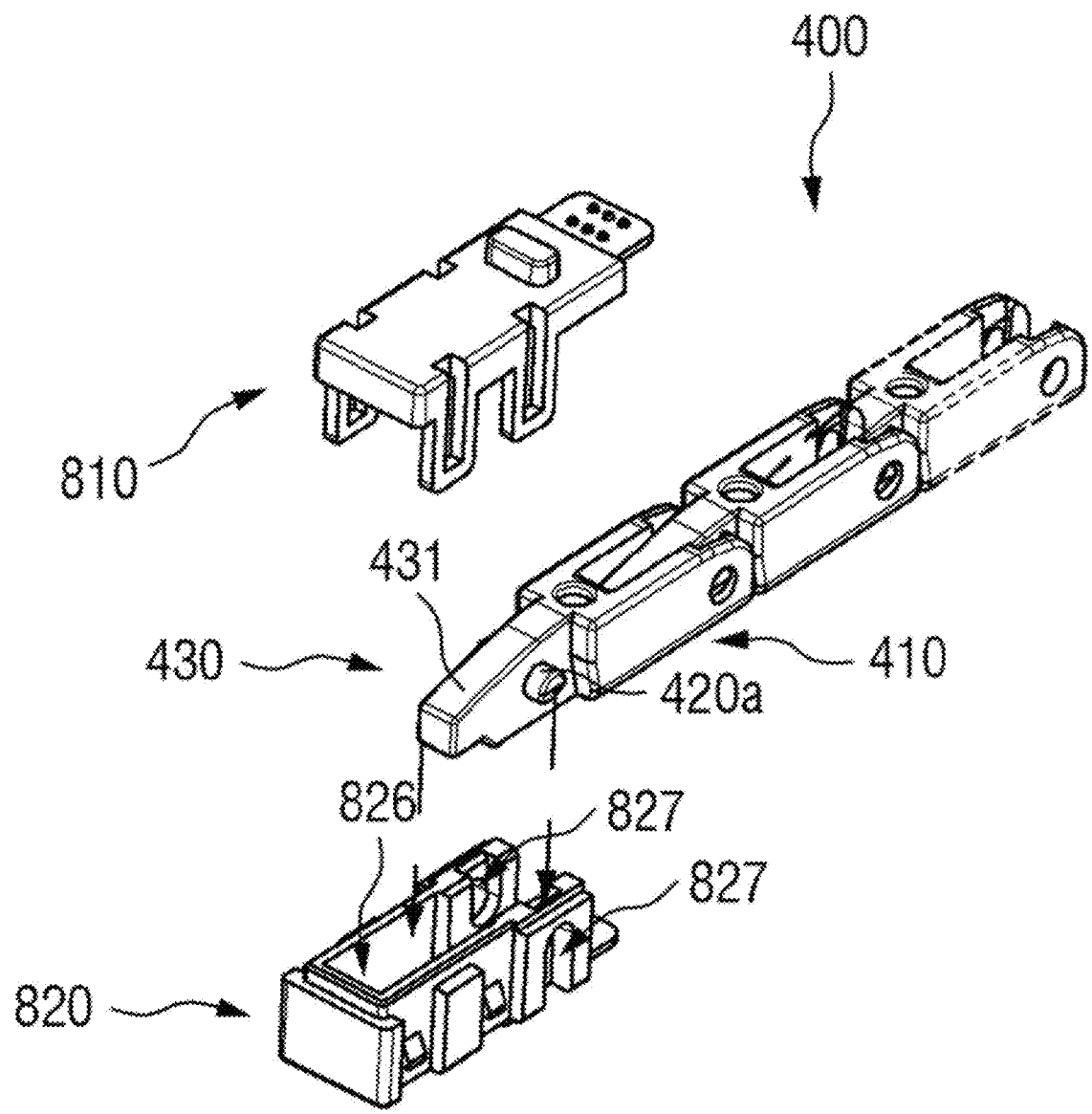
FIG. 8e is an assembly and exploded view provided to explain the assembly of #2 stopper of the present invention to the front body of the articulated supporting member block from one perspective.

FIG. 8a is an assembly and exploded view of #2 stopper of the present invention from one perspective; FIG. 8b is an assembly and exploded view of #2 stopper of the present invention from another perspective; FIG. 8c is an internal plan view illustrating the upper #2 stopper; FIG. 8d is an internal plan view illustrating the lower #2 stopper; FIG. 8e is an assembly and exploded view provided to explain the assembly of #2 stopper of the present invention to the front body of the articulated supporting member block from one perspective; and FIG. 8f is an assembly and exploded view provided to explain the assembly of #2 stopper of the present invention to the front body of the articulated supporting member block from another perspective.

With reference to FIG. 8a through 8d, #2 stopper 800 of the present invention comprises: upper #2 stopper 810 and lower #2 stopper 820 adjoining the upper #2 stopper 810.

Figure 8F:
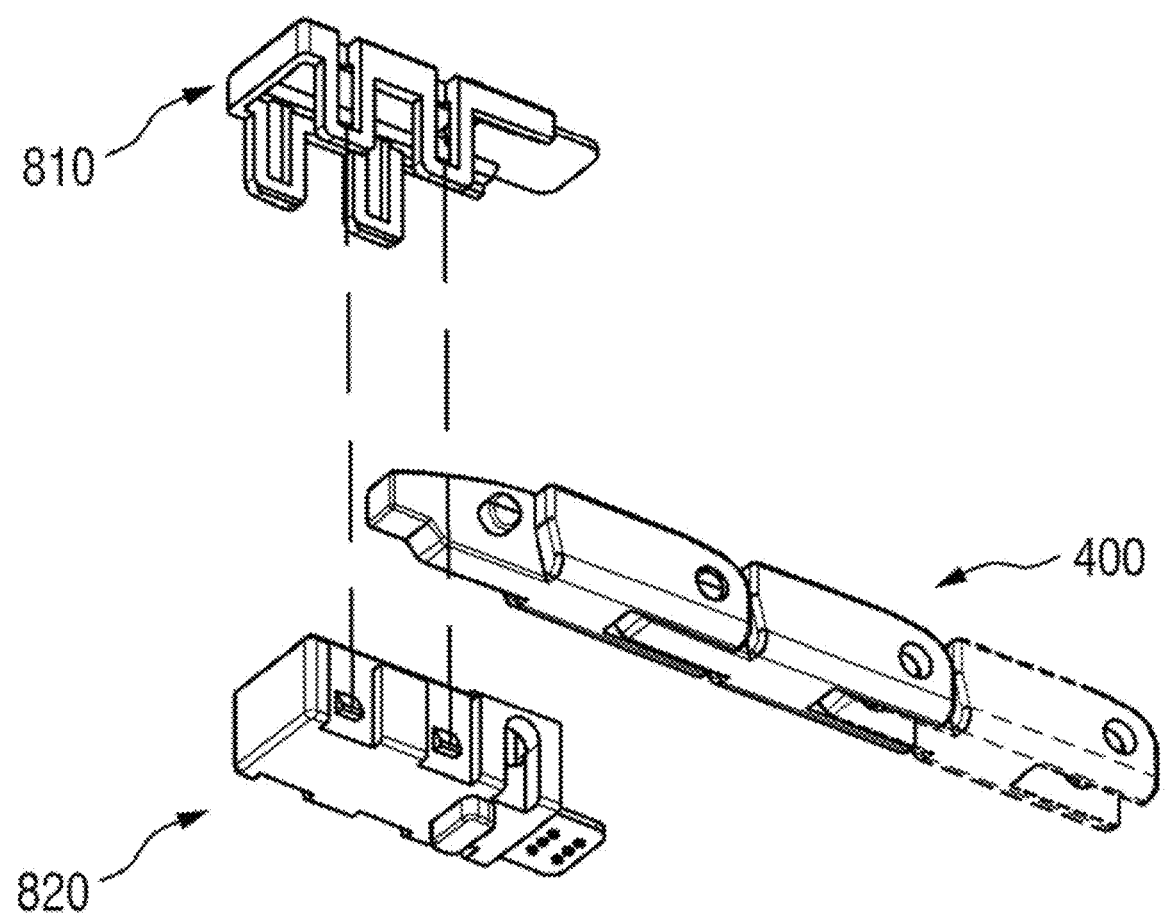
FIG. 8f is an assembly and exploded view provided to explain the assembly of #2 stopper of the present invention to the front body of the articulated supporting member block from another perspective.

Where, as illustrated in FIG. 8e and FIG. 8f, #2 stopper 800 of the present invention is adjoined to the front body 410 of a block 410 which conforms the individual unit of an articulated supporting member 400.

In particular, the upper #2 stopper 810 comprises: upper #2 cover 811; upper #2 cover #1 assembly groove 812, located at one side of the upper #2 cover 811 and extended toward the polar direction Z-axis of the upper #1 cover 811; and upper #2 cover #1 assembly lump area 813, located adjacent to upper #2 cover #1 assembly groove 812 and extended toward the polar direction Z-axis of the upper #2 cover 811.

Where, the upper #2 stopper 810 is located on the top surface of the upper #2 cover 811, and comprises upper #2 cover lump area 815 that is inserted to the #2 upper slit 313 of the #2 upper plate 311 illustrated in FIG. 1d and FIG. 1f.

Thus, by inserting the upper #2 cover lump 815 in the #2 upper slit 313 of the #2 upper plate 311, the #2 stopper 800 can be prevented from moving in transverse Y-axis of the #2 upper plate 311.

Further, the upper #2 stopper 810 comprises upper #2 extension plate 814 extended from the other side of the upper #2 cover 811 toward the longitudinal direction Y-axis of the upper #2 cover 811, while the top surface of the upper #2 extension plate 814 comprises multiple upper #2 extension plate lumps 814a. Details of such configuration shall be addressed later in this specification.

In particular, the lower #2 stopper 820 comprises: lower #2 cover 821; lower #2 cover #1 assembly lump 822, located at one side of the lower #2 cover 821 and projecting toward the transverse direction X, −X of the lower #2 cover 821; and lower #2 cover #2 assembly lump area 823, located adjacent to the lower #2 cover #1 assembly lump 822 and extended toward the transverse direction X, −X of the lower #2 cover #2 assembly lump area 821.

Thus, as the upper #2 cover #1 assembly groove 812 of the upper #2 stopper 810 is adjoined with the lower #2 cover #1 assembly lump 822 of the lower #2 stopper 820, and the lower #2 cover #2 assembly grove 813 of lower #2 stopper 810 is adjoined with lower #2 cover #2 assembly lump 823 of lower #2 stopper 820, the lower #2 stopper 810 and the lower #2 stopper 820 are adjoined to conform #2 stopper 800.

Where, the lower #2 stopper 820 is located on the top surface of the lower #2 cover 821, and comprises lower #2 cover lump area 825 that is inserted to the #2 lower slit 323 of the #2 lower plate 321 illustrated in FIG. 1d and FIG. 1e.

Thus, by inserting the lower #2 cover lump 825 in the #2 lower slit 323 of the #2 lower plate 321, the #2 stopper 800 can be prevented from moving in transverse Y-axis of the #2 lower plate 321.

Further, the lower #2 stopper 820 comprises lower #2 extension plate 824 extended from the other side of the lower #2 cover 821 toward the longitudinal direction Y-axis of the lower #2 cover 821, while the top surface of the lower #2 extension plate 824 comprises multiple lower #2 extension plate lumps 624a. Details of such configuration shall be addressed later in this specification.

Further, the lower #2 stopper 820 comprises: space member 826 located inside of the lower #2 cover 821; and a couple of assembly holes 827, located on the other side of the lower #2 cover 821, formed toward the transverse direction X, −X of the lower #2 cover 821 on both the left and the right side.

As described above, with reference to FIG. 5a, the front body 420 of the block 400 of the present invention comprises: front body 431 and one couple of connecting pins 420a that are located on both sides of the front body 431.

Further, as described above, #2 stopper 800 of the present invention adjoins the front body 430 of a block 410 that is an individual unit of the articulated supporting member 400.

Where, as illustrated in FIG. 8e and FIG. 8f, whilst the front body 431 of the block 400 is inserted to the space member 826 located on the inside of the lower #2 cover 821, by adjoining the couple of connecting pins 420a of the front body 430 with the couple of assembly holes 827 formed toward the transverse direction X, −X of the lower #2 cover 821 on both the left and the right side, the individual unit block 410 is assembled with the #2 stopper 800.

The following provides explanation on details of the assembly of #2 stopper and external tubular member of flexible belt member.

Figure 9A:
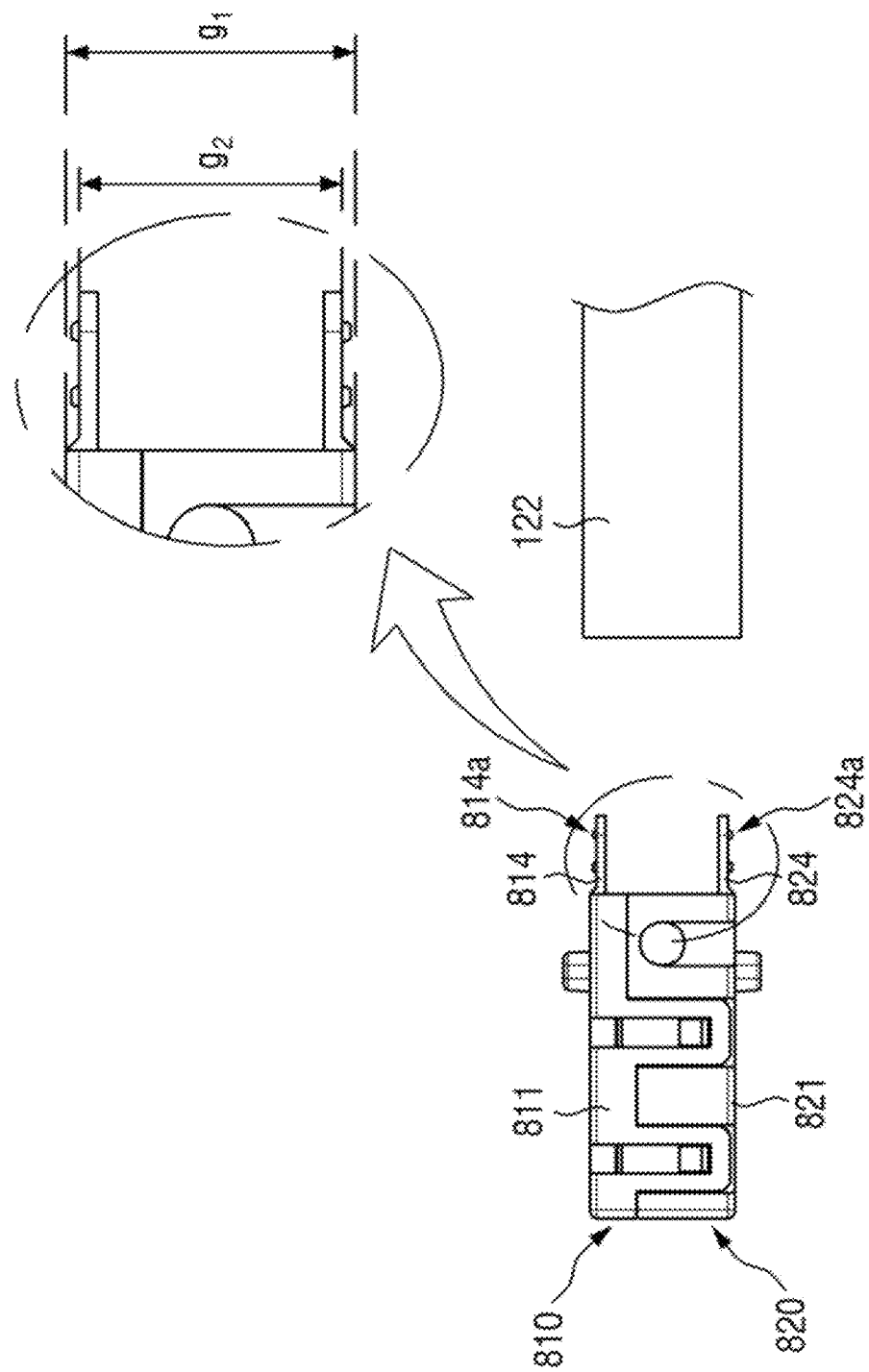
FIG. 9a and FIG. 9b are schematic drawings provided to explain the assembly of #2 stopper of the present invention and the exterior tubular part of a flexible belt member.
Figure 9B:
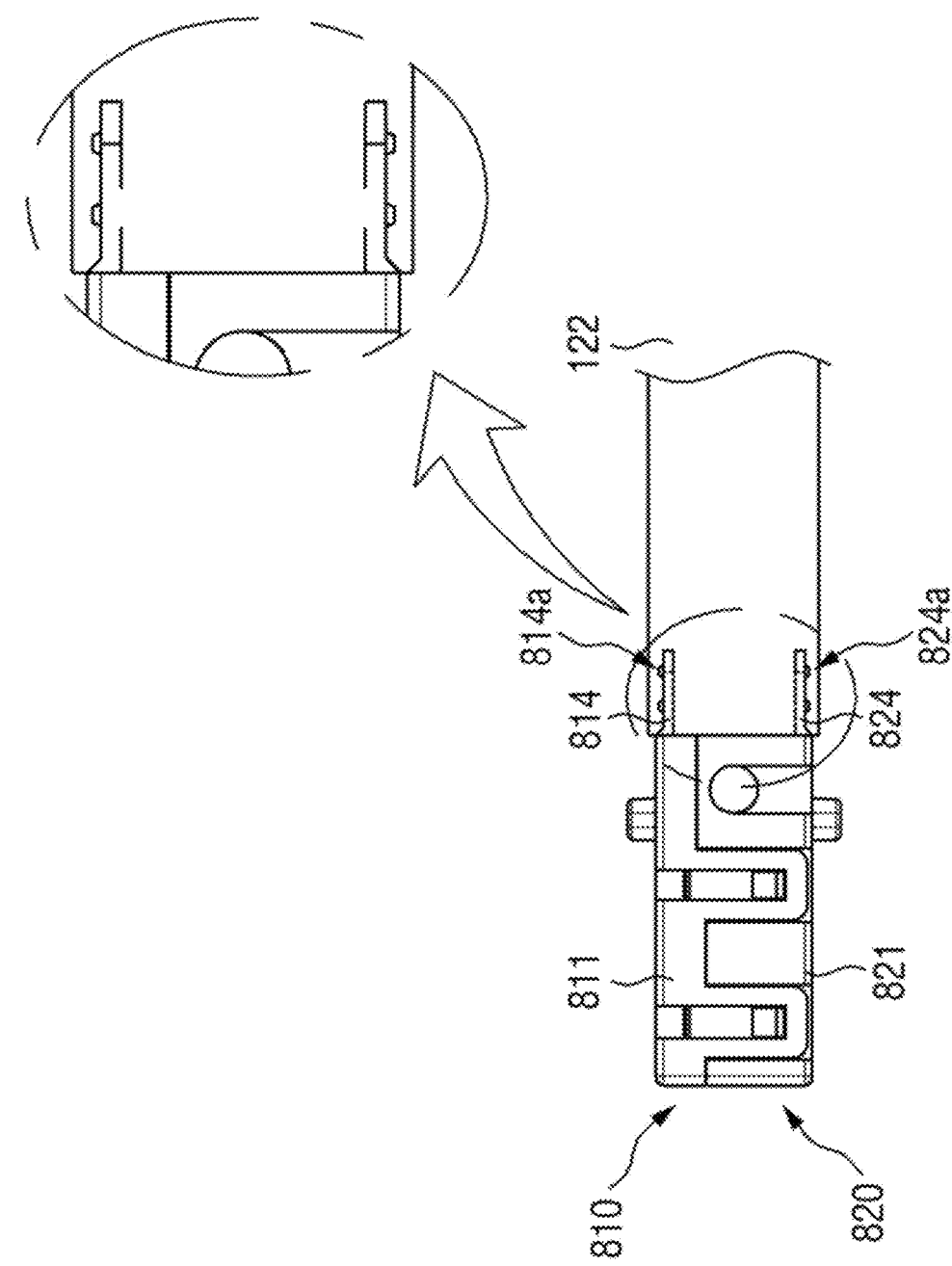

FIG. 9a and FIG. 9b are schematic drawings provided to explain the assembly of #2 stopper of the present invention and the exterior tubular part of a flexible belt member.

With reference to FIG. 9a and FIG. 9b, the upper #2 stopper 810 comprises upper #2 extension plate 814 extended from the other side of the upper #2 cover 811 toward the longitudinal direction Y-axis of the upper #2 cover 811, while the top surface of the upper #2 extension plate 814 comprises multiple upper #2 extension plate lumps 814a.

Further, the lower #2 stopper 820 comprises lower #2 extension plate 824 extended from the other side of the lower #2 cover 821 toward the longitudinal direction Y-axis of the lower #2 cover 821, while the top surface of the lower #2 extension plate 824 comprises multiple lower #2 extension plate lumps 824a.

Where the upper #2 extension plate 814 is arranged to be displaced by #1 step from the upper #2 cover 811; and the lower #2 extension plate 824 is arranged to be displaced by #2 step from the lower #2 cover 821.

Therefore, in the present invention, the distance between the upper #2 cover 811 and the lower #2 cover 821 g1 is larger than the distance between the upper #2 extension plate 814 and the lower #2 extension plate 824 g2.

The present invention adopts this configuration to insert the upper #2 extension plate 814 and the lower #2 extension plate 824 to the external tubular member 122 of the aforesaid flexible belt member 120.

Further, as described above, the flexible belt member 120 comprises: multiple internal tubular members 121 that accommodates a cable; and one couple of external tubular members 122 accommodating an articulated supporting member, which are each located outside of the internal tubular members.

Where, in the present invention, the upper #2 extension plate 814 and the lower #2 extension plate 824 are inserted to the internal void of the external tubular member 122.

In such case, the external tubular member 122 features a specific thickness, thus, as described above, the upper #2 extension plate 814 is arranged to be displaced by #1 step from the upper #2 cover 811; and the lower #2 extension plate 824 is arranged to be displaced by #2 step from the lower #2 cover 821, with consideration to the thickness of the external tubular member 122.

In particular, as illustrated in FIG. 1c and FIG. 1d, the layer #2-side #1 clamp member 310 and the layer #2-side #2 clamp member 320 adjoins to conform #2 specific space 330, and the #2 stopper 800 is located at the #2 specific space 330 whilst connected to the end of the other side of the articulated supporting member 400; by adjusting the specific thickness of the external tubular member with the #1 step and the #2 step, the present invention can prevent the top and bottom surface of the #2 stopper 800 from not being in close contact with the layer #2-side #1 clamp member 310 and the layer #2-side #2 clamp member 320 with the thickness of the external tubular member.

Thus, in the present invention, the top and bottom surface of the #2 stopper 800 are in close contact with the layer #2-side #1 clamp member 310 and the layer #2-side #2 clamp member 320 that prevents the #2 stopper from falling off from the #2 specific space 330.

Thus, in the present invention, with the multiple upper #2 extension plate lumps 814a formed on the top surface of the upper #2 extension plate 814 and with the multiple lower #2 extension plate lumps 824 formed on the top surface of the lower #2 extension plate 824, the upper #2 extension plate 814 and the lower #2 extension plate 824 are prevented from falling off from the internal void of the external tubular member 122.

The following provides explanation on details of the belt member 110 of the present invention.

As described above, for the convenience of explaining FIG. 1a through FIG. 1c, the belt member of the present invention is presented in the shape of generally applied belt members.

For general belt members, as described above and as illustrated in FIG. 1a through FIG. 1c, when belt members are stacked in multiple layers, for instance, stacking layer #1 belt member and layer #2 belt member, there are occasions where the layer #1 belt member and the layer #2 belt member fall off from each other.

Therefore, with the belt member configuration as described below, the present invention provides a belt member that can be prevented to fall off when belt members are stacked to multiple layers.

Figure 10A:
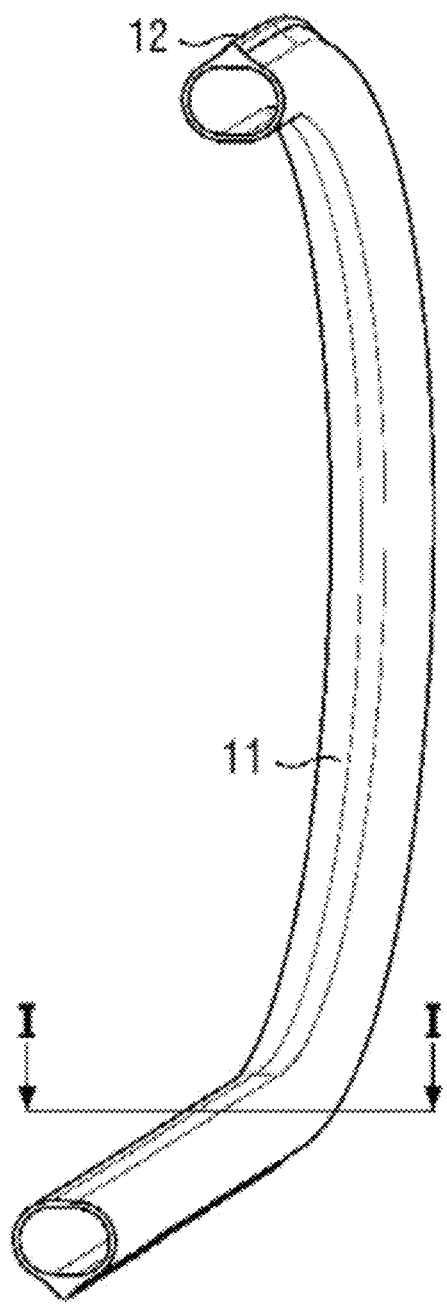
FIG. 10a is a perspective view of a belt member unit according to #1 embodiment.
Figure 10B:
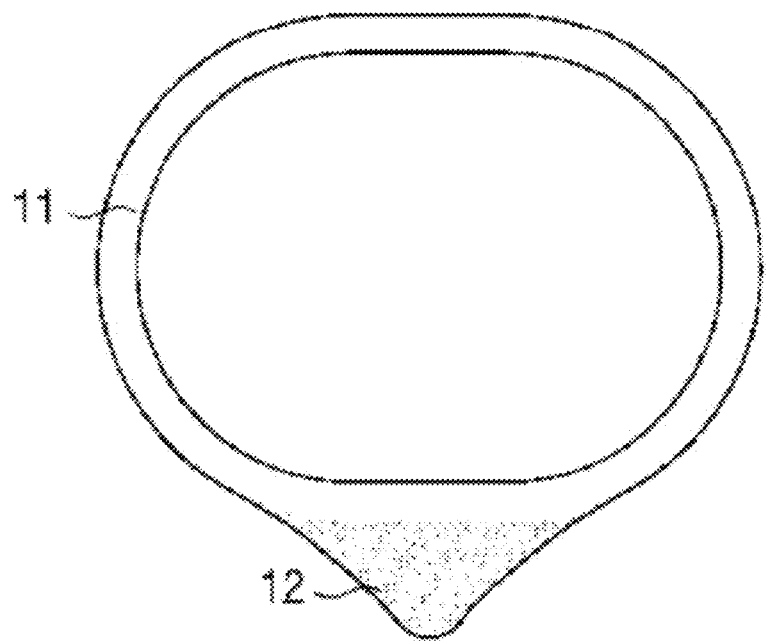

FIG. 10a is a perspective view of a belt member unit according to #1 embodiment; and FIG. 10b is the cross sectional drawing of I-I line from FIG. 10a.

With reference to FIG. 10a and FIG. 10b of #1 embodiment of the present invention, belt member unit 10 comprises: a tubular body 11; and #1 protrusion area 12 located at #1 predetermined position of the body 11.

Where FIG. 10a and FIG. 10b illustrates the cross section of the tubular body 11 to be elliptical, conversely, the cross-section of the tubular body 11 may be circular, thus, the present invention does not limit the shape of the cross-section of the tubular body 11.

With further reference to FIG. 10a and FIG. 10b of #1 embodiment of the present invention, as described above, the #1 protrusion area 12 of belt member unit 10 may be located at #1 predetermined position of the body 11, where the #1 predetermined position may be either the top surface or the bottom surface of the body 11, e.g. as illustrated in FIG. 10b, the #1 predetermined position may be the bottom surface of the body 11

Indication of top surface and/or bottom surface of the body 11 is provided only for the convenience of explanation. The present invention does not limit the meaning of the top surface and the bottom surface.

Further, as illustrated in drawings, the cross-section of the #1 protrusion area 12 may be a triangle; provided that, the present invention does not limit the shape of the cross-section of the #1 protrusion area 12.

Figure 11A:
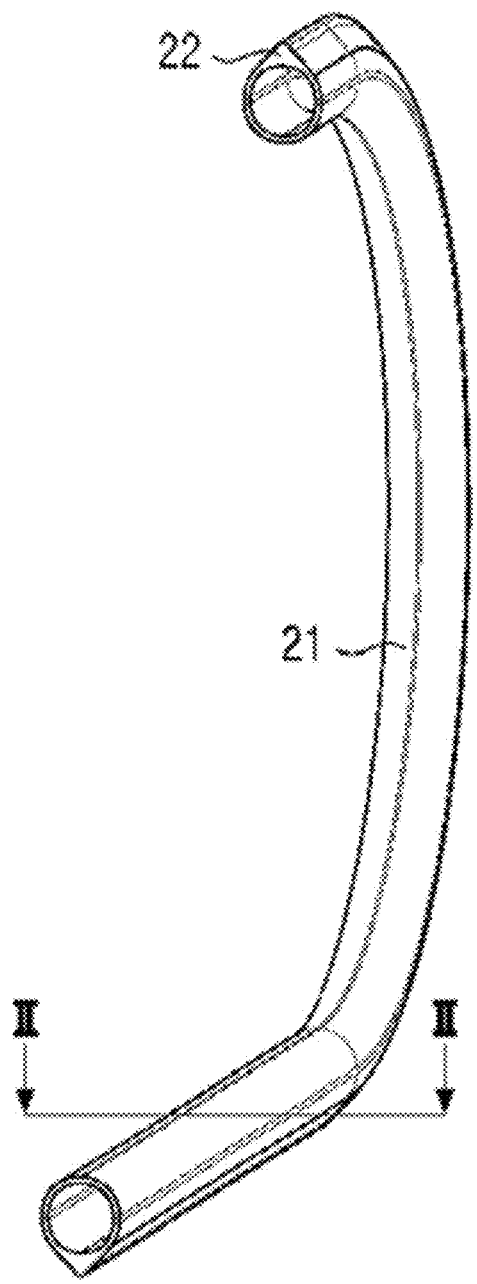
FIG. 11a is a perspective view of a belt member unit according to #2 embodiment.
Figure 11B:
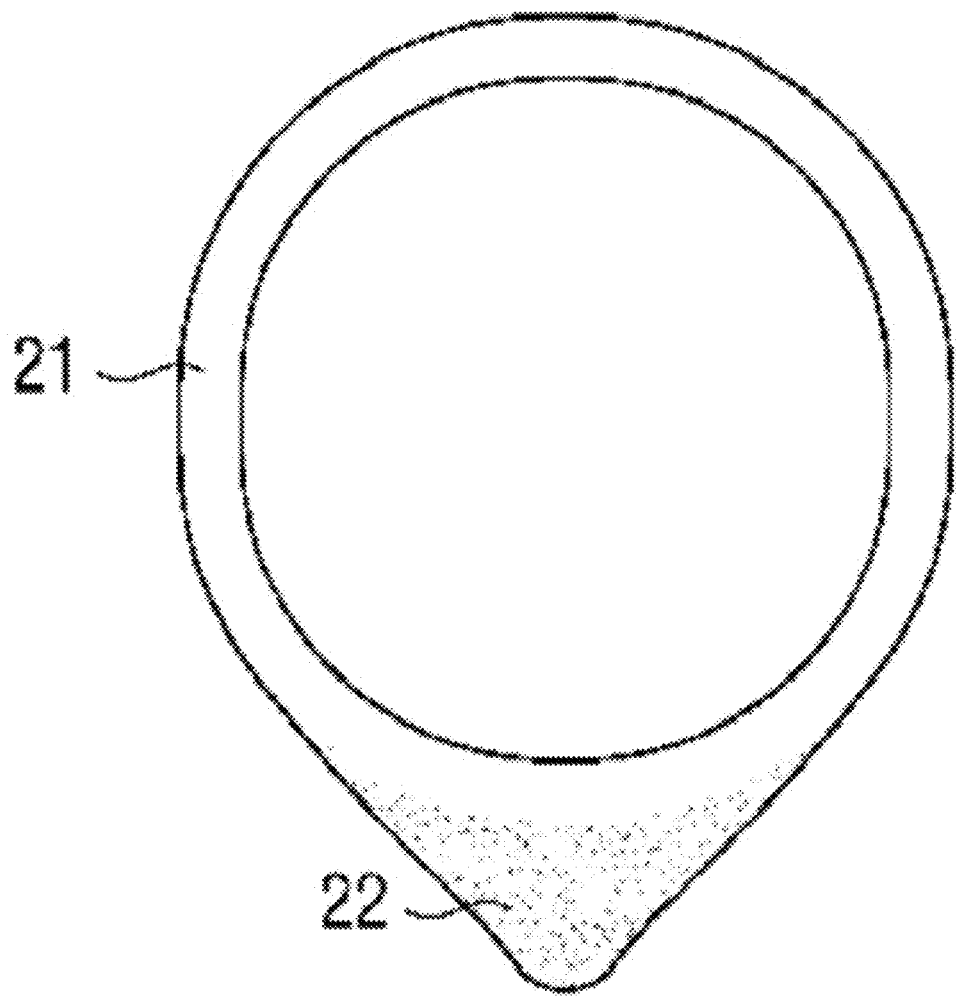

FIG. 11a is a perspective view of a belt member unit according to #2 embodiment; and FIG. 11b is the cross sectional drawing of II-II line from FIG. 11a.

With reference to FIG. 11a and FIG. 11b of #2 embodiment of the present invention, belt member unit 20 comprises: a tubular body 21; and #1 protrusion area 22 located at #1 predetermined position of the body 21.

Where, as described above, FIG. 10a and FIG. 10b illustrates the cross section of the tubular body 11 to be elliptical, conversely, with reference to FIG. 11a and FIG. 11b, the cross-section of the tubular body 21 may be circular, thus, the present invention does not limit the shape of the cross-section of the tubular body 21.

Figure 12A:
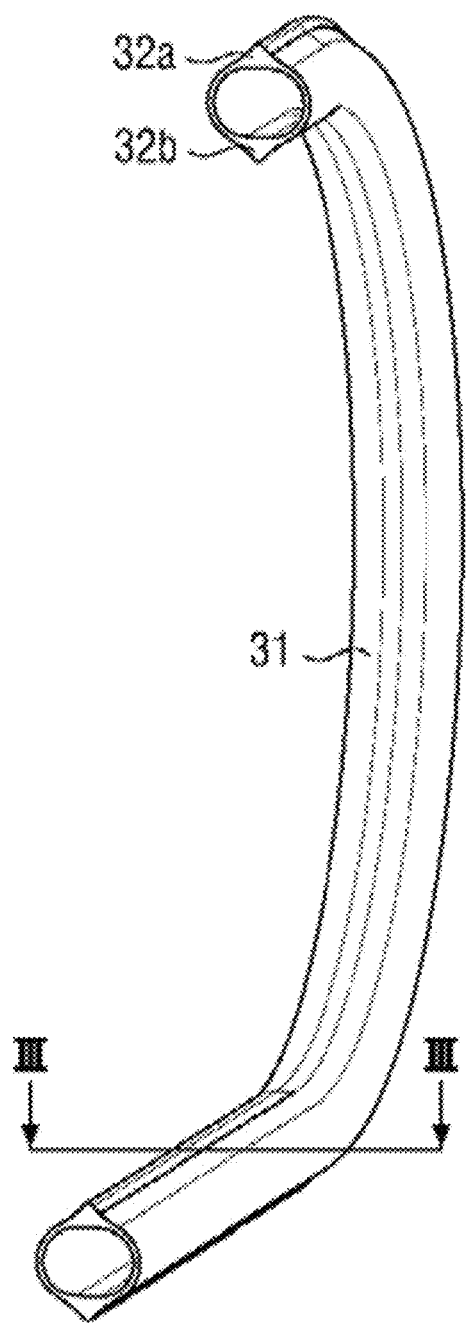
FIG. 12a is a perspective view of a belt member unit according to #3 embodiment.
Figure 12B:
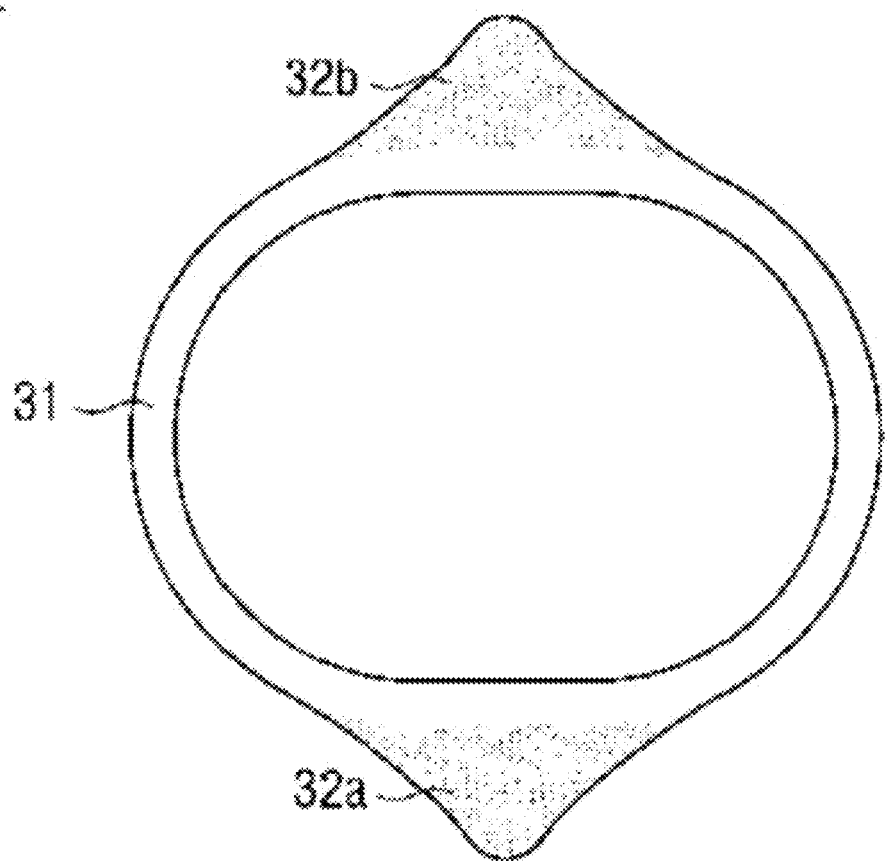

FIG. 12a is a perspective view of a belt member unit according to #3 embodiment; and FIG. 12b is the cross sectional drawing of III-III line from FIG. 12a.

With reference to FIG. 12a and FIG. 12b of #3 embodiment of the present invention, belt member unit 30 comprises: a tubular body 31; #1 protrusion area 32a located at #1 predetermined position of the body 31; and #2 protrusion area 32b located at #2 predetermined position of the body 31

Where, the #1 predetermined position may be the bottom surface of the body 31, and the #2 predetermined position may be the top surface of the body 31; provided that, the present invention does not limit the meaning of the top surface and the bottom surface.

Where, FIG. 10a and FIG. 10b illustrates the protrusion area to be located only on the bottom surface of the body; provided that, for the present invention, the protrusion area may be located on both the top surface and bottom surface of the body, at the same time, as illustrated in FIG. 12a and FIG. 12b.

Where FIG. 12a and FIG. 12b illustrates the cross section of the tubular body 13 to be elliptical, conversely, the cross-section of the tubular body 31 may be circular. Details of such configuration have been addressed above, and thus no further explanation will be provided.

Figure 13A:
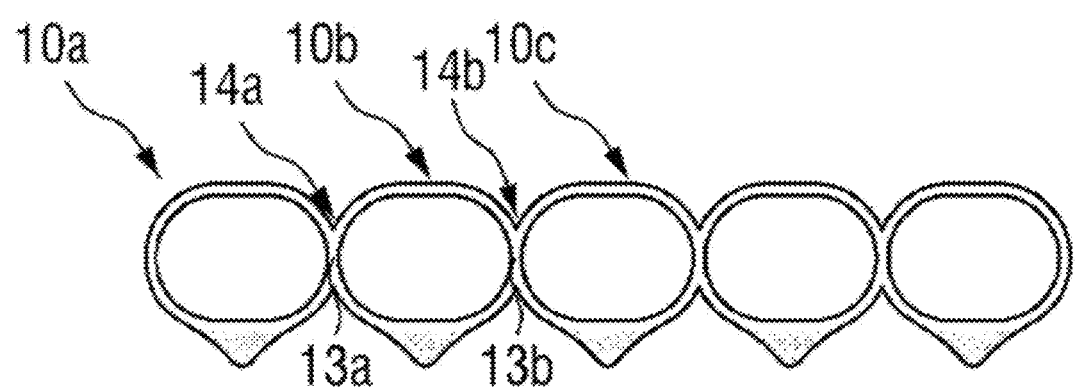
FIG. 13a is a perspective view of an example where multiple belt member units of this present invention are adjoined.
Figure 13B:
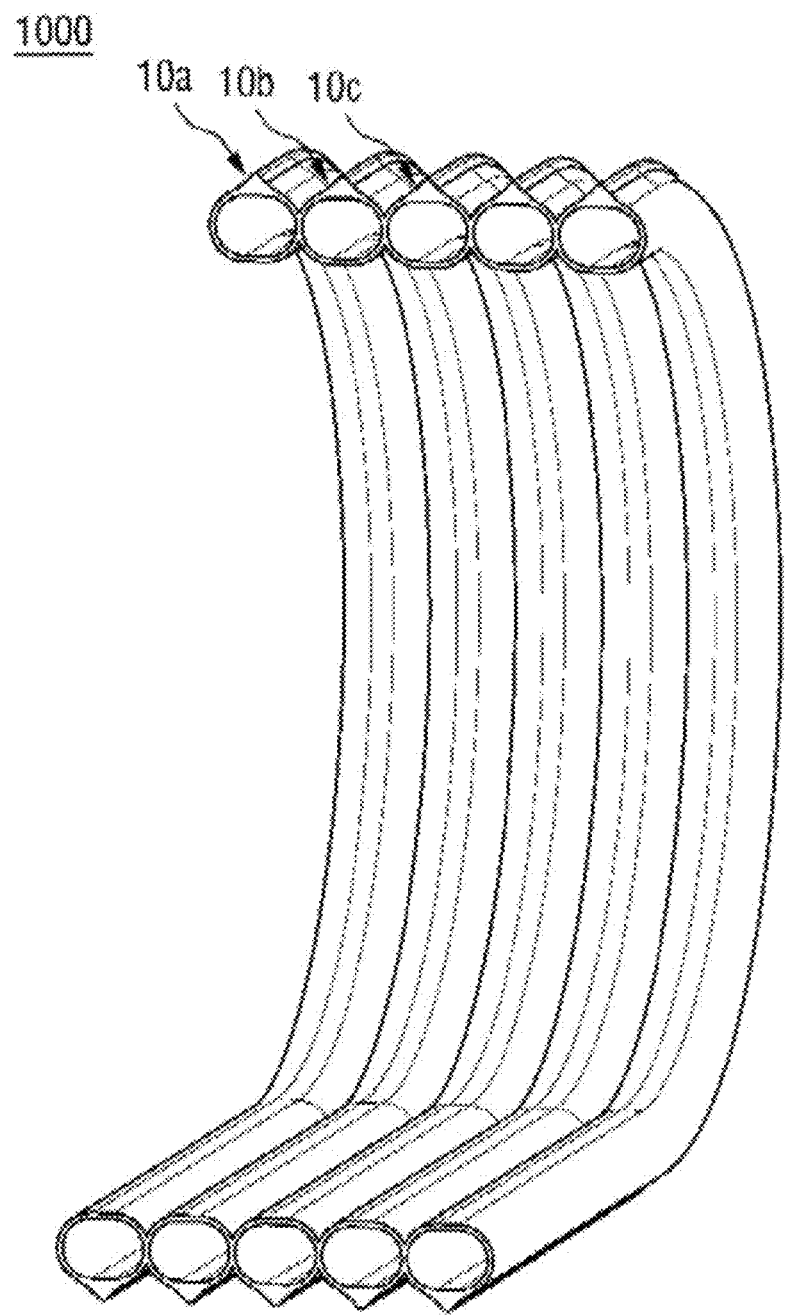
FIG. 13b is a schematic cross-sectional drawing of an example where multiple belt member units of this present invention are adjoined.

FIG. 13a is a perspective view of an example where multiple belt member units of this present invention are adjoined; and FIG. 13b is a schematic cross-sectional drawing of an example where multiple belt member units of this present invention are adjoined.

FIG. 13a and FIG. 13b illustrate the same belt member unit illustrated in FIG. 10a and FIG. 10b.

With reference to FIG. 13a and FIG. 13b, in the present invention, layer #1 belt member 1000 may be assembled by horizontally adjoining multiple belt member units 10a, 10b, 10c, . . . .

Further, the #1 belt member 1000 comprises, with reference to a case with belt member #1 unit 10a and belt member #2 unit 10b: #1 connection point 13a at which the belt member #1 unit 10a and the belt member #2 unit 10b are adjoined; and #1 space 14a above the #1 connection point 13a.

Where, the #1 connection point 13a is located in an area in which a protrusion area described above is not formed.

For instance, protrusion areas may be formed on each bottom surface of the belt member #1 unit 10a and the belt member #2 unit 10b, however the side surfaces at which protrusion areas are not formed, i.e. #1 side surface of the belt member #1 unit 10a and #2 surface of the belt member #2 unit 10b can make contact to conform #1 connection point 13a.

Further, in the present invention, the #1 space 14a means the area opposite to the location at which the protrusion area is formed; in further details, since protrusion areas may be formed on the bottom surface of the belt member #1 unit 10a and the bottom surface of the belt member #2 unit 10b, thus the #1 space 14a can mean the area opposite to that at which the protrusion area is formed, which starts from the top surface of the belt member #1 unit 10a and the top surface the belt member #2 unit 10b, following the exterior of the belt member #1 unit 10a bod and the exterior of the belt member #2 unit 10b body, all the way to the #1 connection point 13a.

Further, with reference to belt member #2 unit 10b and belt member #3 unit 10c, #2 connection point 13b at which the belt member #2 unit 10b and the belt member #3 unit 10c are adjoined; and #2 space 14b above the #2 connection point 13b are included.

Definitions of the #2 connection point 13b and the #2 space 14b are given above, thus no further explanation will be provided.

Provided that, FIG. 13a and FIG. 13b illustrates 5 the belt member units, conversely, at least two or more the belt member unit may be assembled.

Figure 14A:
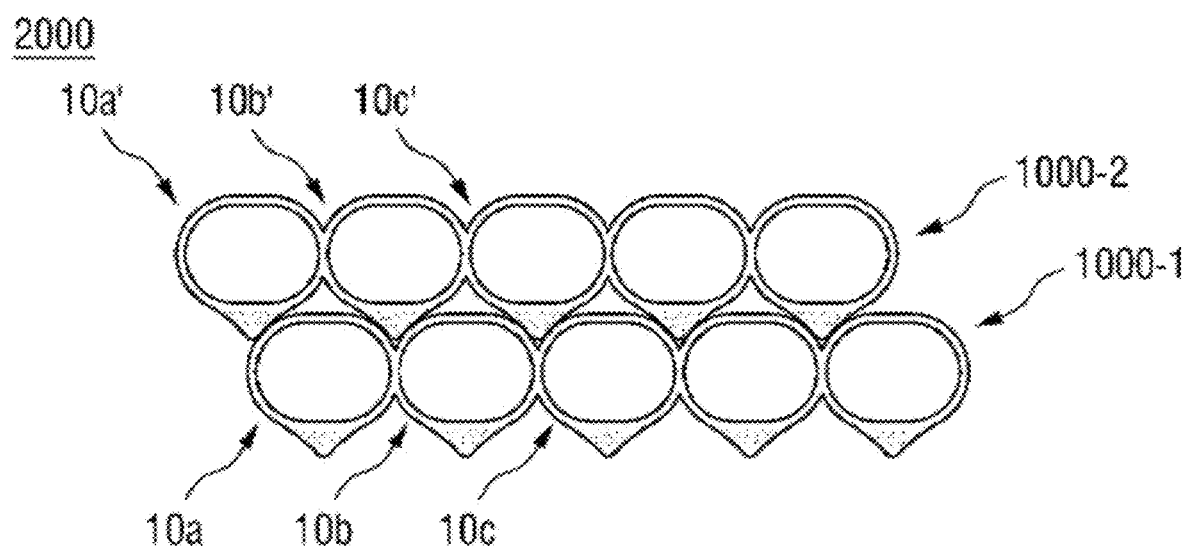
FIG. 14a is a schematic cross-sectional drawing of an example where layer #2 belt member is stacked on top of layer #1 belt member.
Figure 14B:
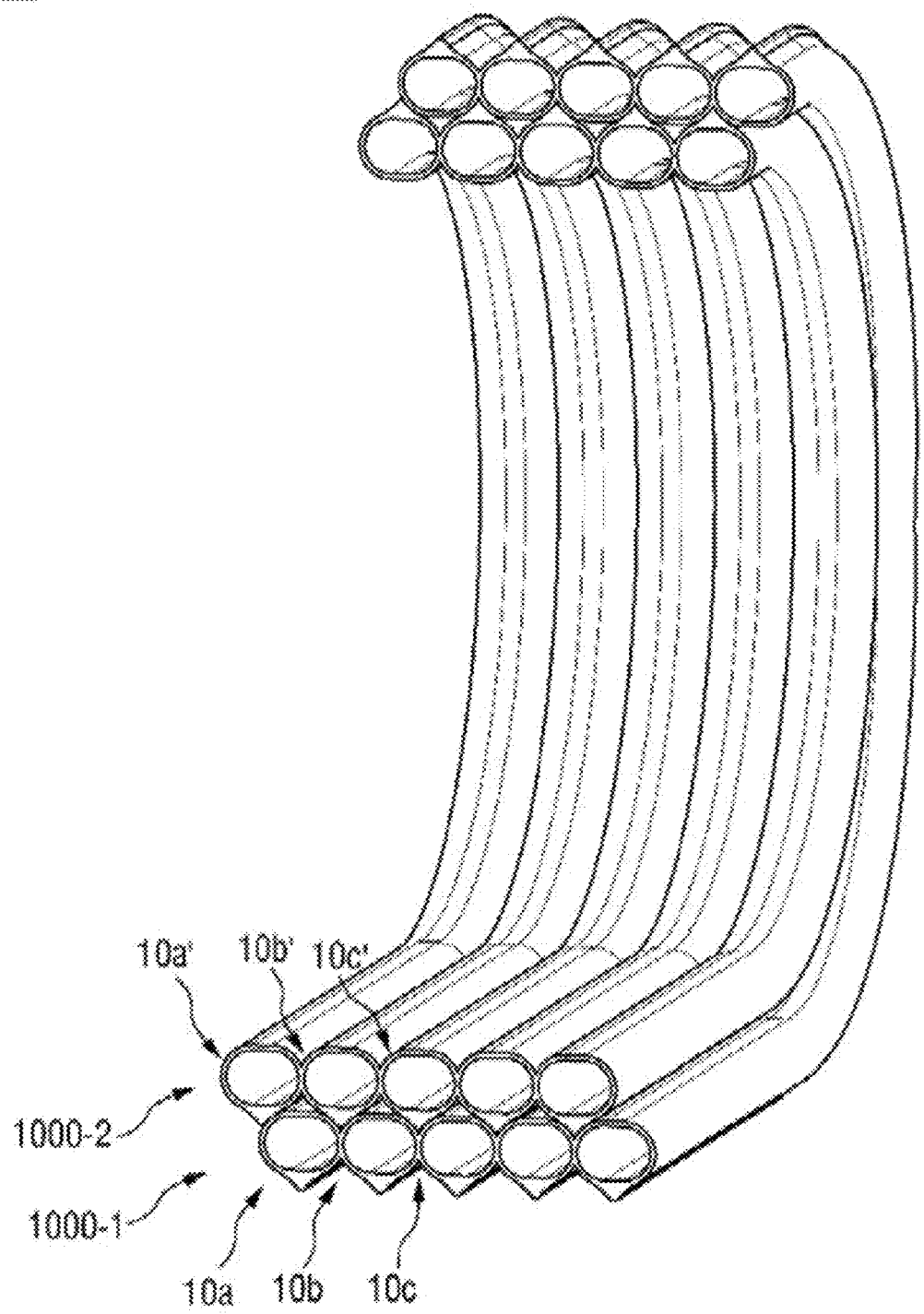
FIG. 14b is a schematic perspective view of an example where layer #2 belt member is stacked on top of layer #1 belt member.

FIG. 14a is a schematic cross-sectional drawing of an example where layer #2 belt member is stacked on top of layer #1 belt member; and FIG. 14b is a schematic perspective view of an example where layer #2 belt member is stacked on top of layer #1 belt member.

With reference to FIG. 14a and FIG. 14b, in the present invention, layer #1 belt member 1000-1 and layer #2 belt member 1000-2 may be stacked to conform a stacked belt member 2000.

Where the layer #1 belt member 1000-1 may comprise multiple belt member units 10a, 10b, 10c, . . . , and the layer #2 belt member 1000-2 may comprise multiple belt member units 10a', 10b', 10c', . . . .

Further, the layer #2 belt member 1000-2 may be located above the layer #1 belt member 1000-1, whilst the layer #2 belt member 1000-2 shall be misaligned by a specific displacement from the layer #1 belt member 1000-2.

In particular, as described above, the layer #1 belt member 1000-1 comprises multiple spaces FIG. 13a, #1 space 14a, #2 space 14b, etc. formed by the assembly of multiple belt member units; and the layer #2 belt member 1000-2 comprises multiple protrusion areas formed on each multiple belt member units 10a', 10b', 10c', . . . .

Where, the layer #2 belt member 1000-2 shall be arranged above the layer #1 belt member 1000-1 in a manner that allows each multiple protrusion area of the layer #2 belt member 1000-2 to be inserted to each multiple space of the layer #1 belt member 1000-1.

For instance, assuming that the layer #1 belt member 1000-1 comprises #1 space and #2 space, etc., while the layer #2 belt member 1000-2 comprises #1 protrusion area, #2 protrusion area, and #3 protrusion area, etc., the layer #2 belt member 1000-2 shall be located above the layer #1 belt member 1000-1 at an alignment where the #2 protrusion area is inserted in the #1 space, and the #3 protrusion area is inserted in the #2 space.

As described above, when general belt members are stacked in multiple layers, for instance, stacking layer #1 belt member and layer #2 belt member, there are occasions where the layer #1 belt member and the layer #2 belt member fall off from each other.

However, in the present invention, by inserting each protrusion area of the layer #2 belt member 1000-2 to each space of the layer #1 belt member 1000-1 as described above, the layer #2 belt member and the layer #1 belt member can be prevented from falling off from each other.

Figure 15A:
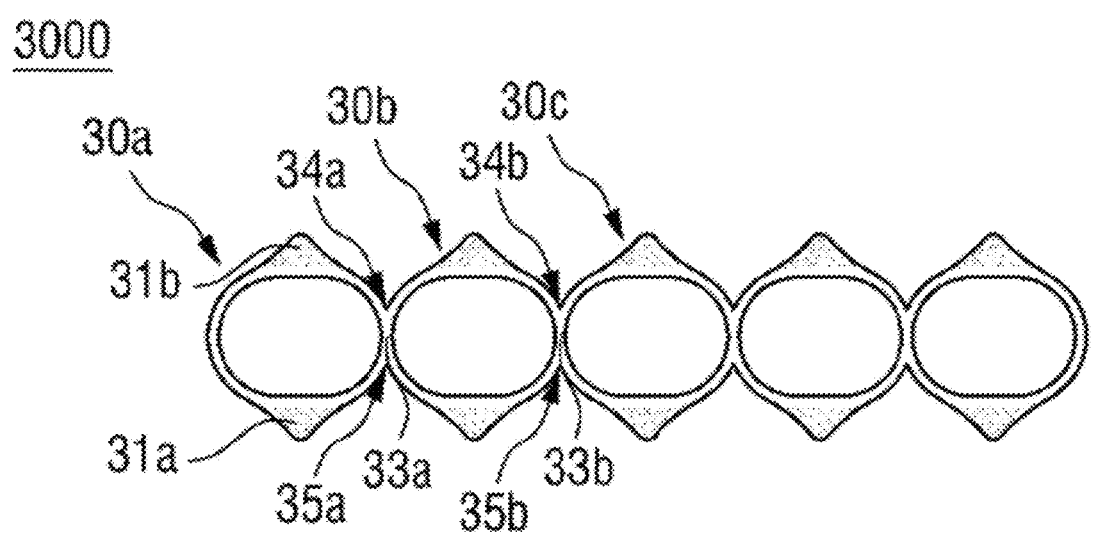
FIG. 15a is a perspective view of another example where multiple belt member units of this present invention are adjoined.
Figure 15B:
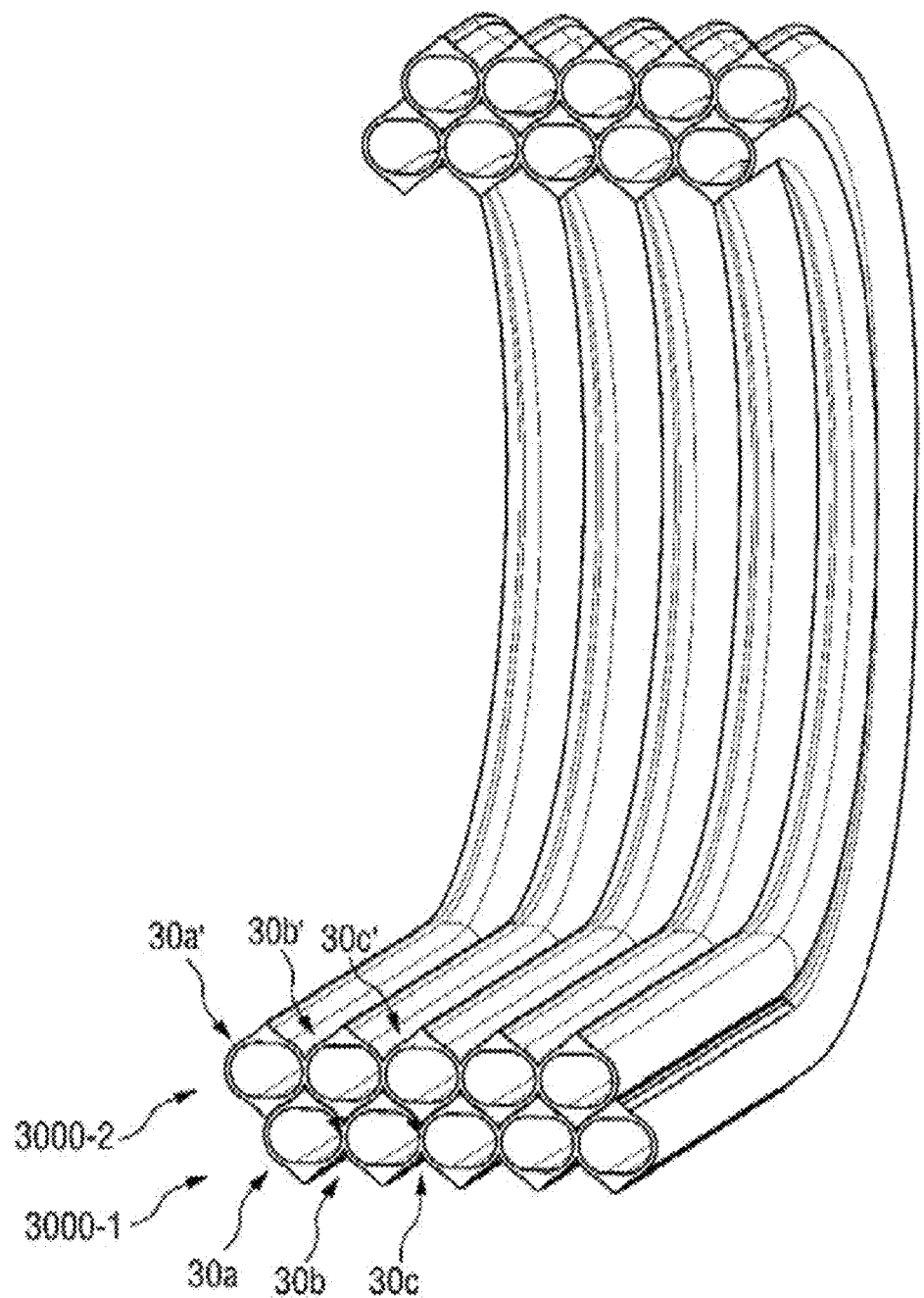
FIG. 15b is a schematic cross-sectional drawing of another example where layer #2 belt member is stacked on top of layer #1 belt member.

FIG. 15a is a perspective view of another example where multiple belt member units of this present invention are adjoined; and FIG. 15b is a schematic cross-sectional drawing of another example where layer #2 belt member is stacked on top of layer #1 belt member.

FIG. 15a and FIG. 15b illustrate the same belt member unit illustrated in FIG. 12a and FIG. 12b.

Whereas, the aforesaid example wherein multiple belt member units of the present invention are assembled can be referred for instances where multiple belt member units are adjoined together; and the aforesaid example wherein layer #1 belt member and #2 belt member are stacked can be referred for instances where layer #1 belt member and layer #w belt member are stacked together.

With reference to FIG. 15a, in the present invention, layer #1 belt member 3000 may be assembled by horizontally adjoining multiple belt member units 30a, 30b, 30c, . . . .

Where the each layer #1 belt member unit 30a, 30b, 30c, . . . comprises each #1 protrusion area 31a and #2 protrusion area 32a located at the top surface and bottom surface of each body.

Further, the #1 belt member 3000 comprises, with reference to a case with belt member #1 unit 30a and belt member #2 unit 30b: #1 connection point 33a at which the belt member #1 unit 30a and the belt member #2 unit 30b are adjoined; and #1-1 space 34a above the #1 connection point 33a.

Where the example of adjoining multiple belt member units of the present invention comprises #1-2 space 35a located beneath the #1 connection point 33a.

Details of the connection point have been addressed above, and thus no further explanation will be provided.

Further, in the present invention, the #1-1 space 34a means the area opposite to the location at which the #1 protrusion area 31a is formed; in further details, since #1 protrusion area may be formed on the bottom surface of the belt member #1 unit 30a and the bottom surface of the belt member #2 unit 30b, thus the #1-1 space 34a can mean the area opposite to that at which the #1 protrusion area is formed, which starts from the top surface of the belt member #1 unit 30a and the top surface the belt member #2 unit 30b, following the exterior of the belt member #1 unit 30a body and the exterior of the belt member #2 unit 30b body, all the way to the #1 connection point 33a.

Further, in the present invention, the #1-2 space 35a means the area opposite to the location at which the #2 protrusion area 31b is formed; in further details, since #2 protrusion area may be formed on the top surface of the belt member #1 unit 30a and the top surface of the belt member #2 unit 30b, thus the #1-2 space 34a can mean the area opposite to that at which the #2 protrusion area is formed, which starts from the bottom surface of the belt member #1 unit 30a and the bottom surface the belt member #2 unit 30b, following the exterior of the belt member #1 unit 30a body and the exterior of the belt member #2 unit 30b body, all the way to the #1 connection point 33a.

Further, the #1 belt member 3000 comprises, with reference to a case with belt member #2 unit 30b and belt member #3 unit 30c: #2 connection point 33b at which the belt member #2 unit 30b and the belt member #3 unit 30c are adjoined; #2-1 space 34b above the #2 connection point 33b; and #2-2 space 35b beneath the #2 connection point 33b.

With reference to FIG. 15b, in the present invention, layer #1 belt member 3000-1 and layer #2 belt member 3000-2 may be stacked to conform a stacked belt member 4000.

Where the layer #1 belt member 3000-1 may comprise multiple belt member units 30a, 30b, 30c, . . . , and the layer #2 belt member 3000-2 may comprise multiple belt member units 30a', 30b', 30c', . . . .

Further, the layer #2 belt member 3000-2 may be located above the layer #1 belt member 3000-1, whilst the layer #2 belt member 3000-2 shall be misaligned by a specific displacement from the layer #1 belt member 3000-2.

In particular, as described above, the layer #1 belt member 3000-1 comprises multiple spaces FIG. 15a, #1-1 space 34a, #2-1 space 34b, etc. formed above connection points by the assembly of multiple belt member units; and the layer #2 belt member 3000-2 comprises multiple #1 protrusion areas formed on the bottom surface of multiple belt member units 30a', 30b', 30c', . . . .

Where, the layer #2 belt member 3000-2 shall be arranged above the layer #1 belt member 3000-1 in a manner that allows each multiple #1 protrusion area of the layer #2 belt member 3000-2 to be inserted to each multiple space of the layer #1 belt member 3000-1 FIG. 15a: #1-1 space 34a, #2-1 space 34b, etc.

Further, the layer #1 belt member 3000-1 comprises multiple #2 protrusion areas formed on the top surface of multiple belt member units 30a, 30b, 30c, . . . conforming the layer #1 belt member 3000-1; and the layer #2 belt member 3000-2 comprises multiple spaces FIG. 15a, #1-2 space 35a, #2-2 space 35b, etc. formed beneath connection points by the assembly of multiple belt member units.

Where, the layer #2 belt member 3000-2 shall be arranged above the layer #1 belt member 3000-1 in a manner that allows each multiple #2 protrusion area of the layer #1 belt member 3000-1 to be inserted to each multiple space of the layer #2 belt member 3000-2 FIG. 15a: #1-2 space 35a, #2-2 space 35b, etc.

Thus, in the present invention, by inserting each #1 protrusion area of the layer #2 belt member 3000-2 to each space of the layer #1 belt member 3000-1 as described above, and inserting each protrusion area of layer #1 belt member 3000-1 to each space of layer #2 belt member 3000-2, the layer #2 belt member and the layer #1 belt member can be firmly prevented from falling off from each other.

Figure 16A:
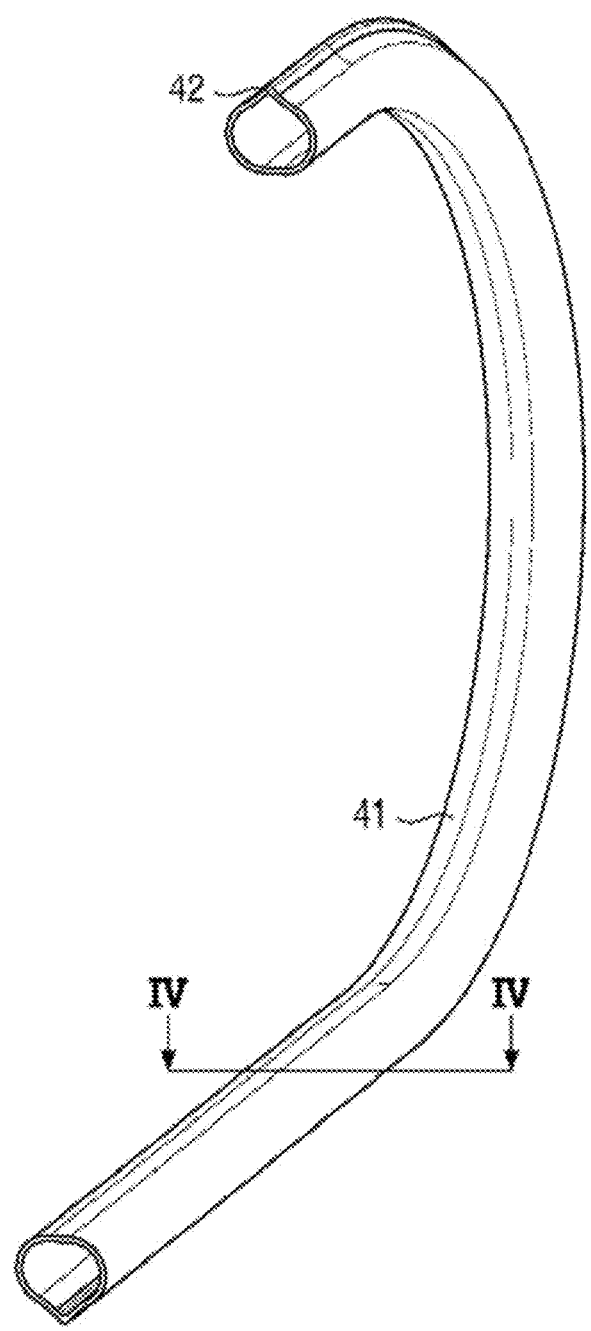
FIG. 16a is a perspective view of a belt member unit according to #4 embodiment.
Figure 16B:
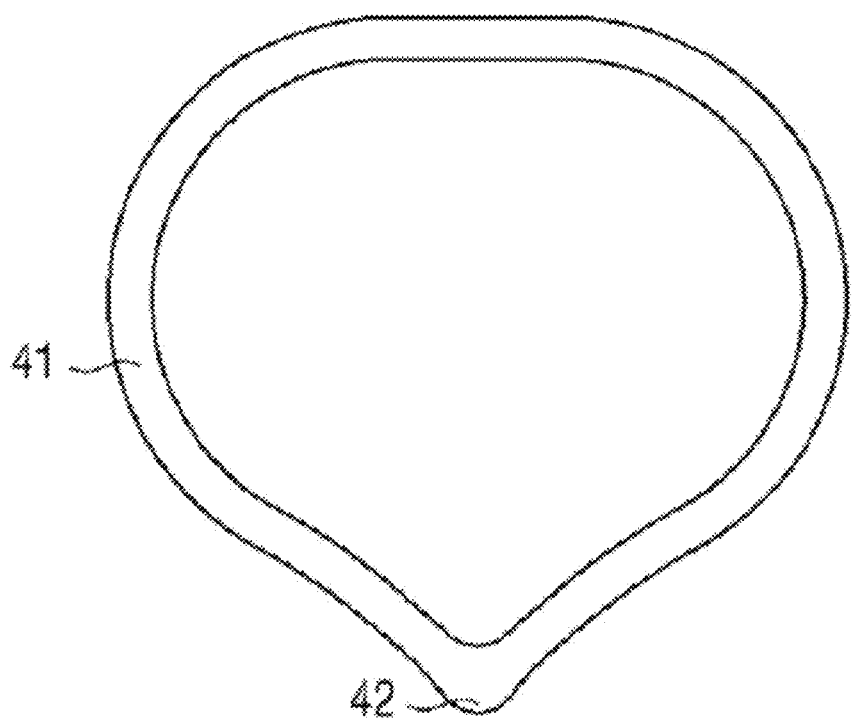

FIG. 16a is a perspective view of a belt member unit according to #4 embodiment; and FIG. 16b is the cross sectional view of IV-IV line from FIG. 16a.

With reference to FIG. 16a and FIG. 16b of #4 embodiment of the present invention, belt member unit 40 comprises: a tubular body 41; and #1 protrusion area 42 located at #1 predetermined position of the body 41.

Where, belt member unit 40 of #4 embodiment of the present invention features a void internal of the #1 protrusion area 42

In other words, FIG. 10a and FIG. 10b illustrates the internal of #1 protrusion area to be filled with substance, while, conversely, the #1 protrusion area 42 may be void.

With this arrangement, the tubular body 41 can be bended with more ease.

Figure 17A:
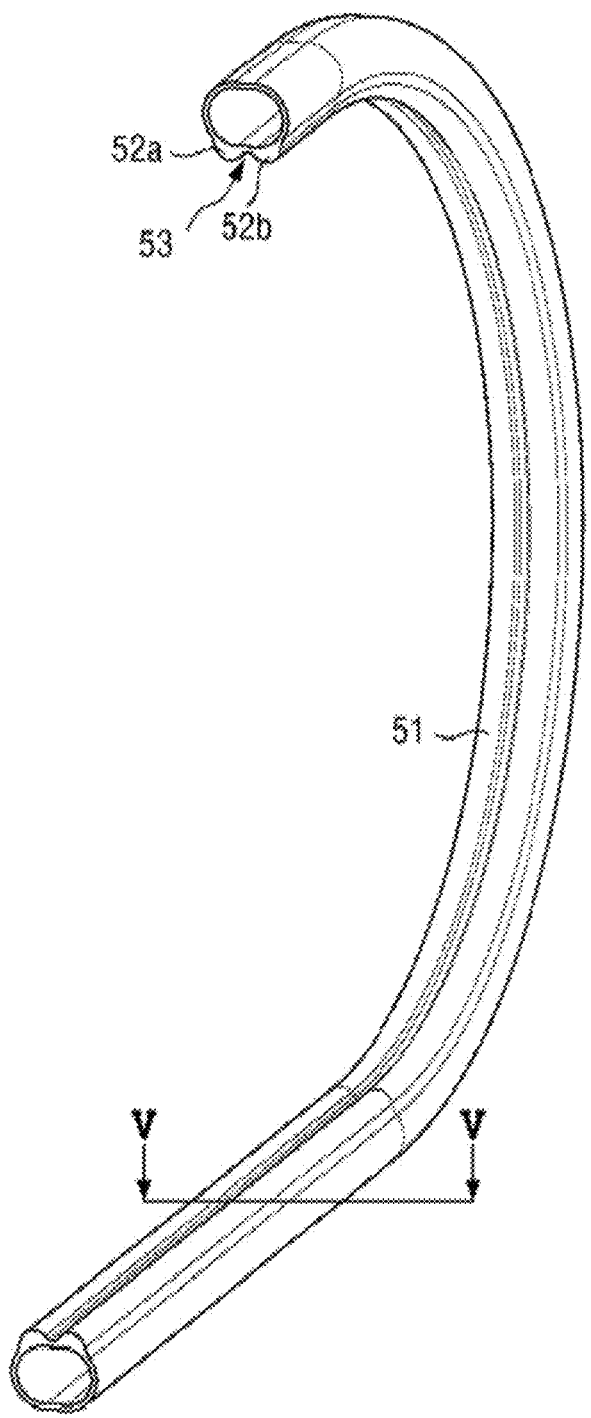
FIG. 17a is a perspective view of a belt member unit according to #5 embodiment.
Figure 17B:
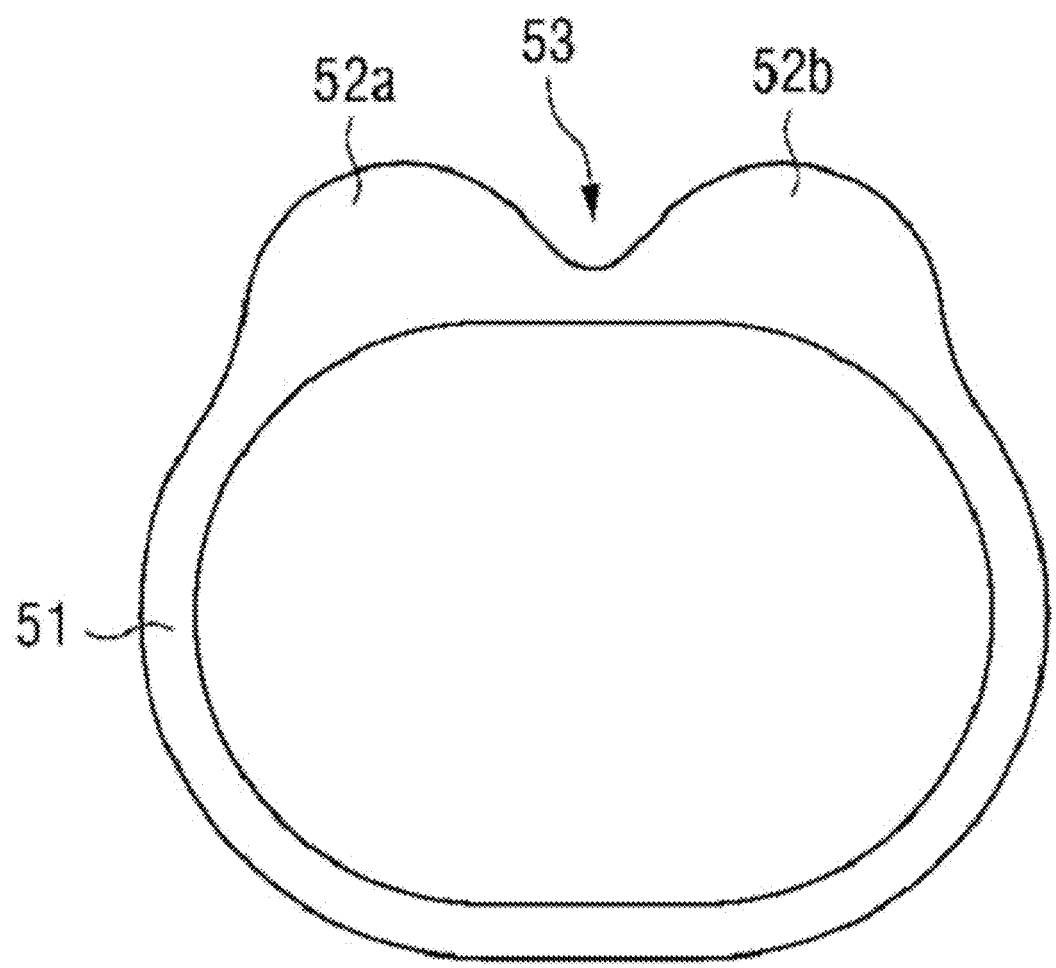

FIG. 17a is a perspective view of a belt member unit according to #5 embodiment; and FIG. 17b is the cross sectional drawing of V-V line from FIG. 17a.

With reference to FIG. 17a and FIG. 17b of #5 embodiment of the present invention, belt member unit 50 comprises: a tubular body 51; #1 protrusion area 52a located at #1 predetermined position of the body 51; #2 protrusion area 52b located at #2 predetermined position of the body 51 immediately adjacent to the #1 protrusion area 52a; and space 53 between the #1 protrusion area 52a and the #2 protrusion area 52b.

Where, the #1 predetermined position and the #2 predetermined position may be the bottom surface of the body 51, and conversely, the #1 predetermined position and the #2 predetermined position may be the top surface of the body 51; provided that, the present invention does not limit the meaning of the top surface and the bottom surface.

Figure 18A:
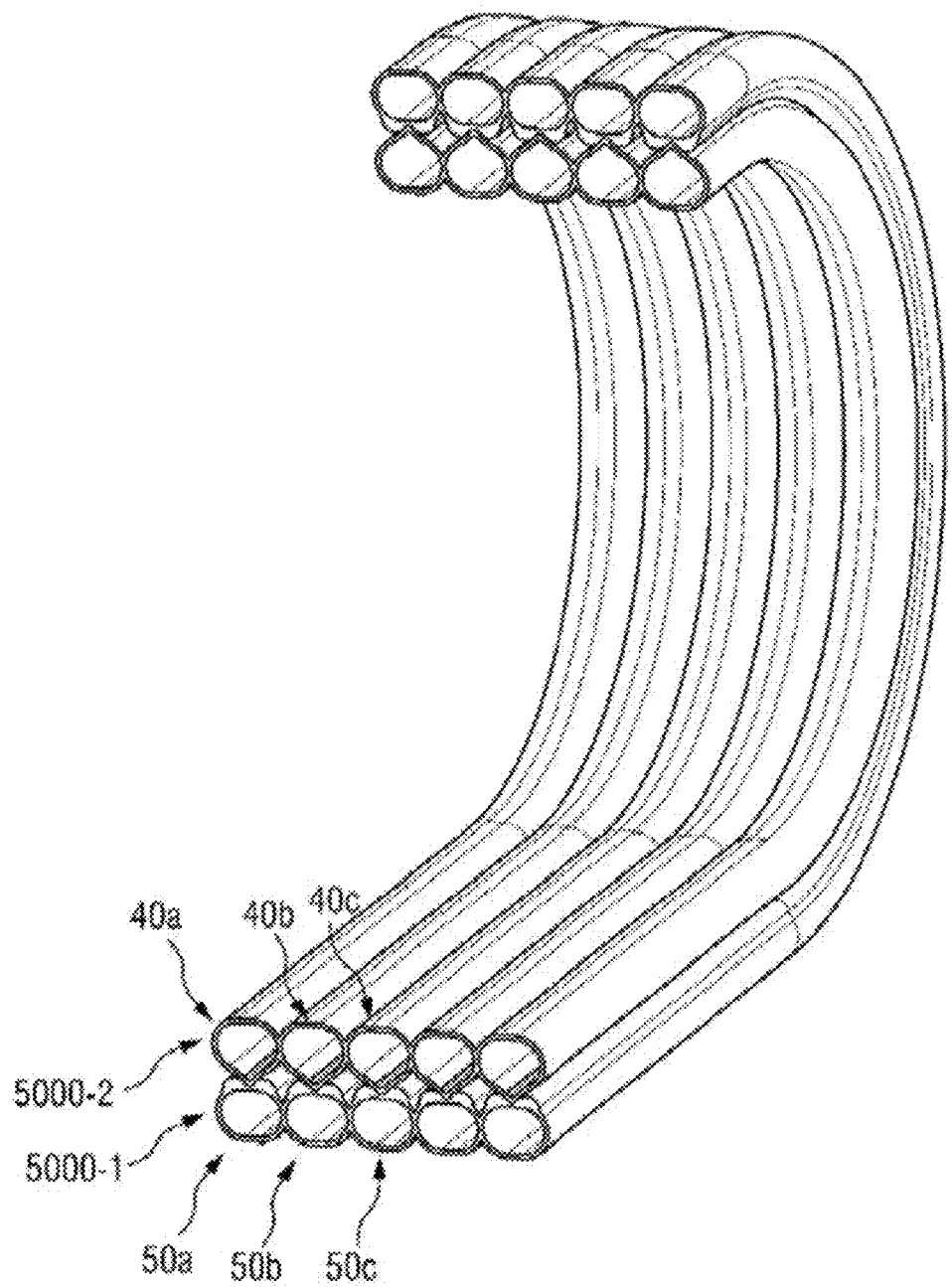
FIG. 18a is a schematic cross-sectional drawing of another example where layer #2 belt member is stacked on top of layer #1 belt member.

Despite not being illustrated in drawings, multiple belt member units of #5 embodiment can be assembled horizontally to conform layer #1 belt member FIG. 18a, 5000-1, while multiple belt member units of #4 embodiment can be assembled horizontally to conform layer #2 belt member FIG. 18a, 5000-2.

Figure 18B:
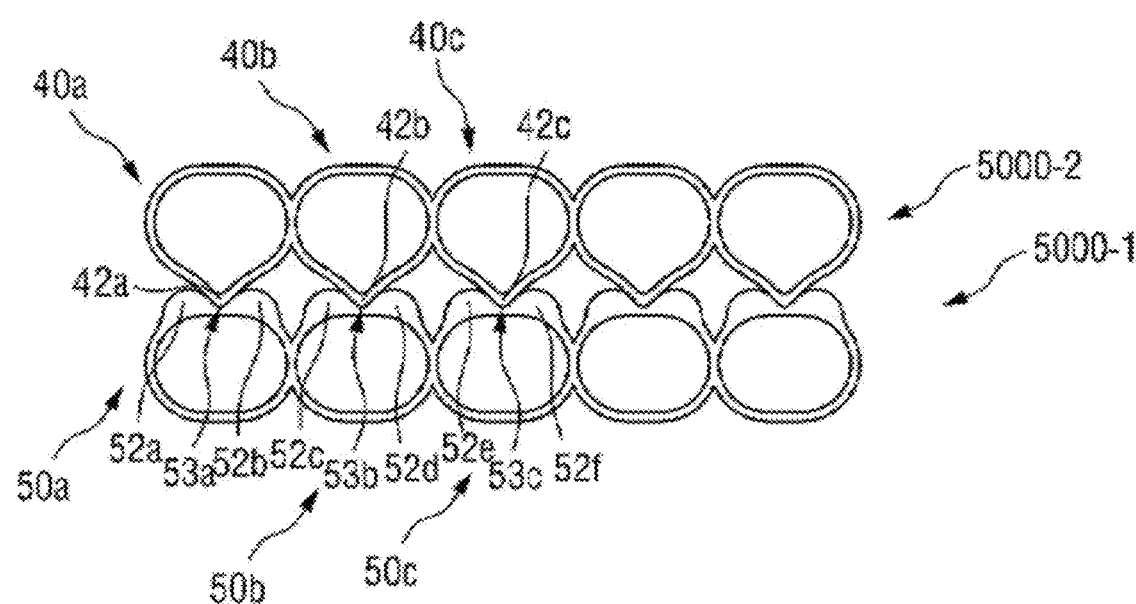
FIG. 18b is a schematic perspective view of another example where layer #2 belt member is stacked on top of layer #1 belt member.

FIG. 18a is a schematic cross-sectional drawing of another example where layer #2 belt member is stacked on top of layer #1 belt member; and FIG. 18b is a schematic perspective view of another example where layer #2 belt member is stacked on top of layer #1 belt member.

With reference to FIG. 18a and FIG. 18b, in the present invention, layer #1 belt member 5000-1 and layer #2 belt member 5000-2 may be stacked together to conform a stacked belt member 6000.

Where the layer #1 belt member 5000-1 may comprise multiple belt member units 50a, 50b, 50c, . . . , and the layer #2 belt member 5000-2 may comprise multiple belt member units 40a, 40b, 40c, . . . .

Further, with reference to FIG. 18b, the layer #2 belt member 5000-2 comprises each #1 protrusion area of multiple belt member units 40a, 40b, 40c, . . . , in particular, #1-1 belt member unit 40a comprises #1-1 protrusion area 42a, #1-2 belt member unit 40b comprises #1-2 protrusion area 42b, and #1-3 belt member unit 40c comprises #1-3 protrusion area 42c.

Further, with reference to FIG. 18b, the layer #1 belt member 5000-1 comprises each #1 protrusion area 52a, 52c, 52e of multiple belt member units 50a, 50b, 50c, . . . , and each space 53a, 53b, 53c formed by #2 protrusion area 52b, 52d, 52f, in particular, #2-1 belt member unit 50a comprises #1-1 space 53a, #2-2 belt member unit 50b comprises #1-2 space 53b, and #2-3 belt member unit 50c comprises #1-3 space 53c.

Where, the layer #2 belt member 5000-2 shall be located above the layer #1 belt member 5000-1, whilst the layer #2 belt member 5000-2 shall be accurately aligned with no displacement from the layer #1 belt member 5000-1.

In particular, by locating: the #1-1 protrusion area 42a of the #1-1 belt member unit 40a in #1-1 space 53a of the #2-1 belt member unit 50a; the #1-2 protrusion area 42b of the #1-2 belt member unit 40b in #1-2 space 53b of the #2-2 belt member unit 50b; and the #1-3 protrusion area 42c of the #1-3 belt member unit 40c in #1-3 space 53c of the #2-3 belt member unit 50c, the layer #2 belt member 5000-2 is located above the layer #1 belt member 5000-1, whilst the layer #2 belt member 5000-2 is accurately aligned with no displacement from the layer #1 belt member 5000-1.

Thus, in the present invention, by arranging the layer #2 belt member 5000-2 above the layer #1 belt member 5000-1, whilst the layer #2 belt member 5000-2 is accurately aligned with no displacement from the layer #1 belt member 5000-1, the layer #2 belt member and the layer #1 belt member can be firmly prevented from falling off from each other.

The configuration of the belt member of the present invention was explained above, with the structure of belt member units of the present invention.

The following provides explanation on details of the configuration of the belt member of the present invention with the structure of belt member sub-units of the present invention.

In other words, whilst the above descriptions provide explanations on the structure in which each belt member unit comprises a protrusion area, the following descriptions provide explanation on the structure in which two belt member units together with a single protrusion area conform a belt member sub-unit.

Figure 19A:
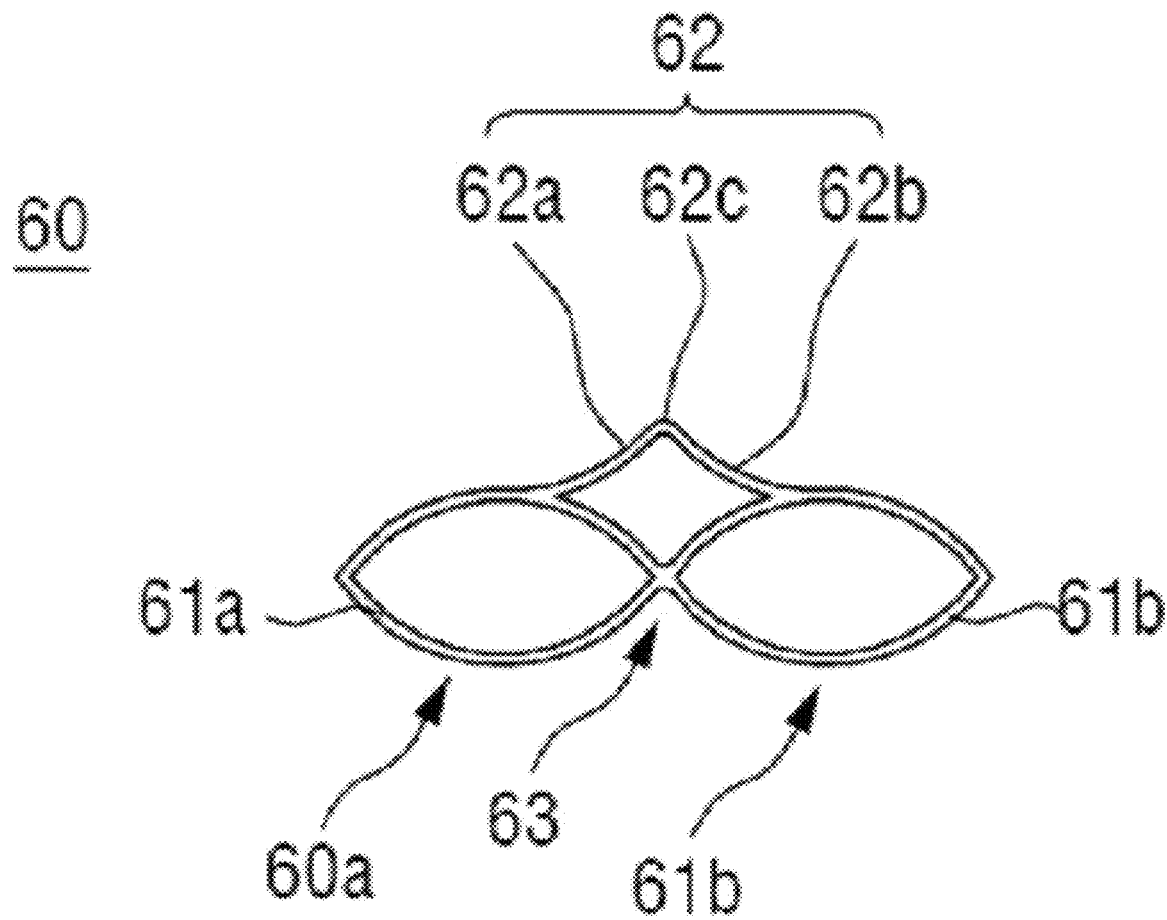
FIG. 19a is a cross-sectional drawing of the belt member sub-unit 60 of the present invention.
Figure 19B:
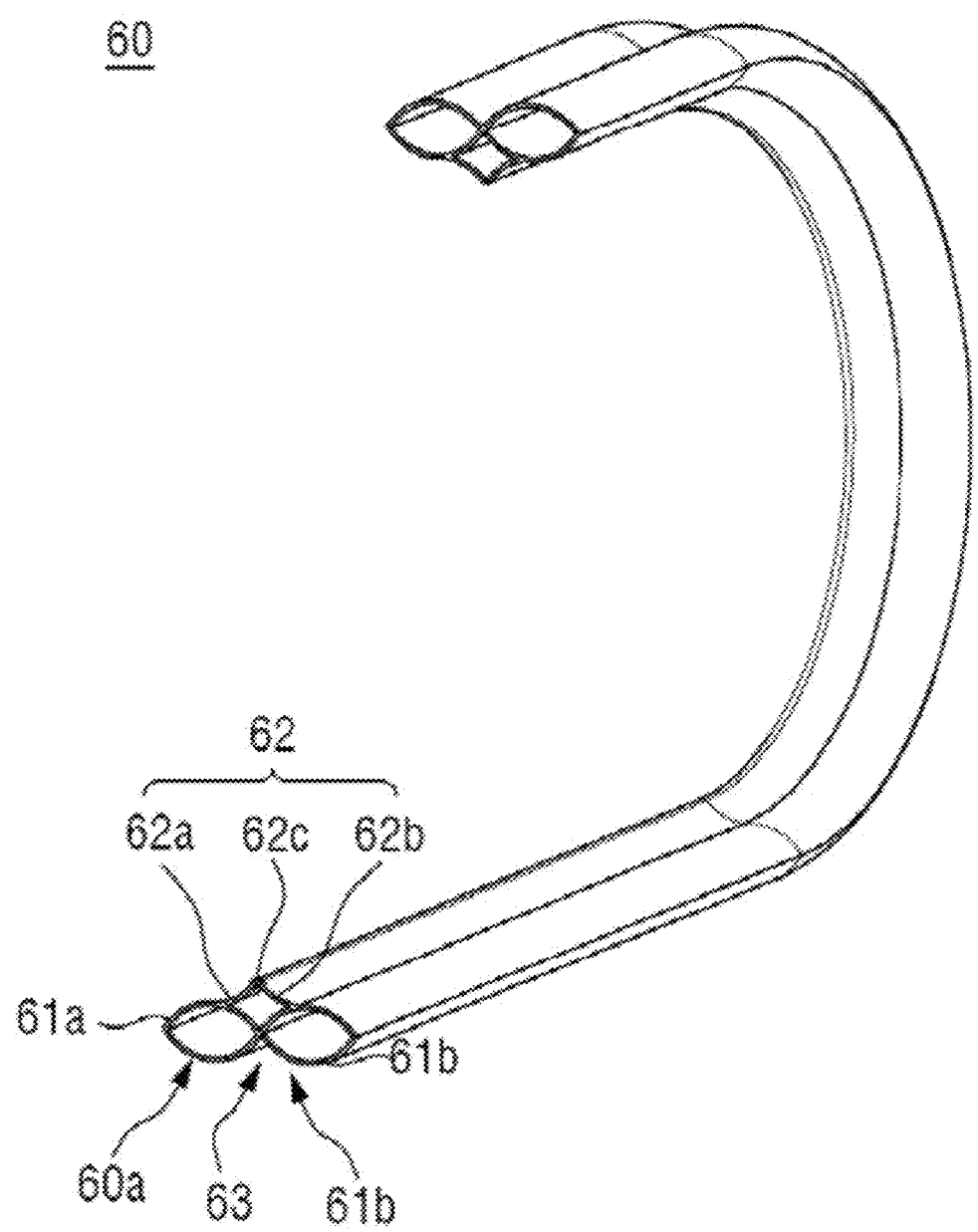
FIG. 19b is a perspective view of the belt member sub-unit 60 of the present invention.

FIG. 19a is a cross-sectional drawing of the belt member sub-unit 60 of the present invention; and FIG. 19b is a perspective view of the belt member sub-unit 60 of the present invention.

With reference to FIG. 19a and FIG. 19b, belt member sub-unit 60 of the present invention comprises: #1 belt member unit 60a; and #2 belt member unit 60b immediately adjacent to the #1 belt member unit 60a.

In the present invention, the configuration in which the #1 belt member unit 60a and the #2 belt member unit 60b are immediately adjoined, shall be referred to as belt member sub-unit.

In particular, the #1 belt member unit 60a comprises a tubular #1 body 61a, and the #2 belt member unit 60b comprises a tubular #2 body 61b.

Where the belt member sub-unit 60 comprises a protrusion area 62 wherein one side is adjoined with the #1 body 61a and the other side is adjoined with the #2 body 62b.

In particular, the protrusion area 62 comprises: #1 slope 62a from #1 predetermined position of the #1 body 61a continued to #1 direction of the #1 body 61a; #2 slope 62b from #2 predetermined position of the #2 body 61b continued to #2 direction of the #2 body 61b; and the connection point 62c at which the #1 slope 62a and the #2 slope 62b meets.

Where the connection point 62c is displaced from #1 predetermined position of the #1 body 61a and #2 predetermined position of the #2 body 61b, allowing the protrusion area to be projected from the #1 belt member unit 60a and the #1 belt member unit 60b.

With reference to FIG. 19b, it is illustrated that #1 predetermined position of the #1 body 61a is the top surface of the #1 body 61a, and #2 predetermined position of the #2 body 61b is the top surface of the #2 body 61b, therefore, #1 direction to which the #1 slope 62a is extended conforms the top surface direction of the #1 slope 62a, and #2 direction to which the #2 slope 6ba is extended conforms the top surface direction of the #2 slope 62b.

However, in opposite to FIG. 19b, #1 predetermined position of the #1 body 61a can be the bottom surface of the #1 body 61a, and #2 predetermined position of the #2 body 61b can be the bottom surface of the #2 body 61b, therefore, #1 direction to which the #1 slope 62a is extended conforms the bottom surface direction of the #1 slope 62a, and #2 direction to which the #2 slope 6ba is extended conforms the bottom surface direction of the #2 slope 62b. However, the present invention does not limit the meaning of the top surface and the bottom surface.

With reference to FIG. 19b, belt member sub-unit 60 of the present invention comprises the space 63 between #1 belt member unit 60a and the #2 belt member unit 60b.

Where the space 63 is located opposite to the protrusion area 62: in particular, with reference to the line connecting the #1 belt member sub-unit 60a and the #2 belt member sub-unit 60b, the protrusion area 62 is located above the line connecting the #1 belt member sub-unit 60a and the #2 belt member sub-unit 60b, and the space 63 is located beneath the line connecting the #1 belt member sub-unit 60a and the #2 belt member sub-unit 60b.

Whilst FIG. 19b illustrates that, the protrusion area 62 is located above the line connecting the #1 belt member sub-unit 60a and the #2 belt member sub-unit 60b, and the space 63 is located beneath the line connecting the #1 belt member sub-unit 60a and the #2 belt member sub-unit 60b: conversely, the protrusion area 62 can be located beneath the line connecting the #1 belt member sub-unit 60a and the #2 belt member sub-unit 60b, and the space 63 can be located above the line connecting the #1 belt member sub-unit 60a and the #2 belt member sub-unit 60b.

Thus, the indication in the present invention that states that the space 63 is located opposite to the protrusion area 62 includes both aforesaid cases. As illustrated in the drawing, the space 63 of the belt member sub-unit of the present invention may be void, wherein such configuration shall be identical to that explained for the belt member unit of #4 embodiment, thus no further explanation is provided.

Figure 20A:
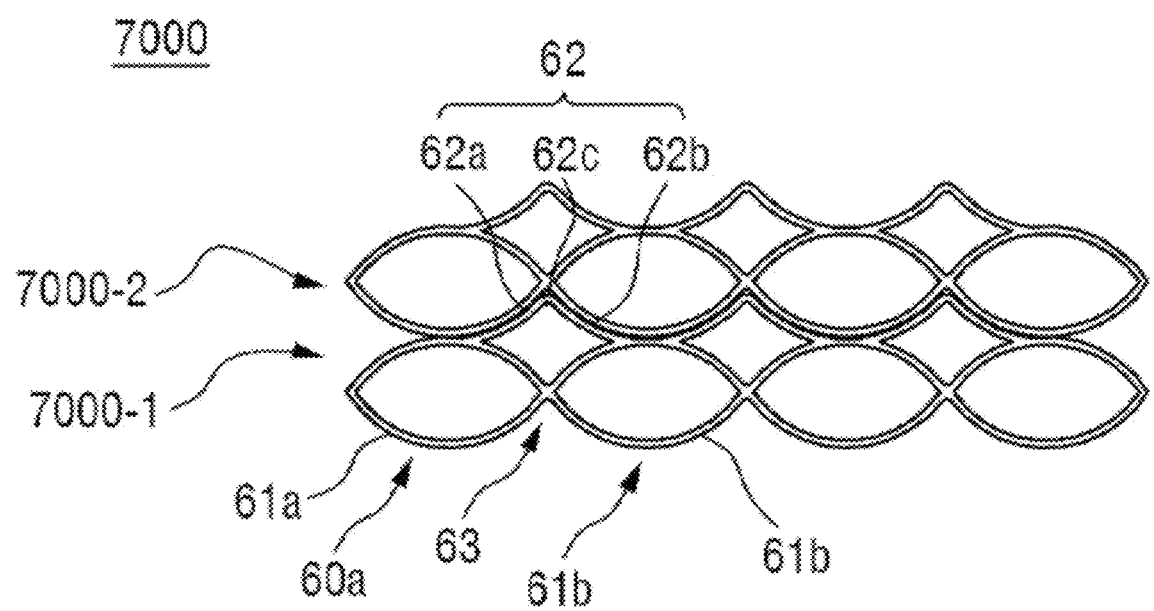
FIG. 20a is a cross-sectional drawing representing layer #1 belt member and layer #2 belt member stacked together, wherein belt member sub-units exhibited in FIG. 19a and FIG. 19b are employed.

Despite not being illustrated in drawings, considering the belt member sub-unit as a base, the belt member sub-unit can be horizontally with multiple belt member sub-units or belt member units to configure layer #1 belt member FIG. 20a, 7000-1, and can also configure layer #2 belt member FIG. 20a, 70002 in an identical manner with the layer #1 belt member FIG. 20a, 7000-1.

Figure 20B:
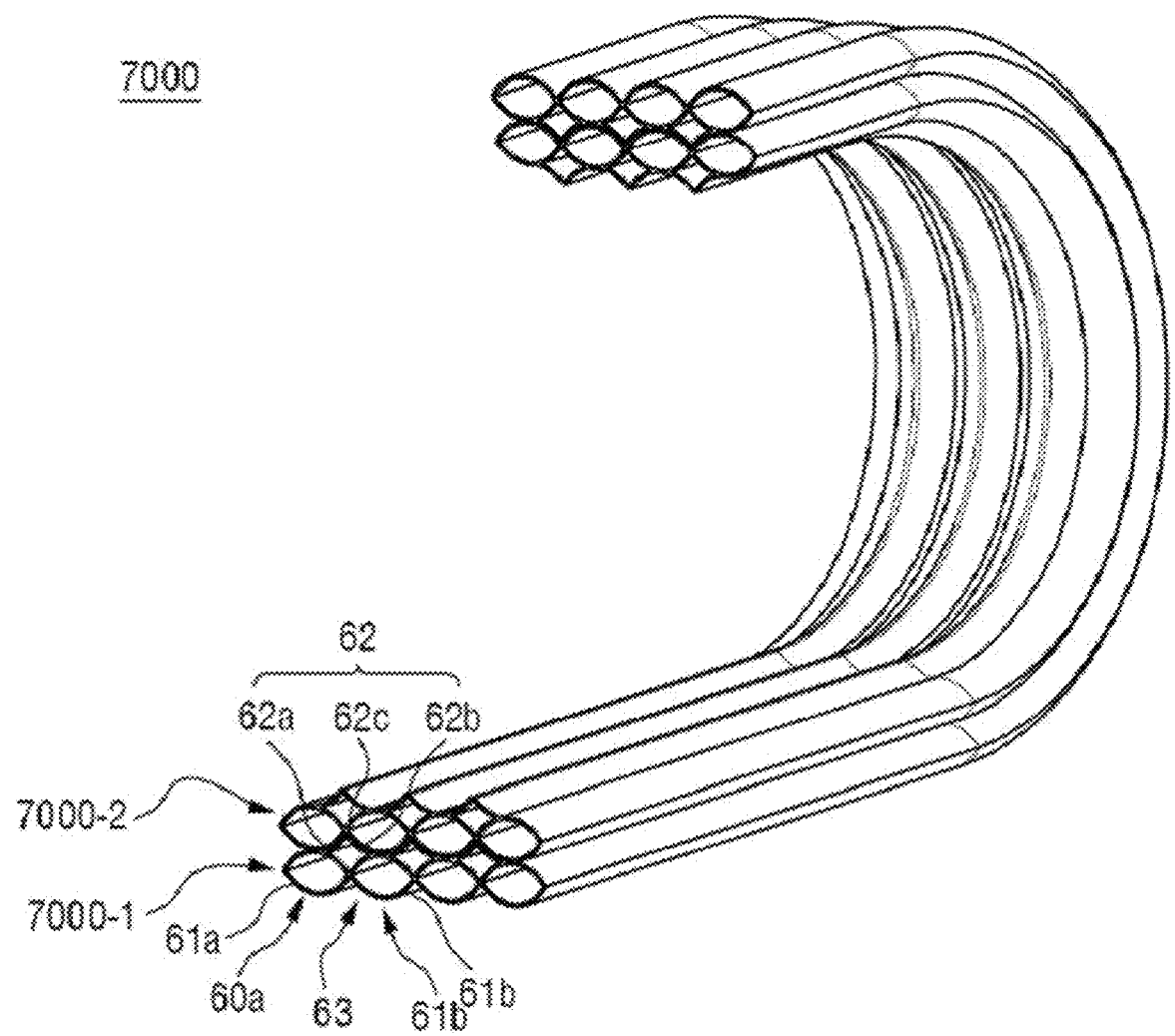
FIG. 20b is a perspective view representing layer #1 belt member and layer #2 belt member stacked together, wherein belt member sub-units exhibited in FIG. 19a and FIG. 19b are employed

FIG. 20a is a cross-sectional drawing representing layer #1 belt member and layer #2 belt member stacked together, wherein belt member sub-units exhibited in FIG. 19a and FIG. 19b are employed; FIG. 20b is a perspective view representing layer #1 belt member and layer #2 belt member stacked together, wherein belt member sub-units exhibited in FIG. 19a and FIG. 19b are employed With reference to FIG. 20a and FIG. 20b, in the present invention, layer #1 belt member 7000-1 and layer #2 belt member 7000-2 may be stacked together to conform a stacked belt member 7000.

Where, the layer #1 belt member 7000-1 comprises #1 belt member sub-unit 60; the #1 belt member sub-unit 60 comprises #1-1 belt member unit 60a and the #1-2 belt member unit 60a immediately adjacent to the #1-1 belt member unit 60a.

Where, the #1-1 belt member unit 60a comprises a tubular #1-1 body 61a, and the #1-2 belt member unit 60b comprises a tubular #1-2 body 61b.

Where, the #1 belt member sub-unit 60 comprises #1 protrusion area 62 wherein one side is adjoined with the #1-1 body 61a and the other side is adjoined with the #1-2 body 62b.

In particular, the #1 protrusion area 62 comprises: #1-1 slope 62a from #1-1 predetermined position of the #1-1 body 61a continued to #1-1 direction of the #1-1 body 61a; #1-2 slope 62b from #1-2 predetermined position of the #1-2 body 61b continued to #1-2 direction of the #1-2 body 61b; and #1 connection point 62c at which the #1-1 slope 62a and the #1-2 slope 62b meets.

Further, #1 belt member sub-unit 60 of the present invention comprises #1 space 63 between #1-1 belt member unit 60a and the #1-2 belt member unit 60b.

Details of such configuration are identical to FIG. 19a and FIG. 19b, and thus no further explanation will be provided.

Further, as described above, in the present invention, layer #1 belt member 7000-1 and layer #2 belt member 7000-2 may be stacked together to conform a stacked belt member 7000. For the convenience of explanation, detail numerals are omitted for the configuration of the layer #2 belt member 7000-2, whereas numerics provided for the layer #1 belt member 7000-1 can be referred for detail numerics of the configuration of the layer #2 belt member 7000-2.

In particular, the #2 belt member 7000-1 comprises #2 belt member sub-unit no numeral, where the #2 belt member sub-unit no numeral comprises #2-1 belt member unit no numeral and #2-2 belt member unit no numeral located immediately adjacent to the #2-1 belt member unit no numeral.

Where, the #2-1 belt member unit no numeral comprises a tubular #2-1 body no numeral, and the #2-2 belt member unit no numeral comprises a tubular #2-2 body no numeral.

Where, the #2 belt member sub-unit no numeral comprises #2 protrusion area no numeral wherein one side is adjoined with the #2-1 body no numeral and the other side is adjoined with the #2-2 body no numeral.

In particular, the #2 protrusion area no numeral comprises: #2-1 slope no numeral from #2-1 predetermined position of the #2-1 body no numeral continued to #2-1 direction of the #2-1 body no numeral; #2-2 slope no numeral from #2-2 predetermined position of the #2-2 body no numeral continued to #2-2 direction of the #2-2 body no numeral; and #2 connection point no numeral at which the #2-1 slope no numeral and the #2-2 slope no numeral meets.

Provided that, the present invention does not limit the presence of the #2 protrusion area of the #2 belt member sub-unit.

Thus, above the layer #2 belt member comprising the #2 belt member sub-unit, for instance if layer #3 belt member is present, the #2 belt member sub-unit of the layer #2 belt member shall comprise #2 protrusion area, yet, if the layer #2 belt member is on the top of other belt members, the #2 belt member sub-unit does not have to comprise the #2 protrusion area.

Further, #2 belt member sub-unit no numeral of the present invention comprises #2 space no numeral between #2-1 belt member unit no numeral and the #2-2 belt member unit no numeral.

As explained above, numerics provided for the layer #1 belt member 7000-1 can be referred for detail numerics of the configuration of the layer #2 belt member 7000-2.

Where, the layer #2 belt member 7000-2 shall be located above the layer #1 belt member 7000-1, whilst the layer #2 belt member 7000-2 shall be accurately aligned with no displacement from the layer #1 belt member 7000-1.

In particular, by placing #1 protrusion area 62 of the #1 belt member sub-unit 60 of the layer #1 belt member 7000-1 in #2 space no numeral of the #2 belt member sub-unit no numeral of the layer #2 belt member 7000-2, the layer #2 belt member 7000-2 is located above the layer #1 belt member 7000-1, whilst the layer #2 belt member 7000-2 is accurately aligned with no displacement from the layer #1 belt member 7000-1.

Thus, in the present invention, by arranging the layer #2 belt member 7000-2 above the layer #1 belt member 7000-1, whilst the layer #2 belt member 7000-2 is accurately aligned with no displacement from the layer #1 belt member 7000-1, the layer #2 belt member and the layer #1 belt member can be firmly prevented from falling off from each other.

The configuration of the belt member of the present invention was explained above, with the structure of belt member sub-units of the present invention, as described for FIG. 19a, FIG. 19b, FIG. 20a and FIG. 20b.

Where belt member sub-units illustrated in FIG. 19a and FIG. 19b may be defined as described below.

In particular, when belt members are stacked in 2 layers, i.e. when layer #2 belt member is stacked on top of layer #1 belt member, the protrusion area 62 of belt member sub-unit illustrated in FIG. 19a and FIG. 19b can have a role in preventing the layer #2 belt member and the layer #1 belt from falling off from each other.

However, additional to the aforesaid role, the protrusion area 62 of belt member sub-unit illustrated in FIG. 19a and FIG. 19b may have the same role as tubular #1 body 61a of the #1 belt member unit 60a and tubular #2 body 61b of the #2 belt member unit 60b.

Thus, the tubular #1 body 61a and the tubular #2 body 61b accommodates cables flexible cables and hoses including electric cables, optical fiber cables, fluid supply hoses, where the protrusion area 62 of belt member sub-unit illustrated in FIG. 19a and FIG. 19b, can have an additional role, aside from its role to prevent the layer #2 belt member and the layer #1 belt member from falling off from each other, that is identical to the roles of the tubular #1 body 61a and the tubular #2 body 61b, which is accommodating cables.

For instance, with a belt member sub-unit as illustrated in FIG. 19a, assuming the tubular #1 body 61a and the tubular #2 body each accommodates one cable, the protrusion area 62 of belt member sub-unit can accommodate an additional cable, where a belt member sub-unit, as illustrated in FIG. 19a can accommodate a total number of 3 cables.

In particular, for instance, assuming a total number of three cables have to be accommodated, in general, for a belt member sub-unit as illustrated in FIG. 19a, the tubular #1 body 61a and the tubular #2 body 61b can each accommodate one cable, thus to accommodate a third cable, another belt member sub-unit has to be stacked.

However, assuming a total number of three cables have to be accommodated, in the present invention, for a belt member sub-unit as illustrated in FIG. 19a, the tubular #1 body 61a and the tubular #2 body 61b can each accommodate one cable, and the protrusion area 62 of belt member sub-unit can accommodate the third cable, thus, the intended cables can be accommodated without stacking an additional belt member sub-unit.

Where, as described above, the following effects may be achieved by accommodating a cable in the protrusion area 62 of the belt member sub-unit.

Figure 21A:
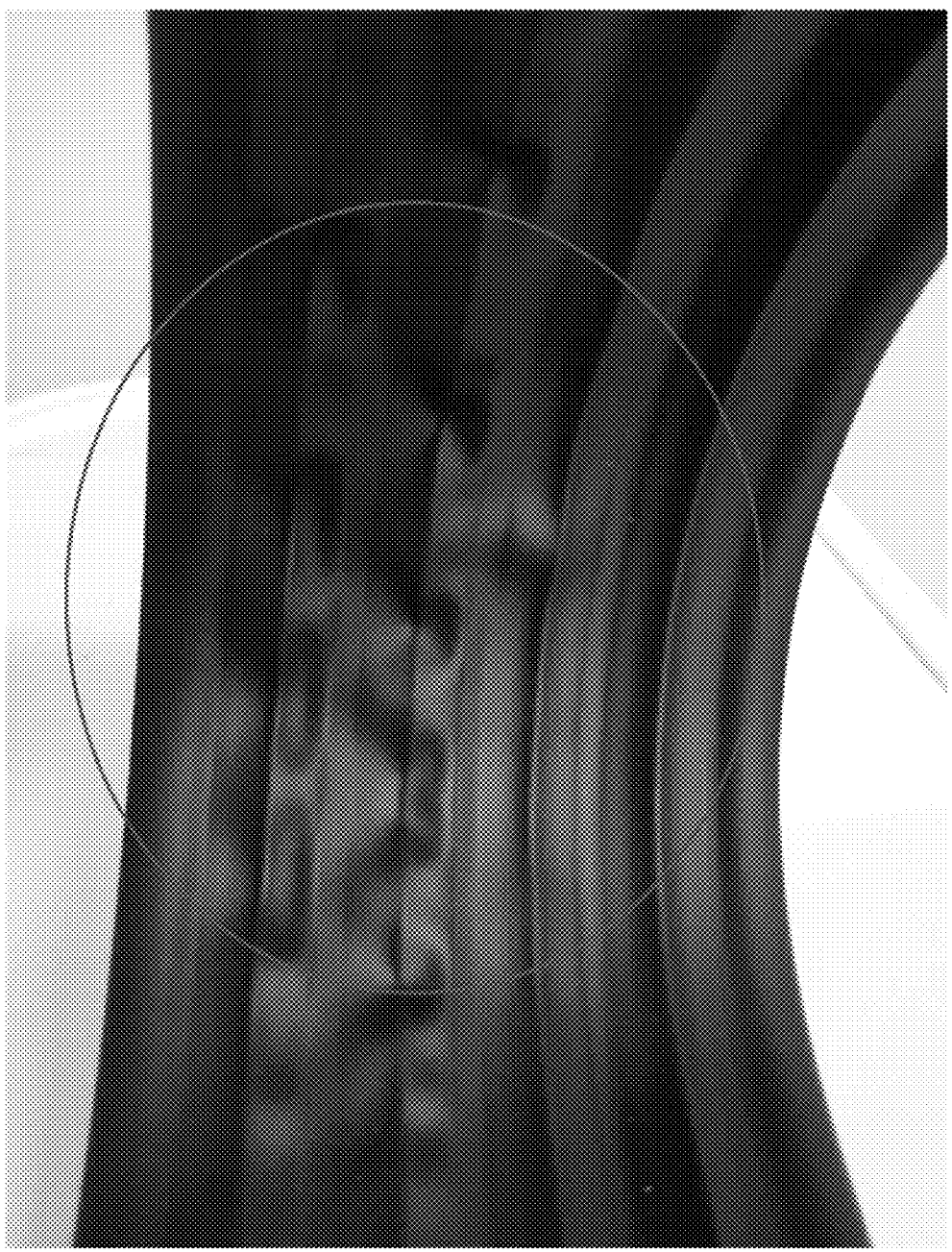
FIG. 21a and FIG. 21b are actual photographs of a protrusion area of layer #1 belt member shown in FIG. 20a and FIG. 20b, with no cable inserted, in a bending posture.
Figure 21B:
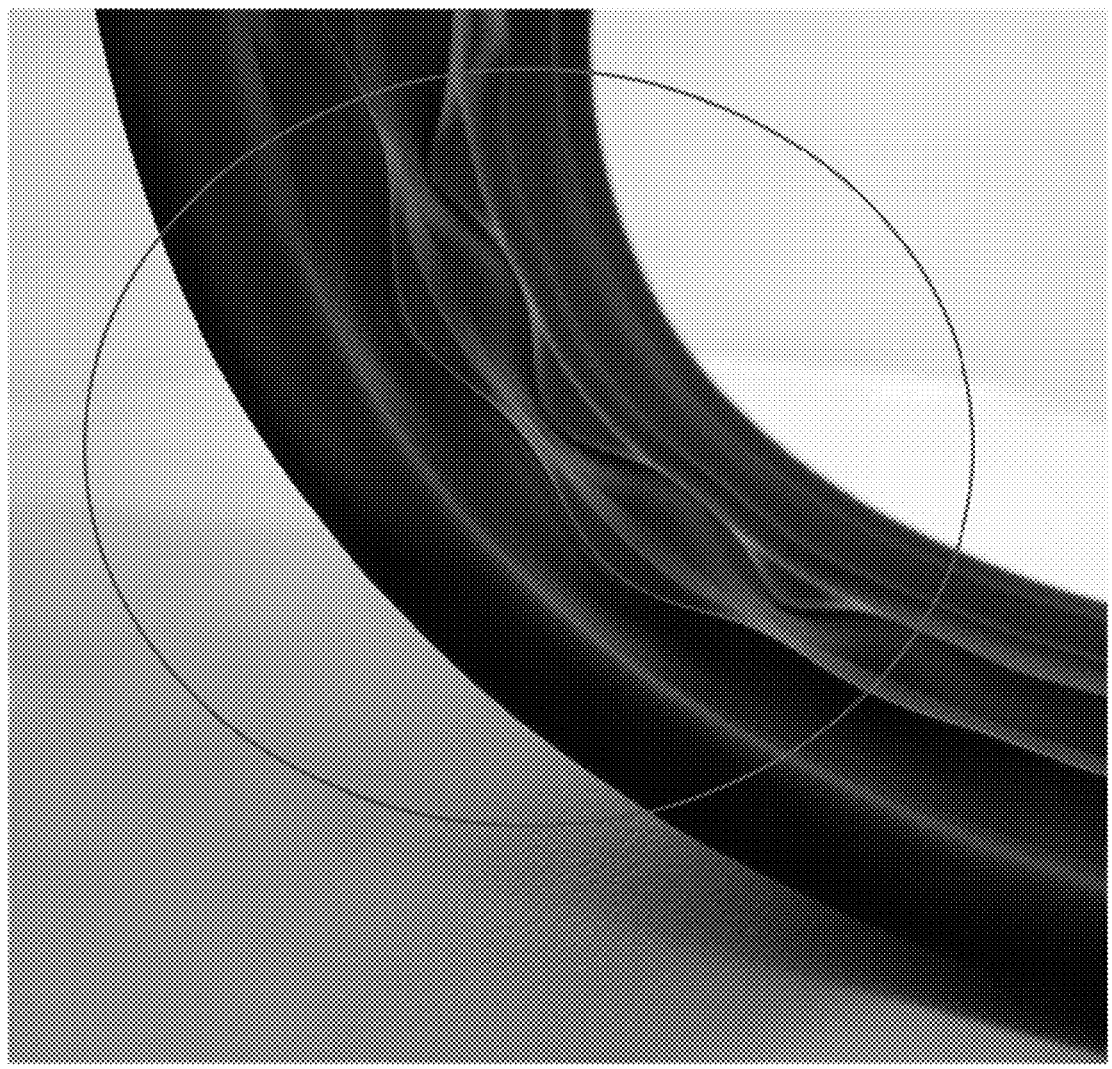
Figure 22A:
FIG. 22a and FIG. 22b are actual photographs of a protrusion area of layer #1 belt member shown in FIG. 20a and FIG. 20b, with cables inserted, in a bending posture.
Figure 22B:

FIG. 21a and FIG. 21b are actual photographs of a protrusion area of layer #1 belt member shown in FIG. 20a and FIG. 20b, with no cable inserted, in a bending posture; and FIG. 22a and FIG. 22b are actual photographs of a protrusion area of layer #1 belt member shown in FIG. 20a and FIG. 20b, with cables inserted, in a bending posture.

For the convenience of description, the layer #1 belt member shall be indicated as belt member.

With reference to FIG. 21a and FIG. 21b, where the belt member is bended without accommodating a cable in the protrusion area of belt member, the protrusion are is ruffled at the bending, thus the protrusion area is not likely to perform its role, at the bended areas, of preventing the layer #2 belt member and the layer #1 belt member from falling off from each other.

On the contrary, with reference to FIG. 22a and FIG. 22b where the belt member is bended while accommodating a cable in the protrusion area of belt member, the cable that is inserted in the protrusion area supports the protrusion area when bent, thus, the protrusion area can maintain its posture even when bent, and can perform its role to prevent the layer #2 belt member and the layer #1 belt member from falling off from each other.

Accordingly, by inserting a cable to the protrusion area, the protrusion area can perform the additional role to accommodate the cable, the cable supports the protrusion area allowing the protrusion area to maintain its posture even when bent, thus, the protrusion area can perform its role to prevent the layer #2 belt member and the layer #1 belt member from falling off from each other.

In accordance with the above description, belt member sub-units illustrated in FIG. 19a and FIG. 19b can be defined as below.

Provided that, except for the following descriptions, FIG. 19a, FIG. 19b, FIG. 20a and FIG. 20b may be referred for the following definition of belt member sub-unit.

As described above, FIG. 19a is a cross-sectional drawing of the belt member sub-unit 60 of the present invention; and FIG. 19b is a perspective view of the belt member sub-unit 60 of the present invention.

With reference to FIG. 19a and FIG. 19b, belt member sub-unit 60 of the present invention comprises: #1 belt member unit 60a; and #2 belt member unit 60b immediately adjacent to the #1 belt member unit 60a.

In the present invention, the configuration in which the #1 belt member unit 60a and the #2 belt member unit 60b are immediately adjoined, shall be referred to as belt member sub-unit.

In particular, as described above, the #1 belt member unit 60a comprises a tubular #1 body 61a, and the #2 belt member unit 60b comprises a tubular #2 body 61b.

Layer #1 body can be defined as, in the present invention, the tubular #1 body 61a of the #1 belt member unit 60a and the tubular #2 body 61b of the #2 belt member unit 60b.

Thus, the belt member sub-unit 60 can be defined as, in the present invention, the layer #1 body comprising the tubular #1 body 61a and the tubular #2 body 61b located immediately adjacent to the #1 body 61a.

Further, and as described above, the belt member sub-unit 60 comprises a protrusion area 62 wherein one side is adjoined with the #1 body 61a and the other side is adjoined with the #2 body 62b.

In the present invention, the protrusion area can accommodate cables thus, if the protrusion area is defined as the tubular #1 body 61a and the tubular #2 body 61b, the protrusion area 62 can be defined as the layer #2 body located at #1 area of the layer #1 body, comprising the tubular protrusion body 62 located between the #1 body 61a and the #2 body 61b.

Based on the above definition, in the present invention, the belt member sub-unit 60 can be defined as the combination comprising: layer #1 body that comprises a tubular #1 body 61a and a tubular #2 body 61b immediately adjacent to the #1 body 61a; and layer #2 body located at #1 area of the layer #1 body, that comprises the tubular protrusion area 62 in between the #1 body 61a and the #2 body 61b.

As illustrated in drawings, the #1 area can be the top of the #1 body, however, conversely, the #1 area can be the bottom of the #1 body, thus, the present invention does not limit the meaning of top and bottom.

Where, in the present invention, the #1 body 61a can accommodate #1 cable, the #2 body 61b can accommodate #2 cable, and especially for the present invention, the protrusion area 62 can accommodate #3 cable.

Thus, as described above, by inserting a cable to the protrusion area 62, the protrusion area can perform the additional role to accommodate the cable, the cable supports the protrusion area allowing the protrusion area to maintain its posture even when bent, thus, the protrusion area can perform its role to prevent the layer #2 belt member and the layer #1 belt member from falling off from each other.

With further reference to FIG. 19a and FIG. 19b, one side of the protrusion area 62 is adjoined with the #1 body 61a and the other side of the protrusion area 62 is adjoined with the #2 body 61b.

In particular, the protrusion area 62 comprises: #1 slope 62a from #1 predetermined position of the #1 body 61a continued to #1 direction of the #1 body 61a; #2 slope 62b from #2 predetermined position of the #2 body 61b continued to #2 direction of the #2 body 61b; and the connection point 62c at which the #1 slope 62a and the #2 slope 62b meets.

Where the connection point 62c is displaced from #1 predetermined position of the #1 body 61a and #2 predetermined position of the #2 body 61b, allowing the protrusion area to be projected from the #1 belt member unit 60a and the #1 belt member unit 60b. Thus the space formed by such displacement can accommodate a cable.

With reference to FIG. 19b, it is illustrated that #1 predetermined position of the #1 body 61a is the top surface of the #1 body 61a, and #2 predetermined position of the #2 body 61b is the top surface of the #2 body 61b, therefore, #1 direction to which the #1 slope 62a is extended conforms the top surface direction of the #1 slope 62a, and #2 direction to which the #2 slope 6ba is extended conforms the top surface direction of the #2 slope 62b.

However, in opposite to FIG. 19b, #1 predetermined position of the #1 body 61a can be the bottom surface of the #1 body 61a, and #2 predetermined position of the #2 body 61b can be the bottom surface of the #2 body 61b, therefore, #1 direction to which the #1 slope 62a is extended conforms the bottom surface direction of the #1 slope 62a, and #2 direction to which the #2 slope 6ba is extended conforms the bottom surface direction of the #2 slope 62b. However, the present invention does not limit the meaning of the top surface and the bottom surface.

With reference to FIG. 19b, belt member sub-unit 60 of the present invention comprises the space 63 between #1 belt member unit 60a and the #2 belt member unit 60b.

Details of such configuration have been addressed above, thus no further explanation will be provided.

Despite not being illustrated in drawings, considering the belt member sub-unit as a base, the belt member sub-unit can be horizontally with multiple belt member sub-units or belt member units to configure layer #1 belt member FIG. 20a, 7000-1, and can also configure layer #2 belt member FIG. 20a, 70002 in an identical manner with the layer #1 belt member FIG. 20a, 7000-1.

For a belt member in the configuration, the belt member can be defined as below, in a similar manner the belt member sub-unit is defined above.

Layer #1 belt member 7000-1 is defined as below, whilst layer #2 belt member 7000-2 is defined in the same manner with layer #1 belt member.

With reference to FIG. 20a and FIG. 20b, and as described above, in the present invention, layer #1 belt member 7000-1 and layer #2 belt member 7000-2 may be stacked together to conform a stacked belt member 7000.

Where, the layer #1 belt member 7000-1 comprises #1 belt member sub-unit 60, whilst the #1 belt member sub-unit 60 comprises: #1-1 belt member unit 60a; #1-2 belt member unit 60b immediately adjacent to the #1-1 belt member unit 60a; and #1-3 belt member unit no numeral immediately adjacent to the #1-2 belt member unit 60b.

Where, the #1-1 belt member unit 60a comprises a tubular #1-1 body 61a; the #1-2 belt member unit 60b comprises a tubular #1-2 body 61b; and the #1-3 belt member unit no numeral comprises a tubular #1-3 body no numeral.

Hence, the #1-1 body 61a, the #1-2 body 61b and #1-3 body no numeral can be defined as layer #1 body.

Further, the layer #1 belt member 7000-1 comprises: #1 protrusion area 62 which one side is adjoined with the #1-1 body 61-a and the other side is adjoined with the #1-2 body 61b; and #2 protrusion area no numeral which one side is adjoined with the #1-2 body 61b and the other side is adjoined with the #1-3 body no numeral.

Hence, the #1 protrusion area 62 and the #2 protrusion area no numeral can be defined as layer #2 body.

According to this definition, the layer #1 belt member 7000-1 of the present invention can be defined to comprise: layer #1 body comprising tubular #1 body 61a, tubular #2 body 61b immediately adjacent to the #1 body 61a, and tubular #3 body no numeral immediately adjacent to the #2 body 61b; and layer #2 body comprising tubular #1 protrusion area 62 located at #1 area of the #1 body and between the #1 body 61a and the #2 body 61b, and tubular #2 protrusion area no numeral located at #2 area of the #1 body and between the #2 body 61b and the #3 body no numeral.

Further, the #1 protrusion area 62 can be defined to comprise: #1-1 slope 62a from #1 predetermined position of #1 body continued to #1 direction of the #1 body; #1-2 slope 62b from #2 predetermined position of #2 body continued to #2 direction of the #2 body; and #1 connection point 62c at which the #1-1 slope and #1-2 slope meet, while the #2 protrusion area no numeral can be defined to comprise: #2-1 no numeral slope from #3 predetermined position of #2 body continued to #3 direction of the #2 body; #2-2 no numeral slope from #4 predetermined position of #3 body continued to #4 direction of the #3 body; #2 no numeral connection point 62*c* at which the #1-1 slope and #1-2 slope meet.

Hence, as described above, the #1 protrusion area 62 and the #2 protrusion area no numeral can each accommodate a cable, where by inserting a cable to the protrusion area, the protrusion area can perform the additional role to accommodate the cable, the cable supports the protrusion area allowing the protrusion area to maintain its posture even when bent, thus, the protrusion area can perform its role to prevent the layer #2 belt member and the layer #1 belt member from falling off from each other.

Where, the stacking relations of layer #1 belt member 7000-1 and layer #2 belt member 7000-2 has been described above, thus detail explanation is not provided, whilst, layer #2 belt member 7000-2 can be defined in the same manner with layer #1 belt member 7000-1, thus definition of layer #2 belt member is not provided.

While embodiments of the present invention has been described in connection with enclosed drawings, however a person skilled in the field of arts shall understand that the present invention can be embodied in other details, without altering the technical idea or essential features. Accordingly, the aforesaid embodiments shall be construed as exemplary, in all aspects, and shall not be construed to be limiting.

What is claimed is:

1. A belt member sub-unit comprising:
   a layer #1 body comprising a tubular #1 body and a tubular #2 body immediately adjacent to the tubular #1 body; and
   a layer #2 body comprising a tubular protrusion area located at a #1 area of the layer #1 body, wherein the #1 area of the layer #1 body is located between the tubular #1 body and the tubular #2 body.

2. The belt member sub-unit of claim 1,
   wherein the tubular protrusion area can accommodate a cable.

3. The belt member sub-unit of claim 1, wherein the tubular protrusion area comprises:
   a #1 slope from a #1 predetermined position of the tubular #1 body continued to a #1 direction of the tubular #1 body;
   a #2 slope from a #2 predetermined position of the tubular #2 body continued to a #2 direction of the tubular #2 body; and
   a connection point at which the #1 slope and the #2 slope meet.

4. The belt member sub-unit of claim 3,
   wherein the connection point is displaced from the #1 predetermined position of the tubular #1 body and the #2 predetermined position of the tubular #2 body, allowing the tubular protrusion area to be projected from the tubular #1 body and the tubular #2 body, allowing a space formed by such displacement to accommodate a cable.

* * * * *